US008463449B2

(12) United States Patent
Sanders

(10) Patent No.: US 8,463,449 B2
(45) Date of Patent: Jun. 11, 2013

(54) SYSTEMS, APPARATUS, AND METHODS OF A SOLAR ENERGY GRID INTEGRATED SYSTEM WITH ENERGY STORAGE APPLIANCE

(76) Inventor: Dean Sanders, Linden, CA (US)

( * ) Notice: Subject to any disclaimer, the term of this patent is extended or adjusted under 35 U.S.C. 154(b) by 348 days.

(21) Appl. No.: 13/016,901

(22) Filed: Jan. 28, 2011

(65) Prior Publication Data

US 2012/0197449 A1    Aug. 2, 2012

(51) Int. Cl.
   *G05B 15/00*    (2006.01)
   *H01L 31/042*   (2006.01)
   *H01M 10/44*    (2006.01)

(52) U.S. Cl.
   USPC ........... 700/286; 700/291; 320/101; 52/173.3

(58) Field of Classification Search
   USPC .................. 700/286–291, 295–298; 320/101, 320/138, 139; 361/810; 52/173.3
   See application file for complete search history.

(56) References Cited

U.S. PATENT DOCUMENTS

| 4,888,702 | A  | * | 12/1989 | Gerken et al. | 700/295 |
|-----------|----|----|---------|---------------|---------|
| 5,111,127 | A  | * | 5/1992  | Johnson | 320/101 |
| 5,692,647 | A  | * | 12/1997 | Brodie | 222/173 |
| 6,738,692 | B2 | * | 5/2004  | Schienbein et al. | 700/286 |
| 7,783,389 | B2 | * | 8/2010  | Yamada et al. | 700/286 |
| 7,783,390 | B2 | * | 8/2010  | Miller | 700/291 |
| 7,795,837 | B1 | * | 9/2010  | Haun et al. | 320/101 |
| 7,843,163 | B1 | * | 11/2010 | Haun et al. | 320/101 |
| 7,917,252 | B2 | * | 3/2011  | Imagawa et al. | 700/288 |
| 7,929,327 | B2 | * | 4/2011  | Haines et al. | 363/95 |
| 7,983,797 | B2 | * | 7/2011  | Rasmussen et al. | 700/286 |
| 8,046,961 | B1 | * | 11/2011 | Cutting et al. | 52/173.3 |
| 8,193,760 | B2 | * | 6/2012  | Wagnon et al. | 320/101 |
| 8,254,090 | B2 | * | 8/2012  | Prax et al. | 361/641 |
| 2004/0258404 | A1 | * | 12/2004 | Brown | 396/427 |
| 2008/0100707 | A1 | * | 5/2008  | Brown | 348/158 |
| 2009/0015191 | A1 | * | 1/2009  | Benckenstein et al. | 320/102 |
| 2010/0017045 | A1 | * | 1/2010  | Nesler et al. | 700/296 |
| 2010/0039062 | A1 | * | 2/2010  | Gu et al. | 320/101 |
| 2010/0198421 | A1 | * | 8/2010  | Fahimi et al. | 700/291 |

(Continued)

OTHER PUBLICATIONS

APERC. "Integrated Control of Next Generation Power System: Final Report" US DoE Award No. DE-FC26-06NT42793, Oct. 1, 2006 to Feb. 28, 2010.*

(Continued)

*Primary Examiner* — Dave Robertson
(74) *Attorney, Agent, or Firm* — Matlock Law Group, PC; K. Brian Matlock; Michael W. Caldwell

(57) ABSTRACT

A system, method, and apparatus for integrating distributed energy sources, energy storage, and balance of system components into a single device with systems and control for monitoring, measuring, and conserving power generated on the premise. A data processing gateway, hybrid inverter/converter and charge controller provide flexibility in the multi-voltages, output capacities, and photovoltaic array sizes coupled to the apparatus and system. The system and apparatus may be used in various commercial and residential applications. A user may store energy provided by one or more alternate energy sources coupled to an energy storage module. The system provides a compact enclosure that fits within a utility workspace and enclosures that can be mechanically coupled together, placed in parallel or in a series. A method, computer implemented apparatus, computer readable medium, computer implemented method and a system for monitoring energy consumption, selling energy back to a utility company and peak shaving are also provided.

7 Claims, 44 Drawing Sheets

U.S. PATENT DOCUMENTS

| | | | |
|---|---|---|---|
| 2011/0046799 A1* | 2/2011 | Imes et al. | 700/286 |
| 2011/0046800 A1* | 2/2011 | Imes et al. | 700/286 |
| 2011/0055036 A1* | 3/2011 | Helfan | 705/26.1 |
| 2011/0193516 A1* | 8/2011 | Oohara et al. | 320/101 |
| 2012/0004780 A1* | 1/2012 | Miller et al. | 700/286 |
| 2012/0059527 A1* | 3/2012 | Beaston et al. | 700/295 |
| 2012/0074893 A1* | 3/2012 | Cole | 320/101 |
| 2012/0326653 A1* | 12/2012 | Godrich et al. | 320/101 |

OTHER PUBLICATIONS

Gilchrist, Grant. "An Overview of Smart Grid Standards" Ontario Smart Grid Forum (slides), Nov. 2008.*

* cited by examiner

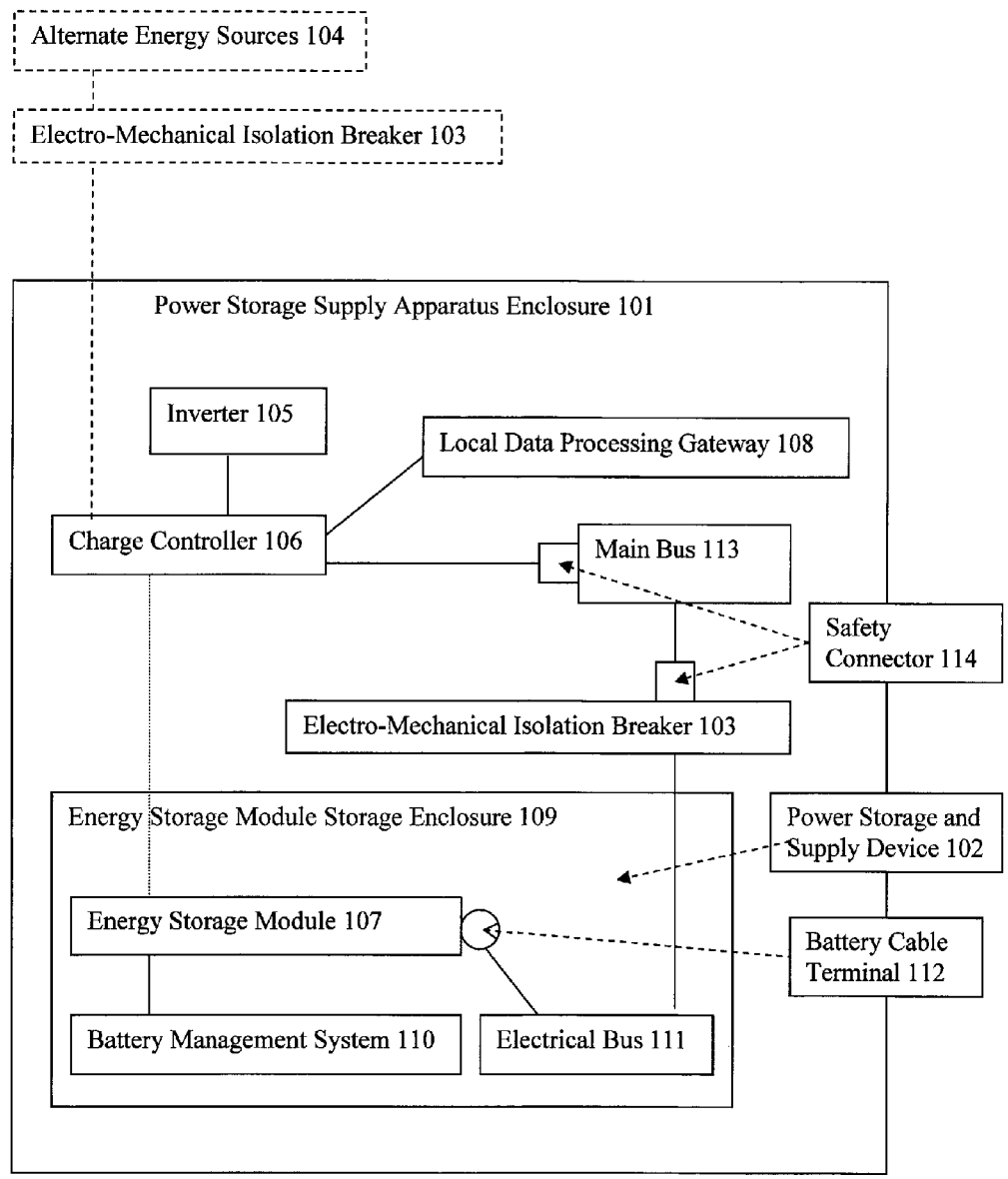
Figure 1B. Solar Integrated Energy Management Apparatus 100

Solar Integrated Energy Management System 500

Energy Management System For Governing Energy Management Resources 600

Computer Implemented Apparatus
For Providing A Method For Monitoring
Energy Consumption 2100

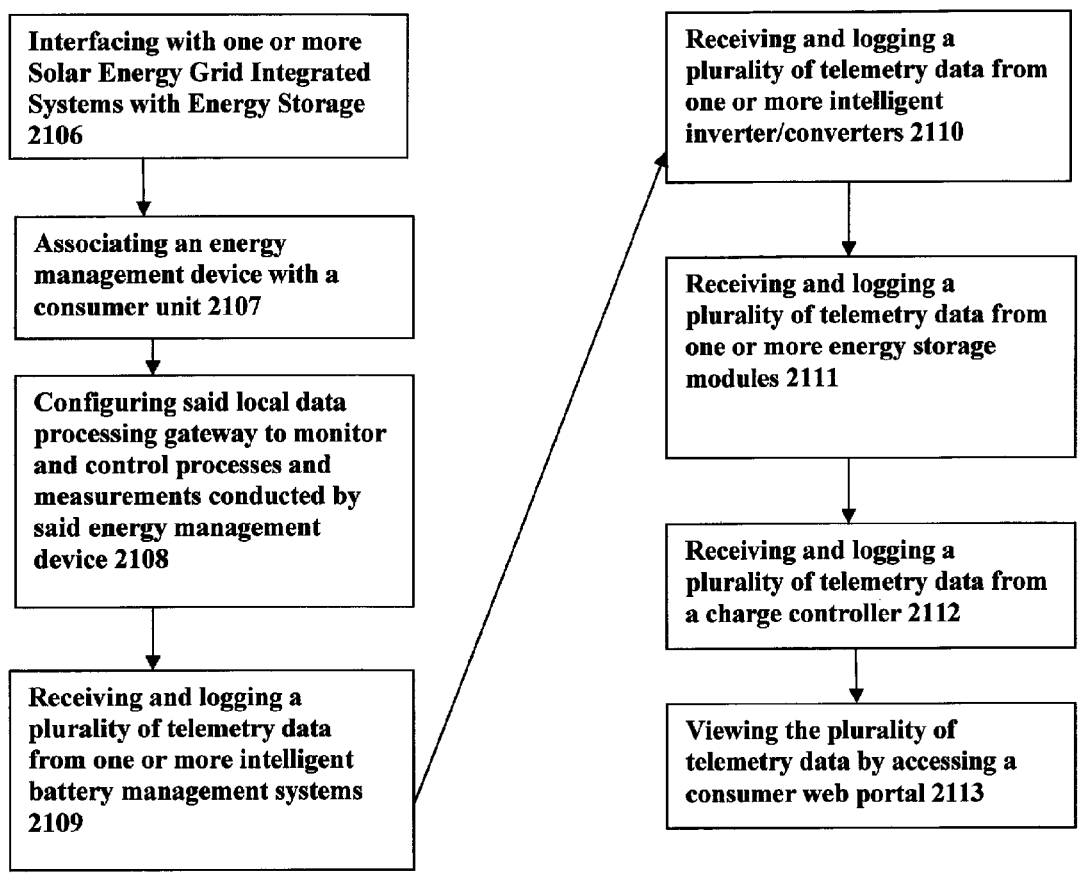

Energy Sell Back to Utility Grid System 2600

Computer Implemented Apparatus
For Selling Energy Back to a Utility
Grid 2800

Computer Implemented Apparatus
For Providing A Method For
Peak Shaving 3200

Exemplary
Computer System

SYSTEMS, APPARATUS, AND METHODS OF A SOLAR ENERGY GRID INTEGRATED SYSTEM WITH ENERGY STORAGE APPLIANCE

BACKGROUND

The present invention relates generally to distributed energy storage and power management, and more particularly to a fully integrated system, method, and device for the controlling, monitoring, measuring, and conserving distributed power generated on the premise, the resale of distributed power to a utility, and power generated from distributed energy storage (e.g., batteries) and distributed renewable energy sources (e.g., solar panels). Moreover, the invention is minimally invasive, modular, and retains power-generating capacity, which is combined with load management and energy storage to provide energy at or near the point of consumption.

The appliance described herein includes a lockable NEMA, or 3R contaminate or corrosion resistant enclosure which houses a plurality of devices for accomplishing localized and remote control electrical energy management for electrical loads sited at the appliance location. Additionally, the devices may be controlled to provide voltage support to the utility grid. The SEGIS-ES™ appliance includes the following devices: DC/AC and AC/DC intelligent controllable inverter/converter (also called a hybrid inverter/converter), intelligent Battery charge controller with Multi Point solar panel Power Tracking ability, electrical energy storage means, Intelligent battery management system, isolation switch panel board, Intelligent data processing communications gateway and termination points for solar array electricity input and electric utility interconnection There exist several technologies that can produce electricity on a premises, whether a residential or commercial building. Among these are photovoltaic panels (e.g., solar panels), small scale natural gas turbines (also known as micro-turbines), small-scale wind turbines (as contrasted to the large turbines used in grid connected wind farms), low pressure water turbines, high-pressure low flow water turbines, and fuel cells using hydrogen, natural gas, and potentially other hydrocarbons. These technologies are herein referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a home or business' main source of electricity, which is normally provided from a utility power grid connected to the home or business and are designed to support the entire or selected electrical load of the home or business. As a result, residential and commercial power storage and supply devices are typically very large and cumbersome. Some power storage and supply devices use alternative energy sources, such as the ones listed above. The power storage and supply devices store the electric power produced by an alternative energy source and may even supply power to a utility power grid, in essence operating as a small, distributed power generation plant. Many local, state, and federal government agencies, as well as private utility companies, are encouraging this practice as evidence by the changing regulatory environment and passage of such distributed power and energy storage policy as AB970, SB412, SB14 and AB44. Further, rule makers such as FERC, CASIO, and the CPUC are making priority changes (e.g., CEC Integrated Energy Policy Report, CAISO implementation of FERC Order 719, etc.), which encourage or mandate the use of distributed energy storage and power generation. Unfortunately, the use of alternative energy sources in conjunction with such power storage and supply device systems has been limited primarily because of cost and convenience and communications standards.

In recent years, however, the costs associated with adopting and using alternative energy sources has decreased substantially as distributed energy power and storage technology have been refined, sales have increased due to the creation of new markets (e.g., plug-in electric hybrid vehicles and the globalized adoption of solar technologies), and more suppliers have entered the market resulting in greater manufacturing capacity and market competitiveness for both photovoltaic and battery manufacturers. The cost barriers to distributed electrical technologies are also eroding due to factors such as real and/or perceived increases in the cost of electricity and other forms of energy, the widespread adoption of time-of-use pricing (TOU) or real-time pricing (RTP) by utilities, favorable terms for the utilities' purchase of power from such distributed sources, and government financial incentives (e.g., The federal business energy investment tax credit available under 26 USC §48 was expanded significantly by the *Energy Improvement and Extension Act of 2008* (H.R. 1424), enacted in October 2008, etc.) which encourage investment in distributed and environmentally more benign electrical technologies.

Adoption of distributed energy power and storage technologies is also increasing due to the widespread implementation of an Advanced Metering Infrastructure; commonly referred to as AMI. Advanced metering systems are comprised of state-of-the-art electronic/digital hardware and software, which combine interval data measurement with continuously available remote communications. These systems enable measurement of detailed, time-based information and frequent collection and transmittal of such information to various parties. AMI typically refers to the full measurement and collection system that includes meters at the customer site, communication networks between the customer and a service provider, such as an electric, gas, or water utility, and data reception and management systems that make the information available to the service provider. With AMI utilities are now better able to manage installed devices within the homes of participating consumers that, under utility control, selectively disable energy-consuming devices (e.g., hot water heaters or air conditioning units) in response to peak loading conditions. Furthermore, utilities are now able in certain cases to remotely activate and aggregate distributed power and energy supplies to increase the supply of electricity to constrained parts of the electricity grid.

There has been an increasing emphasis in recent years on energy conservation. Electric utilities have also come under increasing pressure to reduce the need to fire up polluting power plants to serve peak demands, such as during hot summer days. With the enactment of current legislation and rulemaking (e.g., AB970, AB32, and FERC Order 719, etc.), electric utilities also have an incentive to "smooth out" energy demand to minimize the need to install new power transmission and distribution lines; further negating environmental and land use issues. An example of just a few of the ways which utilities can perform these tasks are referred to as "demand side management" and "supply side management." Demand side management refers to the selective reduction of energy demand in response to peak loading conditions. For example, utilities have for years installed devices in the homes of participating consumers that, under utility control, selectively disable energy-consuming devices (e.g., hot water heaters or air conditioning units) in response to peak loading conditions. As another example, utilities are able in certain cases to remotely activate energy supplies to increase the supply of electricity to parts of the electricity grid. It would be advantageous to provide more sophisticated control mechanisms to permit electric utilities and others to effectively monitor and control distributed energy resources, such as storage units capable of storing electricity and reselling it to the grid on command. It would also be advantageous to provide more sophisticated demand side management tasks using aggregated resources to manage localized constraints on the utility grid (e.g., substation, feeder-line, residence, etc.).

The remaining barriers to market adoption of distributed power storage and supply devices are convenience. At present there are significant challenges to an individual's or building owner's installation of renewable energy technologies. In typical installations the component parts must be purchased from multiple vendors and integrated in a custom installation. Moreover, buying the component parts requires knowledge of the market for and the technical aspects of the different energy technologies, the construction required to install the technologies in accord with local codes, regulatory requirements, and guidelines imposed by homeowner's association and insurance companies. In addition, if the power generated in excess of requirements on the premise is to be resold, utilities impose additional requirements for connection of such systems to the utility's power grid. Another hindrance to implementing the use of distributed power storage and supply devices is that many local electricians do not yet know how to install the disparate components and frequently make errors in doing so, as much of this technology is new or not widely used. As a result of such errors and/or lack of know-how by the installer, the attendant wiring can be unattractive and intimidating to the buyer and lead to concerns and possibly actual issues regarding safety and reliability in addition to aesthetics. Further, the typical homeowner or business owner is not qualified or certified, and the associated expense too high, to provide adequate battery maintenance or battery replacement. This adds cost to the upkeep of any distributed power storage and supply devices.

SUMMARY OF THE INVENTION

The embodiment of the SEGIS-ES™ is designed in such a way as to be located outside of a residence or commercial structure and to be of a form factor that coincides with electric and gas utility working space (siting) requirements of being less than 42 inches in depth when the SEGIS-ES™ enclosure door is open, and less than 18 inches in depth when the door is closed. Furthermore, in some embodiments the enclosure is no wider than 24 inches. Additionally, in some embodiments, multiple enclosures being 18 inches deep and 24 inches wide can be mechanically coupled together. The enclosure door, when in the open position, is made to be removable without the necessity of any tools. A three point padlockable latching mechanism equipped with a security pentahead bolt is additionally provided to restrict non-authorized personnel from opening the enclosure. The enclosure door hinges are designed as to be encased by the door shell in such a manner to prevent tampering with the hinges in order to gain entry to the enclosure. The SEGIS-ES™ enclosure provides means of convection and forced cooling via the strategic placement of covered/louvered vents on the rear of the enclosure. The vent locations are designed to coincide with the forced air exhaust ports on the inverter/converter and charge controller. The inverter/converter (or hybrid inverter/converter) has the capability of converting DC to AC and AC to DC). The strategic placement and air tunneling/channeling provided by the isolation breaker panel, inverter mounting offset from the back of the enclosure and the enclosure/inverter/converter vertical airflow channels provide additional exothermic cooling of the electronic and energy storage equipment.

The enclosure is epoxy powder coated for corrosion resistance to salt spray and airborne contaminants and chemicals. The SEGIS-ES™ enclosure is intended to be placed on a rigid pedestal via recesses bolting lugs internal to the enclosure bottom, the rigid pedestal (2"-4" concrete or other material) is to be additionally fastened to the premise concrete walkway, foundation or other provided rigid footing via one or more adjusting, leveling means. The SEGIS-ES™ enclosure is not required to be fastened to the side (vertical plane) of the residential or commercial structure. The enclosure additionally provides a connection ambidextrous conductor termination point which can be located on either side of the enclosure via watertight escutcheon plates containing electrical conduit access holes to facilitate connection of the photovoltaic power and utility electricity. The SEGIS-ES™ enclosure top is uniquely sloped to prevent the accumulation of water or other liquids thereby extending the enclosure life. The door jamb of the enclosure includes a novel rain gutter and weather stripping system with prevents liquids and dust of entering the enclosure. The unique enclosure rain gutter interface with the weather-stripping material is designed such that the contact surface area between the weather strip material and the rain gutter is minimal. The minimal interface surface area between the weather strip and the rain gutter helps to prevent weather strip failure caused by adhesion to the mating surface.

The SEGIS-ES™ includes a separate battery enclosure housed within the SEGIS-ES™ enclosure which utilizes security fastening means to prevent removal of the battery enclosure from non-authorized personnel. The metal battery enclosure is designed so that most battery chemistry/energy storage means can be accommodated. Energy storage means such as flooded lead-acid, AGM lead-acid, Lithium ion chemistries, pure proton, and nickel cadmium chemistry batteries and storage means can be accommodated and additionally contained in the fire resistant explosion protective energy storage enclosure. The SEGIS-ES™ energy storage enclosure provides means for connecting the battery to the inverter via a solid copper bus bulkhead means which provides an electrically insulated escutcheon means and cover to isolate the high current bus from personnel. The battery enclosure further provides a means to house the battery management intelligent electronics and telemetry equipment while providing a means to isolate battery disconnecting switches and associated conductors. The battery enclosure additionally provides a communications connection bulkhead means providing the battery management system to communicate to the data processing gateway, inverter and charge controller. The battery enclosure also provides a means for cross ventilation and convection cooling of the battery via venting grid ports or louvers. The battery enclosure may be removed via a removal dolly tool. The removal dolly tool interacts with louvers integrated into the battery enclosure that allows the removal dolly tool to install or remove the battery enclosure as needed.

The SEGIS-ES™ isolation switch panel board is uniquely designed to provide a common integration point for the inverter, utility grid, photovoltaic power, battery isolation switches and electric overload breaker conductors, charge controller and communications data processing gateway as a single subassembly which facilitates ease of assembly while utilizing solid copper bus to reduce space requirements need for flexible, insulated conductors. The isolation switch panel board additionally protects and inhibits authorized personnel from contacting electrically energized components.

The SEGIS-ES™ appliance provides a multiprotocol data processing communication gateway device which receives and logs a plurality of telemetry data from the intelligent battery management system, intelligent charge controller, intelligent inverter/converter, and Home Are Network (HAN) appliances and electrical loads and corresponds locally stored control algorithms and remotely received control parameters to the individual or aggregated SEGIS-ES™ devices.

The inverter/converter is installed into the SEGIS-ES™ enclosure by means of pre-inserted studs and a specially design mounting rail attached to the SEGIS-ES™ enclosure which allows the inverter to be easily assembled or removed as may be required for repairs. The SEGIS-ES™ appliance is designed to allow additional battery modules and or SEGIS-ES™ devices to be connected in series or in parallel.

In one embodiment, the present invention is directed towards a system, method, and device for integrating distributed energy sources, energy storage, and balance of system components into a single device with systems and control for monitoring, measuring, and conserving power generated on the premise, the resale of power to a utility, power generated from distributed energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels) and distributed energy sources (e.g., solar panels or wind or water-based systems). Moreover, the device is minimally invasive, modular, and retains power-generating capacity, which is combined with load management and energy storage to provide energy at or near the point of consumption.

In another embodiment, a local data processing gateway device is located inside the cabinet and is configured to monitor and control the processes and measurements conducted by the power storage and supply device in either a local or remote mode configuration and can be aggregated by a third party (e.g., independent service operator, etc.) or utility for purposes of dispatching and controlling distributed power or stored energy. Further, the local data processing gateway uses open standard communication methods at the transport, application, and object levels (e.g., Internet, GPRS, AMI Network, Web Services, XML-Based, DNP3, IEC 61850) for a utility, aggregator, or independent service operator to broadcast to a residence or commercial building site the processes and measurements relating to the control, management, and conservation of power generated on the premise, the resale of power to a utility, power generated from energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels), and distributed energy sources (e.g., solar panels or wind or water-based systems). For the communications within a residence or commercial site, the local data processing gateway can further aggregate, monitor and control the processes and measurements associated with devices within the home using open standard communication methods at the transport, application and object levels (e.g., ZigBee, HomePlug, Intranet, Web Services, XML-Based, SEP, MMS, and IEC 61850) for user process, measurement, control, and conservation of on premise power generated, the resale of power to a utility, power generated from energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels), distributed energy sources (e.g., solar panels or wind or water-based systems), and devices capable of energy management (HVAC Thermostats, water heaters, pool pumps, etc.).

In another embodiment, a solar integrated energy management apparatus is made of a power storage supply apparatus enclosure, a power storage and supply device coupled to an electromechanical isolation breaker that is integrated to one or more alternate energy sources and one or more energy storage modules, one or more inverters coupled to a charge controller, a charge controller coupled to one or more inverters and to one or more energy storage modules, a local data processing gateway coupled to the charge controller, and one or more energy storage modules coupled to an energy storage module storage enclosure containing a battery management system and electrical bus that is connected to one or more battery cable terminals to a main bus and in which the main bus is coupled to the charge controller.

In another embodiment, an integrated energy management apparatus includes a power storage and supply device coupled to an electromechanical isolation breaker that is integrated to one or more alternate energy sources and one or more energy storage modules and that the electromechanical isolation breaker is capable of communicating with one or more alternate energy sources; one or more inverters coupled to a charge controller; a charge controller coupled to the one or more inverters and to one or more energy storage modules; a local data processing gateway coupled to the charge controller; one or more energy storage modules coupled to an energy storage module storage enclosure containing a battery management system and electrical bus where the electrical bus is connected to one or more battery cable terminals to a main bus coupled to the charge controller; a consumer web portal; an Internet user interface including an application programming interface coupled to a database repository, a display, and a utility enterprise database application; and an energy area network that couples the Internet user interface and utility enterprise database application to one or more user devices and appliances In another embodiment, a solar integrated system enclosure includes: an upper section that houses one or more inverters; a center section that includes one or more electromechanical isolation breakers, a charge controller, and a computer-implemented local data processing gateway device that includes one or more software modules for implementing method steps to monitor, control, and store energy from one or more alternate energy sources and to implement one or more processes for providing consumer energy management; a lower section that houses one or more storage modules; a frame that includes a width, a depth, and a height to form a single, vertical rectangular cross section box of varying widths; one or more corrosion resistant outer panels that includes a width, a depth, and a height that forms a rectangular cross section box of varying widths, wherein the panels are coupled to the frame to form a single vertical freestanding outdoor utility grade enclosure, which enclosure is open on a front side and coupled to a hinged door; an internal upper section, center section and lower section backpan for mounting one or more solar integrated system components; a compact footprint equal to a depth not to exceed a utility workspace; a sloped top panel wherein the rear edge height is greater than the front edge height; a door jamb coupled to a top portion and one or more sides of an open front side of said frame; the hinged front door including a three point rod and latch system to engage a gasketed internal rectangular circumference and a handle latch on the external of the front door where the hinged front door is coupled to the door jamb; one or more hot swappable energy storage modules coupled to a shunt switch for physically isolating the energy storage modules and further coupled to an isolation switches panel assembly via at least one unique safety connector mechanism and an electrical bus connecting the energy storage module terminals to a main bus which connects to the charge controller and the one or more inverters through a unitized system; and one or more horizontal perforations on a back panel and located at a minimum distance between exhaust ports on an inverter, a converter and a charge controller.

Another embodiment is a system that provides a computer implemented method for monitoring energy including computer-usable readable storage medium having computer-readable program code embodied therein for causing a computer system to perform a method of storing excess energy generated in an energy management device in an application platform. The system includes: one or more processors; a clock; memory; one or more I/O interfaces; one or more analog to digital interfaces; operating system software; a power storage supply apparatus enclosure; a power storage and supply device coupled to an electromechanical isolation breaker that is integrated to one or more alternate energy sources; one or more hybrid inverter/converters; one or more data processing gateways to implement monitoring of one or more telemetry data; one or more charge controllers; and one or more energy storage modules.

In another embodiment, a solar integrated energy management system is made of a power storage supply apparatus enclosure; one or more alternative energy sources coupled to a user power system; the user power system coupled to a utility power grid to distribute the required consumer power needed; and a user power monitoring control management console in which the solar integrated energy management system monitors user power consumption with the user power monitoring control management console and stores excess alternate energy source power created via communication and storing said excess alternate energy source power into one or more energy storage modules.

In another embodiment, an energy management system for governing energy management resources includes a power storage supply apparatus enclosure; a power storage and supply device; one or more alternative energy sources coupled to a user power system; the user power system coupled to a utility power grid to distribute the required consumer power needed; one or more sets of rules; one or more sets of constraints; and in which the one or more sets of rules and the one or more sets of constraints allow a user to implement multiple sets of rules and constraints that govern various resources selected from power generation, power storage, power use, and load control.

In another embodiment, an Intelligent Energy Storage Module Management System includes a tamper resistant energy storage enclosure housed within an intelligent energy storage module management enclosure with security fastening means, in which the tamper resistant energy storage enclosure includes means for connecting one or more energy storage devices to a hybrid inverter/converter via a solid copper bus bulkhead apparatus which further includes an electrically insulated escutcheon means and associated cover to isolate a high current bus conductor from service personnel; a means to house one or more energy storage module management intelligent electronics and telemetry equipment within the intelligent energy storage module management enclosure while simultaneously isolating one or more energy storage disconnecting switches and associated conductors; a communications connection bulkhead means housed within the intelligent energy storage module management enclosure that allows the Intelligent Energy Storage Module Management System to communicate to a data processing gateway, hybrid inverter/converter and charge controller; one or more venting grid ports located on the intelligent energy storage module management enclosure adjacent to one or more energy storage modules, in which the one or more venting grid ports cross ventilate and convection cool one or more of the one or more energy storage modules; one or more components of the energy storage module management intelligent electronics and telemetry equipment communicably coupled to a multi-protocol data processing communication gateway device to provide telemetry data to implement one or more processes to integrate with an Energy Area Network (EAN); and the Energy Area Network (EAN) communicably coupled to one or more appliances and electrical loads to aggregate locally stored control algorithms and remotely received control parameters.

In another embodiment, a method for monitoring energy consumption, comprises steps for providing one or more hybrid inverter/converters, wherein the one or more hybrid inverter/converters are communicably coupled to one or more charge controllers and wherein the one or more hybrid inverter/converters are further electronically coupled to an electrical bus; providing one or more data processing gateways, wherein the one or more data processing gateways are communicably coupled to one or more charge controllers and to one or more intelligent battery management systems; providing one or more charge controllers; providing one or more intelligent battery management systems coupled to one or more energy management devices; providing one or more energy management devices in a compact footprint; associating an energy management device with a consumer unit, said energy management device having a local data processing gateway device communicably coupled to the energy management device; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing the plurality of telemetry data by accessing a consumer web portal.

In another embodiment, a method for selling energy back to a utility power grid, comprises steps for providing one or more hybrid inverter/converters; providing one or more data processing gateways; providing one or more charge controllers; providing one or more intelligent battery management systems; providing one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; calculating the amount of available energy storage capacity based upon the current or expected price of power; and implementing the one or more set of rules.

In another embodiment, A method for providing wholesale energy services, comprises steps for providing one or more solar integrated energy management apparatus; retrieving telemetry data from one or more energy storage modules to calculate an amount of available stored energy; applying the amount of available stored energy to offset a need to purchase and install one or more new electricity generating means; using the amount of available stored energy to reduce generation marginal cost, wherein said generation marginal cost comprises a cost of fuel and a cost for variable maintenance; using the amount of available stored energy to reduce generation capacity cost, wherein said generation capacity cost comprises one or more costs incurred in increasing generation capacity; using the amount of available stored energy to provide one or more rapid response energy storage modules; wherein the rapid response energy storage modules can provide regulation of the amount of available stored energy while charging and while discharging; using the amount of available stored energy to provide one or more electric supply reserve capacities, wherein the one or more electric supply reserve capacities reduce the need and cost for one or more other electric reserves; using the amount of available stored energy to reduce one or more users' electricity time-of-use (TOU) costs; using the amount of available stored energy to reduce one or more users' electricity real-time-price (RTP) energy costs; using the amount of available stored energy to reduce one or more end users' power draw on one or more utilities during times when electricity use is high; and reducing one or more demand charges from one or more utilities by storing energy in one or more energy storage modules at one or more times when low or no demand charges apply.

In another embodiment, a method for providing renewables integration, comprises steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; using the amount of available stored energy to reduce generation marginal cost, wherein said generation marginal cost comprises a cost of fuel and a cost for variable maintenance; using the amount of available stored energy to reduce generation capacity cost, wherein said generation capacity cost comprises one or more costs incurred in increasing generation capacity; using the amount of available stored energy to provide one or more rapid response energy storage modules; wherein the rapid response energy storage modules can provide regulation of the amount of available stored energy while charging and while discharging; using the amount of available stored energy to provide one or more electric supply reserve capacities, wherein the one or more electric supply reserve capacities reduce the need and cost for one or more other electric reserves; using the amount of available stored energy to reduce one or more users' electricity time-of-use (TOU) costs; using the amount of available stored energy to reduce one or more users' electricity real-time-price (RTP) energy costs; using the amount of available stored energy to reduce one or more end users' power draw on one or more utilities during times when electricity use is high; reducing one or more demand charges from one or more utilities by storing energy in one or more energy storage modules at one or more times when low or no demand charges apply; increasing the amount of available stored energy via one or more renewable energy sources; using an amount of available stored energy provided by one or more renewable energy sources at a later time when the cost of energy sold by one or more utilities is more expensive than the cost of said available stored energy provided by one or more renewable energy sources; and using the amount of available stored energy to firm output from renewable energy generation.

In another embodiment, a method for providing stationary storage for transmission and distribution (T&D) support, comprises steps for providing one or more solar integrated energy management apparatus; using a plurality of telemetry data from one or more energy storage modules to calculate an amount of available stored energy; using the amount of available stored energy to provide one or more electric supply reserve capacities, wherein the one or more electric supply reserve capacities reduce the need and cost for one or more other electric reserves; using the amount of available stored energy to offset one or more needs to use one or more large generation means of reactive power to the grid, wherein the amount of available stored energy provides reactive power to a grid when one or more region-wide voltage emergencies occurs; using the amount of available stored energy to increase a load carrying capacity of one or more transmission systems; using the amount of available stored energy to increase a generation capacity of one or more utilities; using the amount of available stored energy to supply an amount of energy upstream from one or more sources of energy congestion; and using the amount of available stored energy to defer one or more transmission and distribution costs associated with one or more utilities.

In another embodiment, a method for providing distributed energy storage systems, comprises steps for providing one or more solar integrated energy management apparatus; retrieving telemetry data from one or more energy storage modules to calculate an amount of available stored energy; applying the amount of available stored energy to offset a need to purchase and install one or more new electricity generating means; using the amount of available stored energy to reduce generation marginal cost, wherein said generation marginal cost comprises a cost of fuel and a cost for variable maintenance; using the amount of available stored energy to reduce generation capacity cost, wherein said generation capacity cost comprises one or more costs incurred in increasing generation capacity; using the amount of available stored energy to provide one or more rapid response energy storage modules; wherein the rapid response energy storage modules can provide regulation of the amount of available stored energy while charging and while discharging; using the amount of available stored energy to provide one or more electric supply reserve capacities, wherein the one or more electric supply reserve capacities reduce the need and cost for one or more other electric reserves; using the amount of available stored energy to reduce one or more users' electricity time-of-use (TOU) costs; using the amount of available stored energy to reduce one or more users' electricity real-time-price (RTP) energy costs; using the amount of available stored energy to reduce one or more end users' power draw on one or more utilities during times when electricity use is high; reducing one or more demand charges from one or more utilities by storing energy in one or more energy storage modules at one or more times when low or no demand charges apply; using the amount of available stored energy to improve electric service reliability associated with one or more power outages such that one or more end users have reduced losses associated with the one or more power outages; using the amount of available stored energy to reduce financial losses associated with one or more power anomalies; increasing the amount of available stored energy via one or more renewable energy sources; using an amount of available stored energy provided by one or more renewable energy sources at a later time when the cost of energy sold by one or more utilities is more expensive than the cost of said available stored energy provided by one or more renewable energy sources; and using the amount of available stored energy to firm output from renewable energy generation.

In another embodiment, a method for providing energy saving companies (ESO), comprises steps for providing one or more solar integrated energy management apparatus; retrieving telemetry data from one or more energy storage modules to calculate an amount of available stored energy; applying the amount of available stored energy to offset a need to purchase and install one or more new electricity generating means; using the amount of available stored energy to reduce generation marginal cost, wherein said generation marginal cost comprises a cost of fuel and a cost for variable maintenance; using the amount of available stored energy to reduce generation capacity cost, wherein said generation capacity cost comprises one or more costs incurred in increasing generation capacity; using the amount of available stored energy to provide one or more rapid response energy storage modules; wherein the rapid response energy storage modules can provide regulation of the amount of available stored energy while charging and while discharging; using the amount of available stored energy to provide one or more electric supply reserve capacities, wherein the one or more electric supply reserve capacities reduce the need and cost for one or more other electric reserves; using the amount of available stored energy to reduce one or more users' electricity time-of-use (TOU) costs; using the amount of available stored energy to reduce one or more users' electricity real-time-price (RTP) energy costs; using the amount of available stored energy to reduce one or more end users' power draw on one or more utilities during times when electricity use is high; reducing one or more demand charges from one or more utilities by storing energy in one or more energy storage modules at one or more times when low or no demand charges apply; using the amount of available stored energy to improve electric service reliability associated with one or more power outages such that one or more end users have reduced losses associated with the one or more power outages; using the amount of available stored energy to reduce financial losses associated with one or more power anomalies; increasing the amount of available stored energy via one or more renewable energy sources; using an amount of available stored energy provided by one or more renewable energy sources at a later time when the cost of energy sold by one or more utilities is more expensive than the cost of said available stored energy provided by one or more renewable energy sources; and using the amount of available stored energy to firm output from renewable energy generation.

In another embodiment, a method for providing energy management, comprises steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; increasing the amount of available stored energy via one or more renewable energy sources; and using an amount of available stored energy provided by one or more renewable energy sources at a later time when the cost of energy sold by one or more utilities is more expensive than the cost of said available stored energy provided by one or more renewable energy sources.

In another embodiment, a method for providing home energy management, comprises steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; increasing the amount of available stored energy via one or more renewable energy sources; using an amount of available stored energy provided by one or more renewable energy sources at a later time when the cost of energy sold by one or more utilities is more expensive than the cost of said available stored energy provided by one or more renewable energy sources; using the amount of available stored energy to improve electric service reliability associated with one or more power outages such that one or more end users have reduced losses associated with the one or more power outages; and using the amount of available stored energy to reduce financial losses associated with one or more power anomalies.

In another embodiment, a method for providing home backup, comprising steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; using the amount of available stored energy to improve electric service reliability associated with one or more power outages such that one or more end users have reduced losses associated with the one or more power outages; and using the amount of available stored energy to reduce financial losses associated with one or more power anomalies.

In another embodiment, a system for monitoring energy consumption, comprises one or more hybrid inverter/converters; one or more data processing gateways; one or more charge controllers; one or more intelligent battery management systems; one or more energy management devices in a compact footprint; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In another embodiment, a computer implemented method including computer usable readable storage medium having computer readable program code embodied therein for causing a computer system to perform a method of monitoring energy consumption, comprises steps for interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; associating an energy management device with a consumer unit, said energy management device having a local data processing gateway device communicably coupled thereto; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing the plurality of telemetry data by accessing a consumer web portal.

In another embodiment, a computer implemented apparatus for providing a method for monitoring energy consumption, is an apparatus that comprises a processor; an input device coupled to said processor; a memory coupled to said processor; an output device; and an execution engine including a method for monitoring energy consumption to perform steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; associating an energy management device with a consumer unit, said energy management device having a local data processing gateway device communicably coupled thereto; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing the plurality of telemetry data by accessing a consumer web portal.

In another embodiment, a computer readable medium for monitoring energy consumption, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for associating an energy management device with a consumer unit, said energy management device having a local data processing gateway device communicably coupled thereto; program code for configuring said local data processing gateway to monitor and control processes and measurements conducted by said energy management device; program code for receiving and logging a plurality of telemetry data from one or more intelligent battery management systems; program code for receiving and logging a plurality of telemetry data from one or more intelligent inverter/converters; program code for receiving and logging a plurality of telemetry data from one or more energy storage modules; program code for receiving and logging a plurality of telemetry data from a charge controller; and program code for viewing the plurality of telemetry data by accessing a consumer web portal.

In another embodiment, a computer implemented method including computer-usable readable storage medium having computer-readable program code embodied therein for causing a computer system to perform a method of storing excess energy generated in an energy management device in an application platform for performing steps for securing one or more energy storage modules in an energy storage module enclosure, said energy storage module enclosure coupled to the inside of a Solar Energy Grid Integrated System with Energy Storage (SEGIS-ES™) Appliance, wherein said Solar Energy Grid Integrated System with Energy Storage comprises one or more hybrid inverter/converters, one or more data processing gateways, one or more charge controllers, one or more intelligent battery management systems, and one or more energy management devices in a compact footprint; connecting said one or more energy storage modules to a SEGIS-ES™ isolation switch panel board, wherein said SEGIS-ES™ isolation switch panel board provides a common integration point for components coupled to said SEGIS-ES™ Appliance; configuring, by the computer system, a local data processing gateway to monitor and control processes and measurements conducted by said energy management device; monitoring, by the computer system, the amount of power generated by one or more distributed energy sources; monitoring, by the computer system, the rate of power generated by the one or more distributed energy sources; controlling, by the computer system, the rate of power stored in said one or more energy storage modules; controlling, by the computer system, the amount of power stored in said one or more energy storage modules; monitoring, by the computer system, the health of one or more energy storage modules; and operating, by the computer system, one or more devices capable of energy management.

In another embodiment, a method for selling energy back to a utility power grid, comprises steps for providing one or more hybrid inverter/converters; providing one or more data processing gateways; providing one or more charge controllers; providing one or more intelligent battery management systems; providing one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; calculating the amount of available energy storage capacity based upon the current or expected price of power; and implementing the one or more set of rules.

In another embodiment, a computer readable medium for selling energy back to a utility power grid, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for processing the one or more set of rules on an Intelligent Energy Storage Module Management System; program code for managing the one or more set of rules via a multiprotocol data processing communication gateway device communicably coupled to the Energy Storage Module Management System; program code for monitoring the one or more set of rules via a multiprotocol data processing communication gateway device communicably coupled to the Energy Storage Module Management System; and program code for modifying the one or more set of rules via a multiprotocol data processing communication gateway device communicably coupled to the Energy Storage Module Management System, said multiprotocol data processing communication gateway device further communicably coupled to a consumer web portal.

In another embodiment, a system for selling energy back to a utility power grid, comprises one or more hybrid inverter/converters coupled to an energy storage management system and charge controller module via a data processing gateway such that the data processing gateway implements one or more rule sets for selling energy back to a utility power grid to maximize the selling price of said energy; one or more data processing gateways receiving signals from the energy storage management system and charge controller and sending instructions via processor readable code to implement one or more algorithms; one or more charge controllers electrically coupled to the energy management storage management system to determine requirements for charging and discharging; one or more intelligent battery management systems; one or more energy management devices in a compact footprint not to exceed 18" in depth; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In yet a further embodiment, a computer implemented method including computer usable readable storage medium having computer readable program code for causing a computer system to perform a method of selling energy back to a utility power grid by sending instructions to implement steps including interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining, by the computer system, price points of power obtained from a utility power grid at which a user will discharge energy stored in an energy storage module; defining, by the computer system, a percentage of maximum capacity of stored energy in one or more energy storage modules that may be discharged in a single cycle; correlating, by the computer system, said price points of power with said percentage of maximum capacity; configuring, by the computer system, said price points and said percentage of maximum capacity into one or more sets of rules; and implementing, by the computer system, the one or more set of rules.

In a further embodiment, a computer implemented apparatus for selling energy back to a utility power grid, is an apparatus that comprises a processor; an input device coupled to said processor; a memory coupled to said processor; an output device; and an execution engine including a method for peak shaving to implement steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; and implementing the one or more set of rules.

In another embodiment, a method of peak shaving, comprises providing one or more hybrid inverter/converters; providing one or more data processing gateways; providing one or more charge controllers; providing one or more intelligent battery management systems; providing one or more energy management devices in a compact footprint; connecting an energy management system with one or more integrated alternate energy sources and one or more energy modules storage to a utility grid; monitoring energy demand on said utility grid; calculating an amount of maximum energy that said energy grid can deliver; determining a threshold energy demand on the grid, wherein said threshold energy demand begins to stress one or more components of said utility grid; identifying one or more time periods when the threshold energy demand is met, whereupon identification said energy management system with integrated alternate energy source and energy module storage sends power generated by one or more alternate energy sources to the utility grid; and sending energy to the utility grid until said energy demand falls below said threshold energy demand.

In another embodiment, a system for peak shaving, comprises one or more hybrid inverter/converters; one or more data processing gateways; one or more charge controllers; one or more intelligent battery management systems; one or more energy management devices in a compact footprint; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In another embodiment, a computer implemented method including computer usable readable storage medium having computer readable program code embodied therein for causing a computer system to perform a method of peak shaving, comprises interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining, by the computer system, price points of power obtained from a utility power grid at which a user will discharge energy stored in an energy storage module; defining, by the computer system, a percentage of maximum capacity of stored energy in one or more energy storage modules that may be discharged in a single cycle; correlating, by the computer system, said price points of power with said percentage of maximum capacity; configuring, by the computer system, said price points and said percentage of maximum capacity into one or more sets of rules; and implementing, by the computer system, the one or more sets of rules or algorithms.

In another embodiment, a computer implemented apparatus for providing a method for peak shaving, comprises a processor; an input device coupled to said processor; a memory coupled to said processor; an output device; and an execution engine including steps for implementing a method for peak shaving including interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; and implementing the one or more set of rules.

In another embodiment, a computer readable medium for peak shaving, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for connecting an energy management system with integrated alternate energy source and energy module storage to a utility grid; program code for monitoring energy demand on said utility grid; program code for calculating an amount of maximum energy that said utility grid can deliver; program code for determining a threshold energy demand on the grid, wherein said threshold energy demand begins to stress one or more components of said utility grid; program code for identifying one or more time periods when the threshold energy demand is met, whereupon identification said energy management system with integrated alternate energy source and energy module storage sends power generated by one or more alternate energy sources to the utility grid; and program code for sending energy to the utility grid until said energy demand falls below said threshold energy demand.

BRIEF DESCRIPTION OF THE DRAWINGS

Figure 1A:
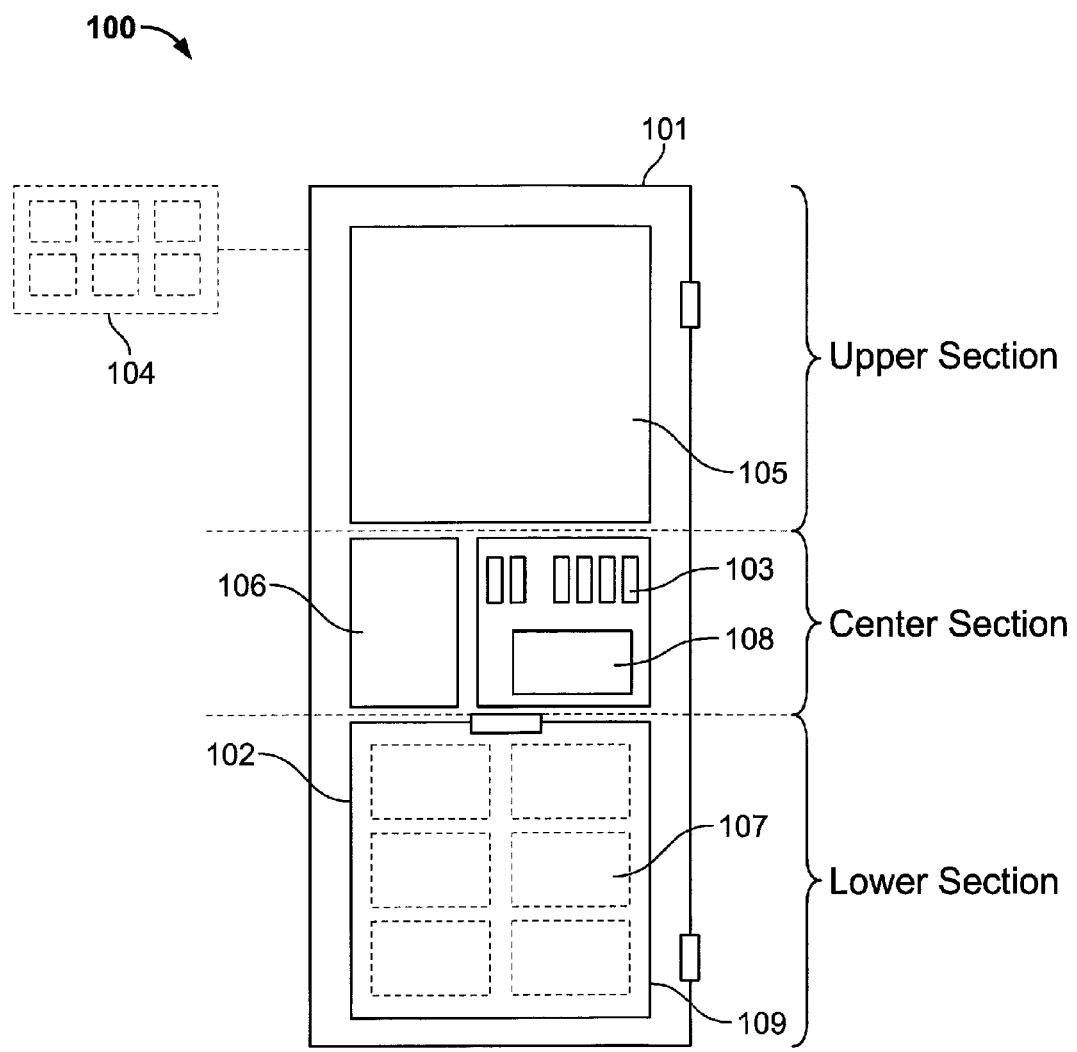

Having thus described the invention in general terms, reference will now be made to the accompanying drawings, which are not necessarily drawn to scale, and wherein:

FIG. 1A is a front view of a solar integrated energy management apparatus.

FIG. 1B is a functional block diagram showing various components of a solar integrated energy management apparatus.

Figure 2A:
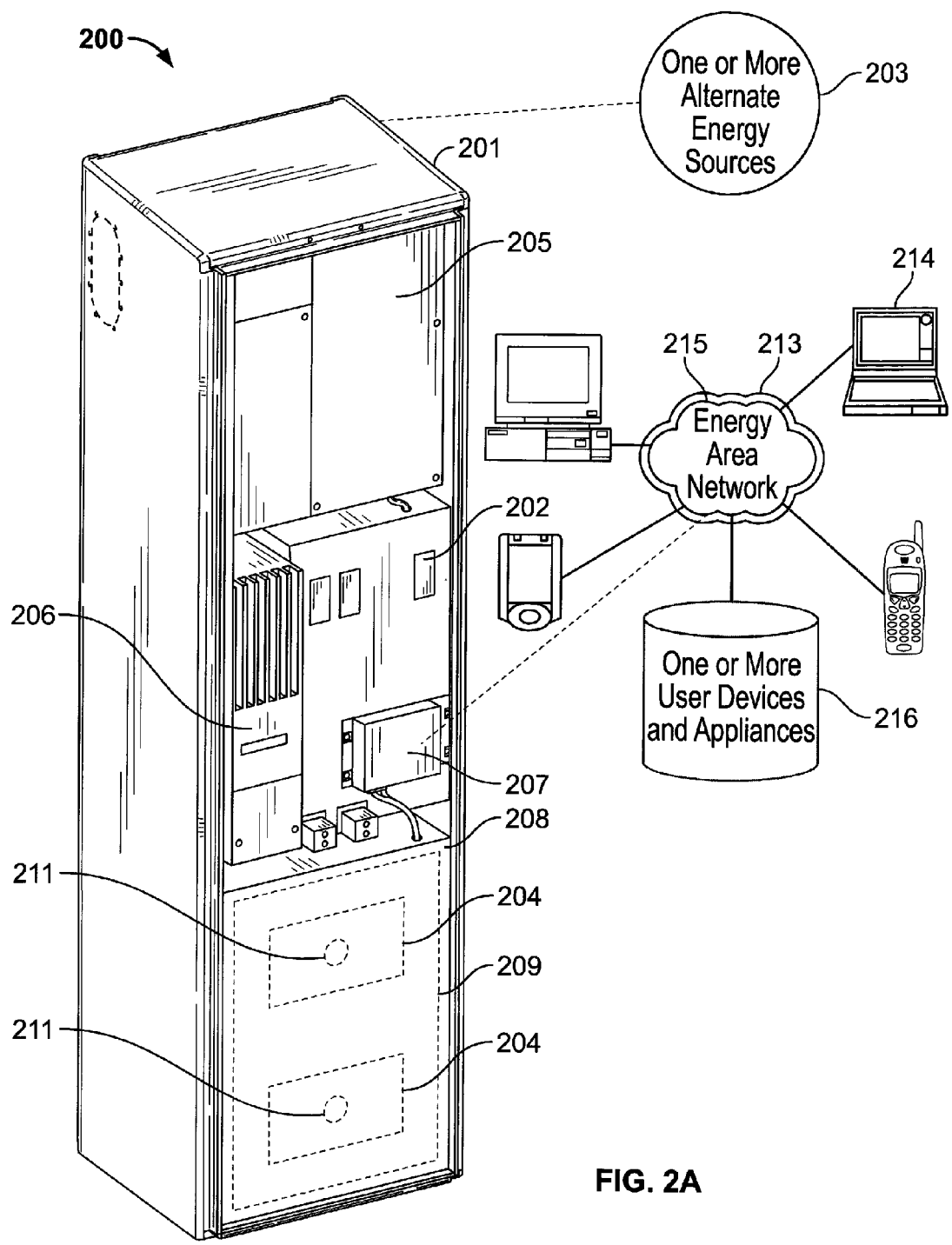

FIG. 2A is a front/side view of an integrated energy management apparatus.

Figure 2B:
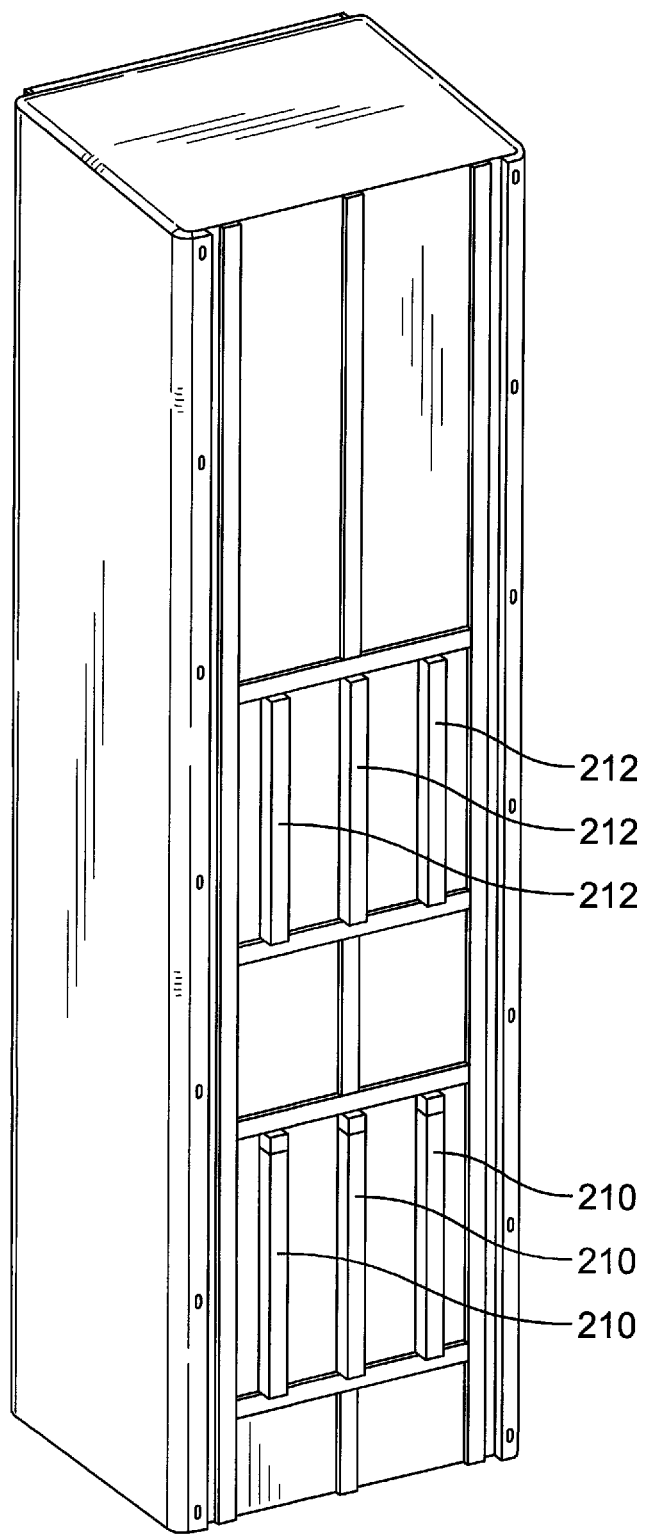

FIG. 2B is a back view of an integrated energy management apparatus

Figure 3A:
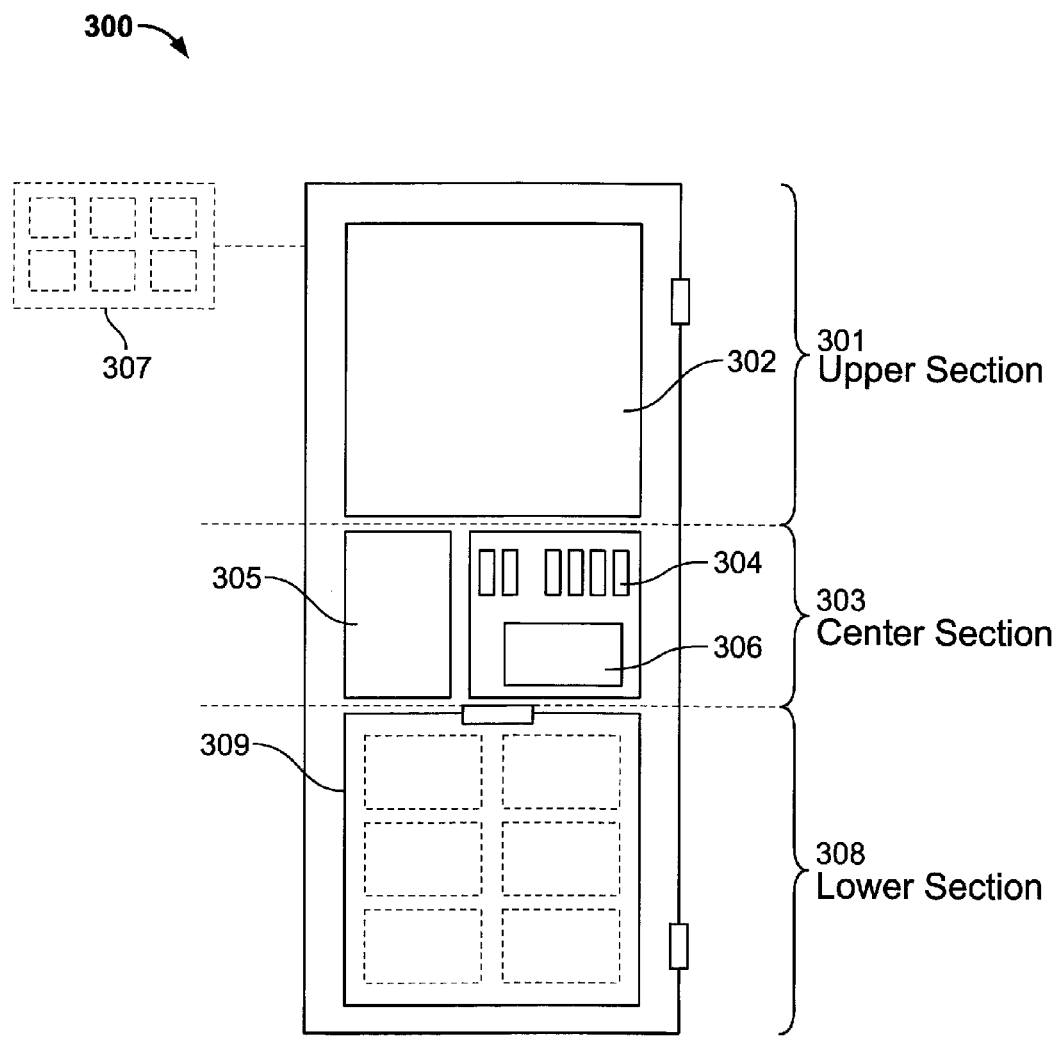

FIG. 3A is a front view of a solar integrated system enclosure.

Figure 3B:
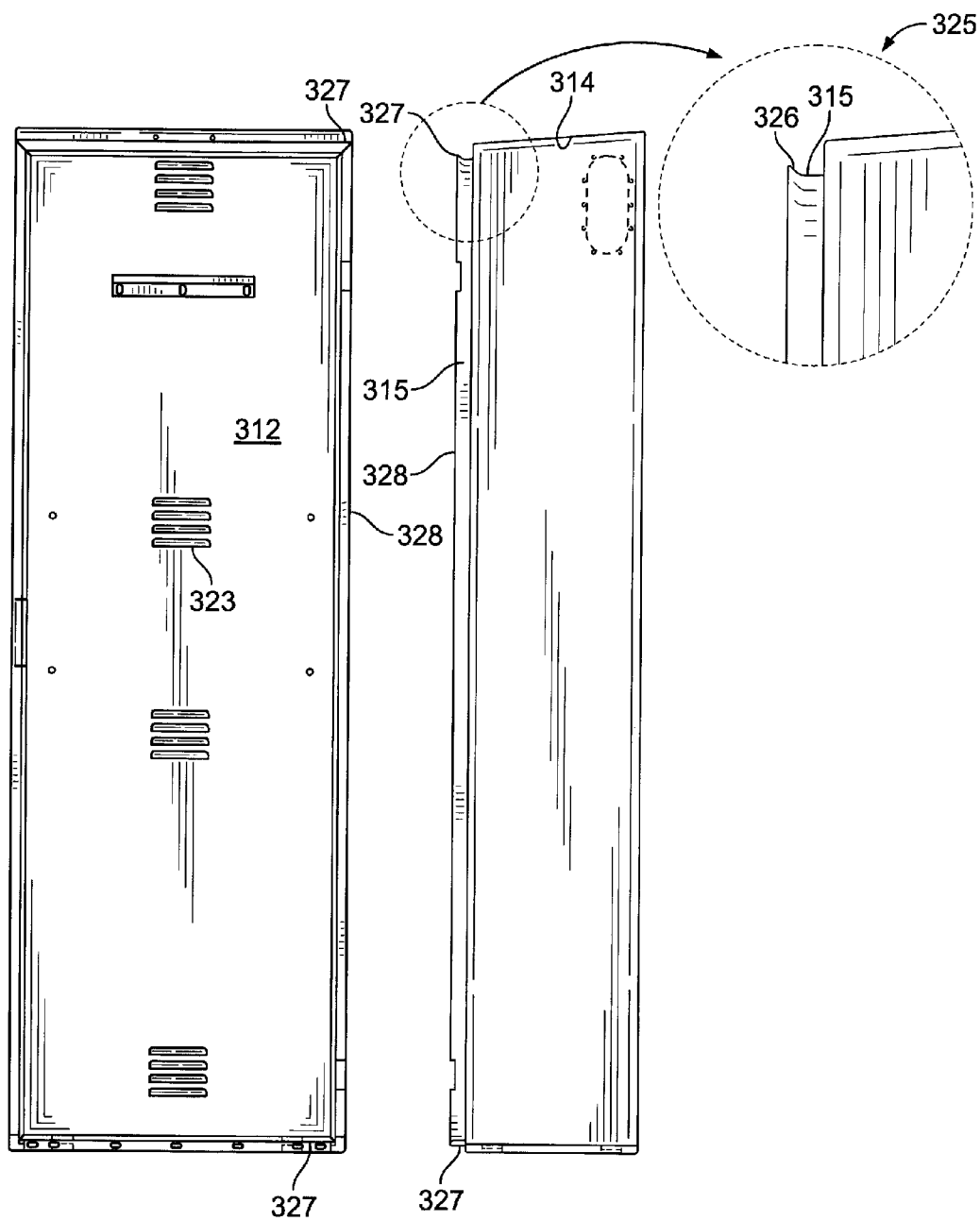

FIG. 3B is a side view of a solar integrated system enclosure.

Figure 3C:
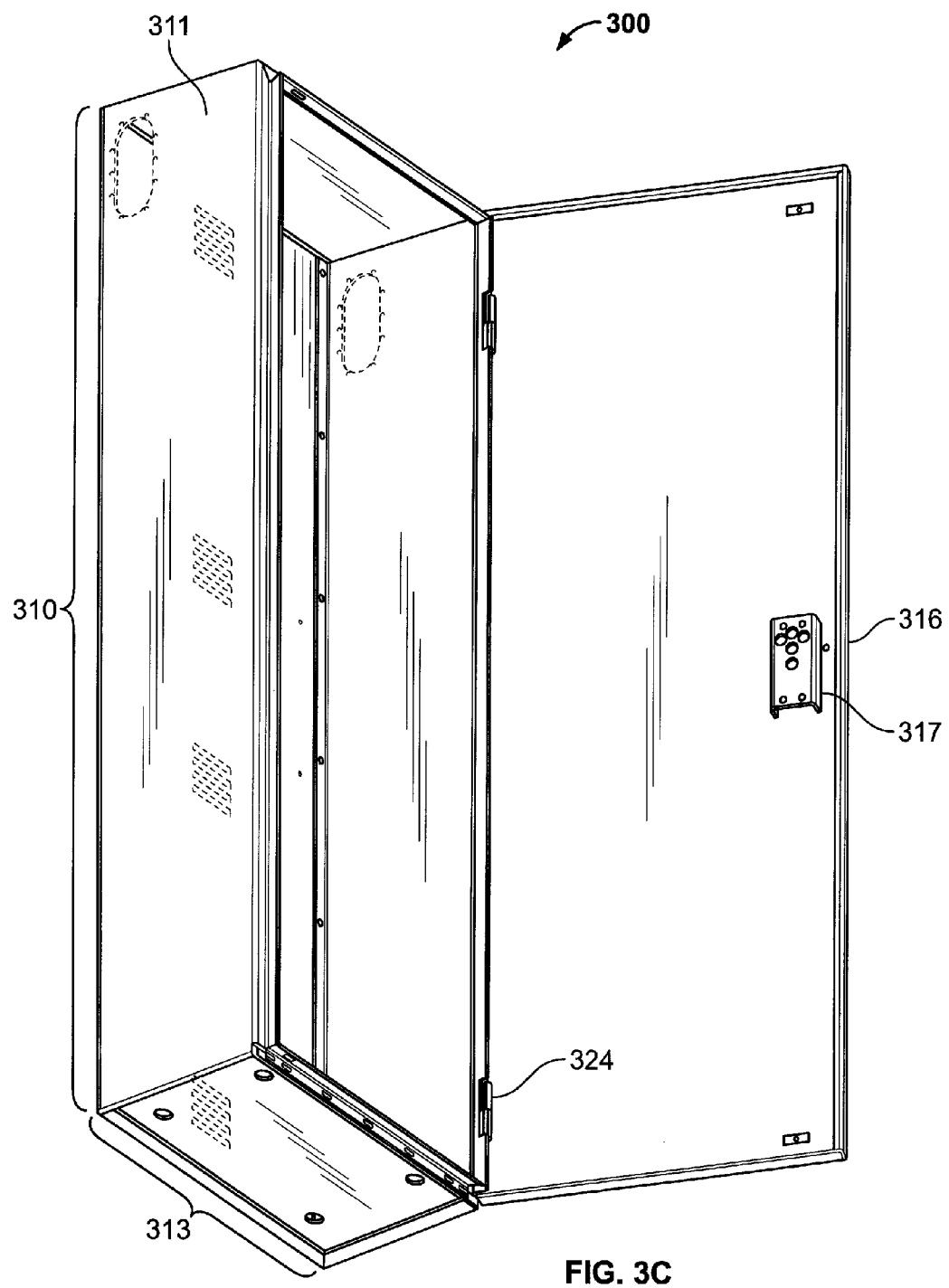

FIG. 3C is a perspective view of a solar integrated system enclosure.

Figure 3D:
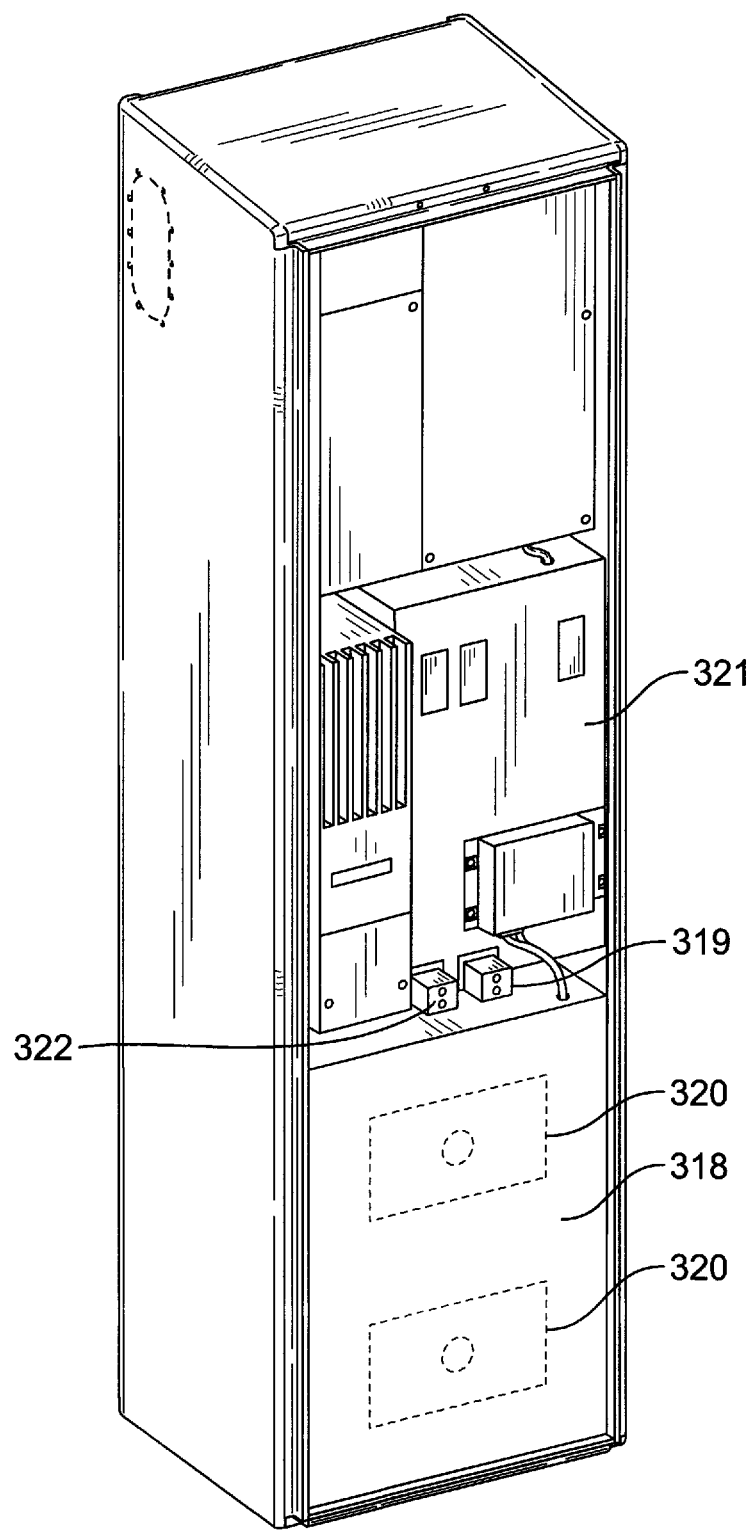

FIG. 3D is a front/side view of a solar integrated system enclosure.

Figure 4:
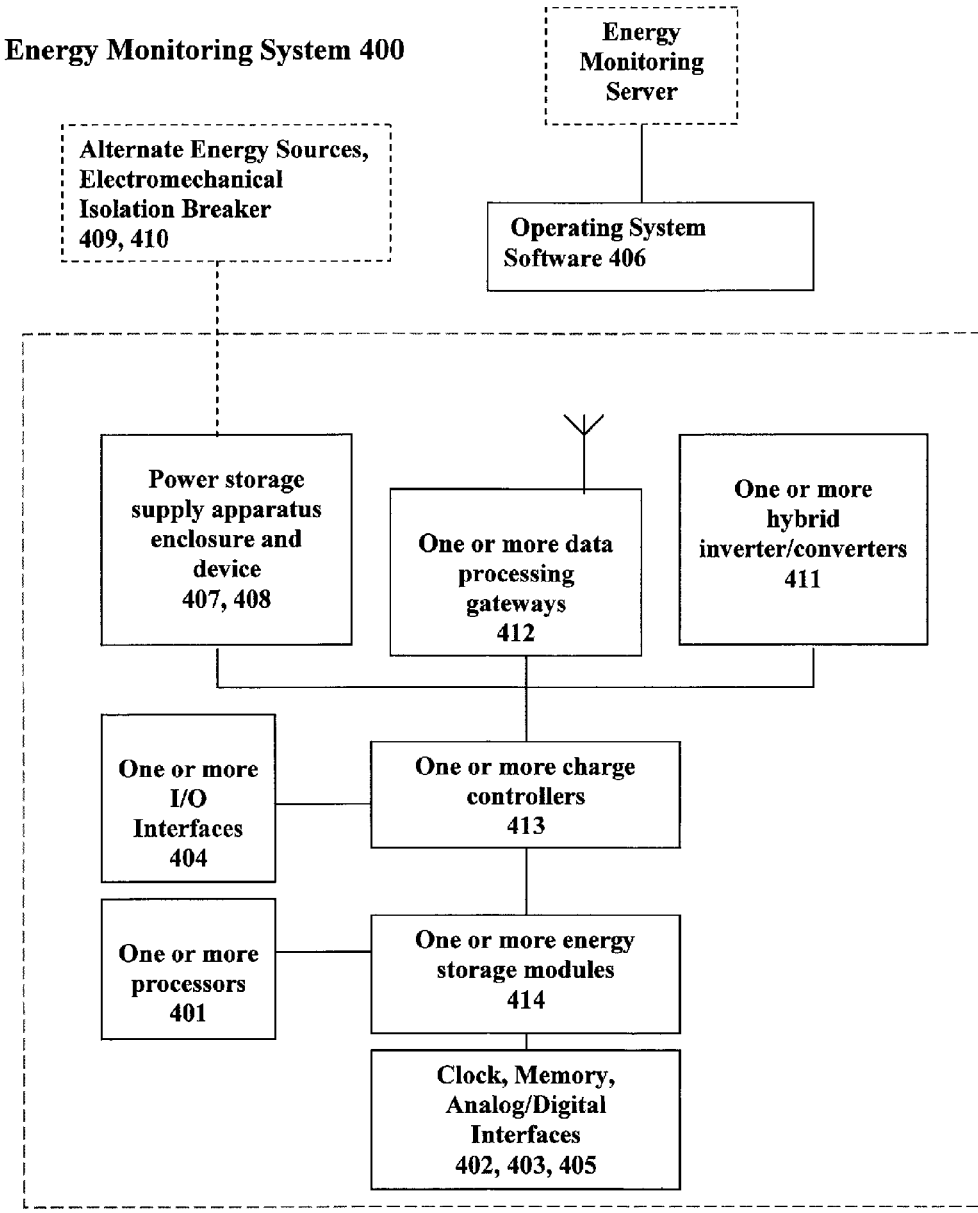

FIG. 4 is a functional block diagram of an energy monitoring system.

Figure 5:
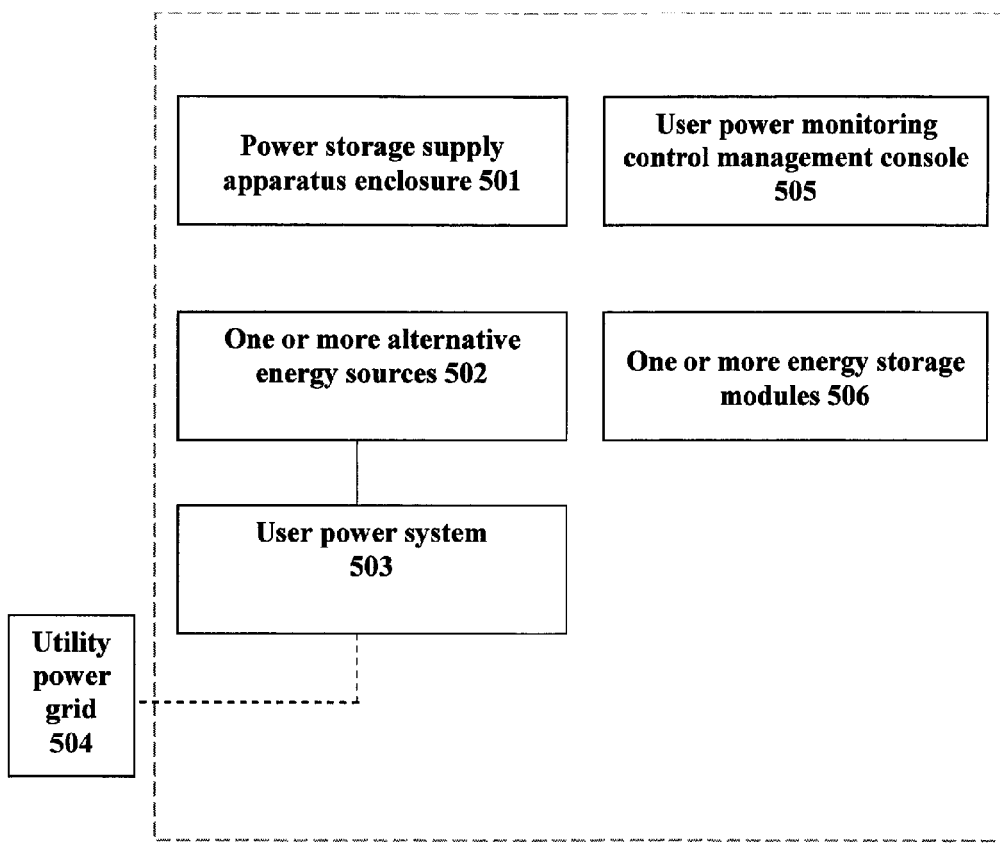

FIG. 5 is a functional block diagram of a solar integrated energy management system.

Figure 6:
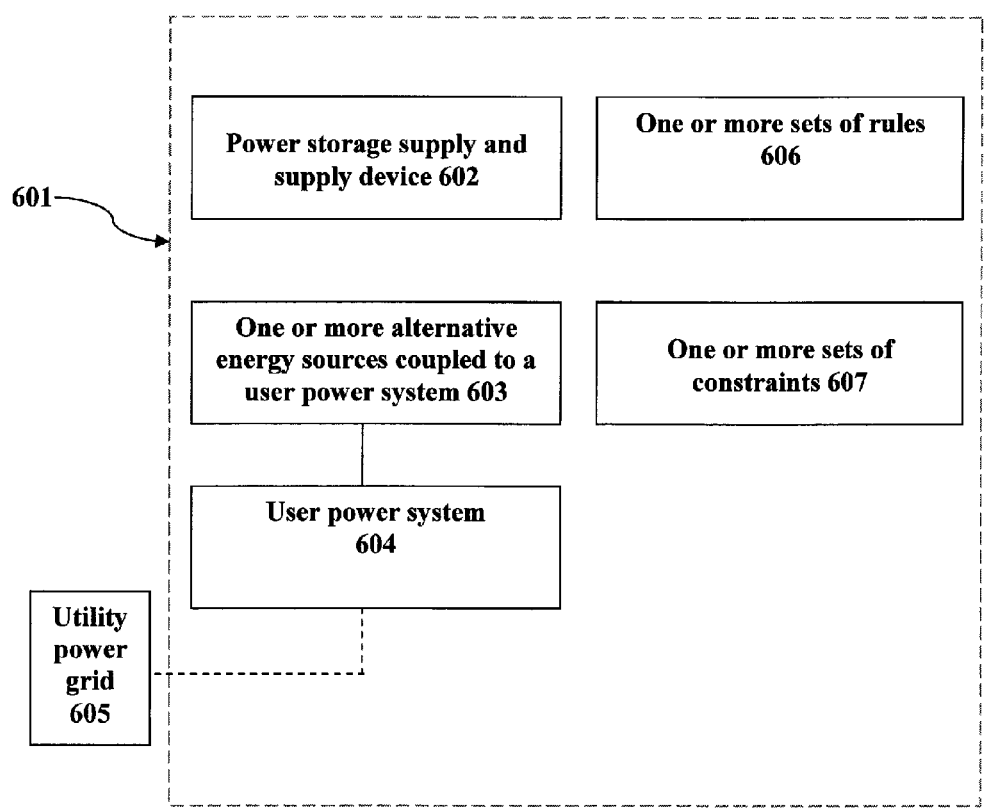

FIG. 6 is a functional block diagram of an energy management system for governing energy management resources.

Figure 7A:
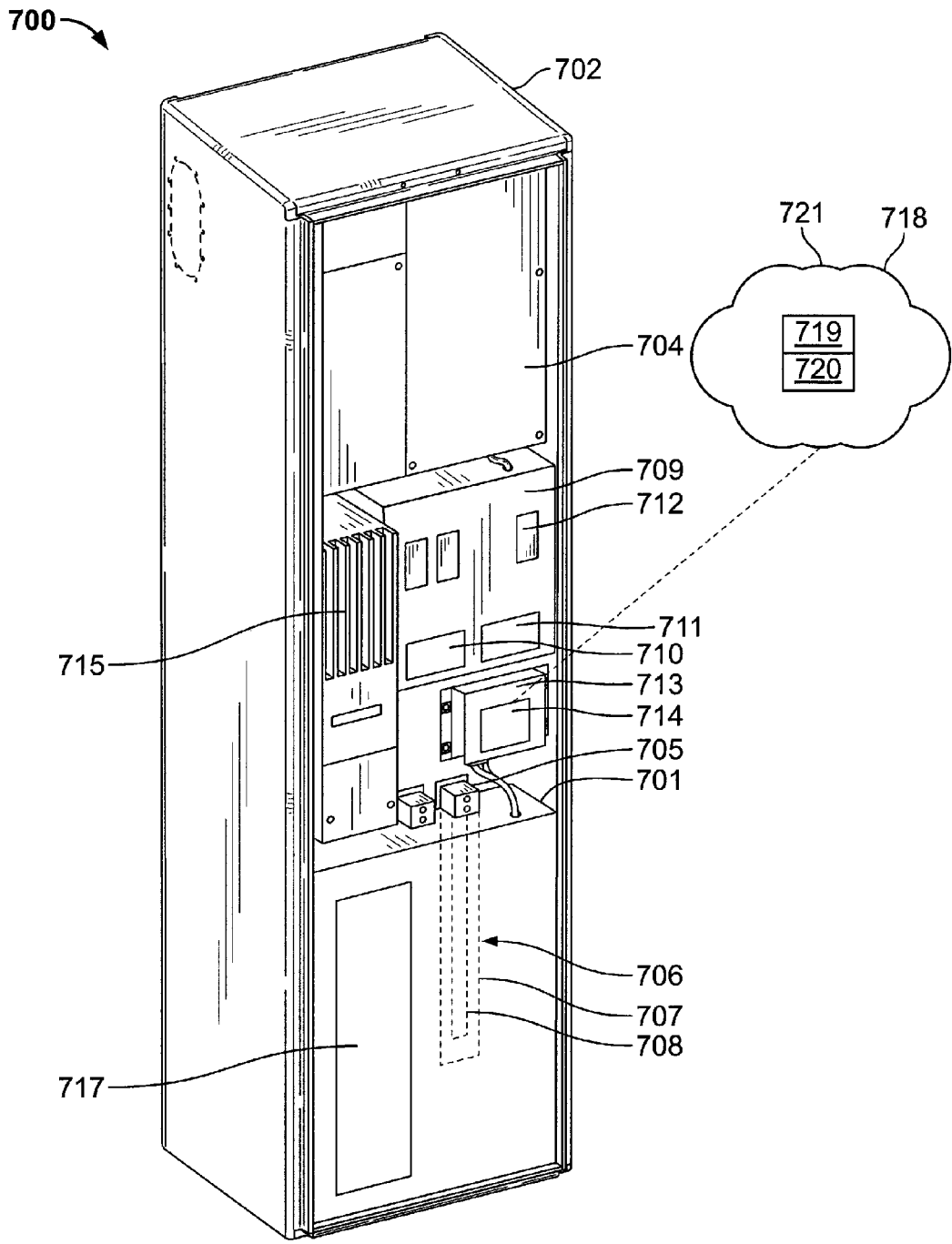
Figure 7B:
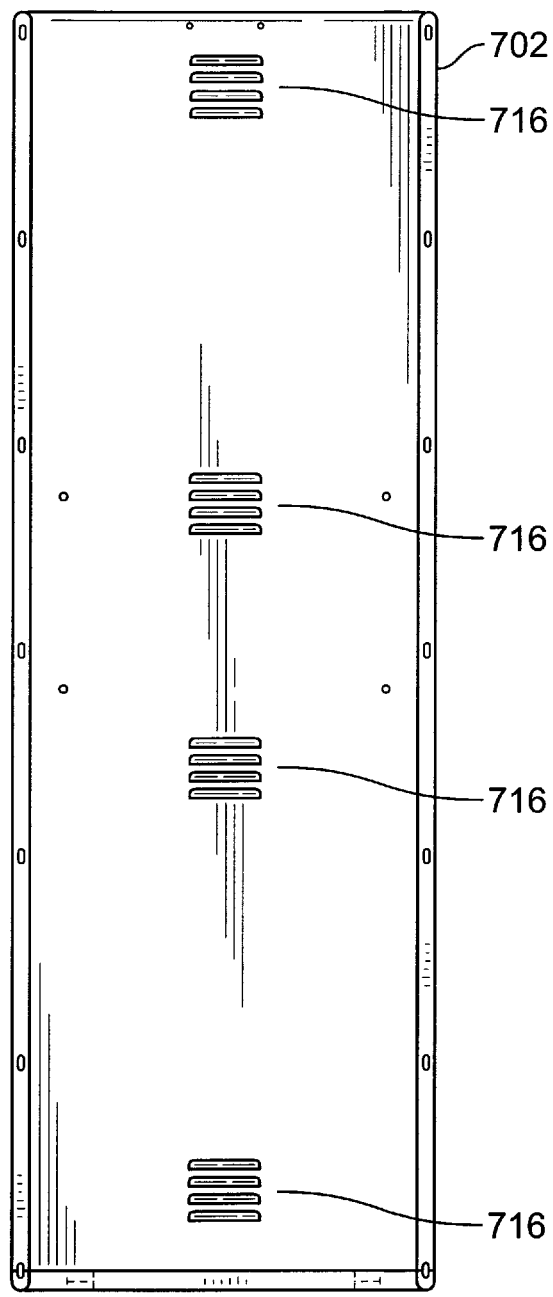

FIG. 7A is a front/side view of an intelligent energy storage module management system FIG. 7B is face-on view of an intelligent energy storage module management system.

Figure 8:
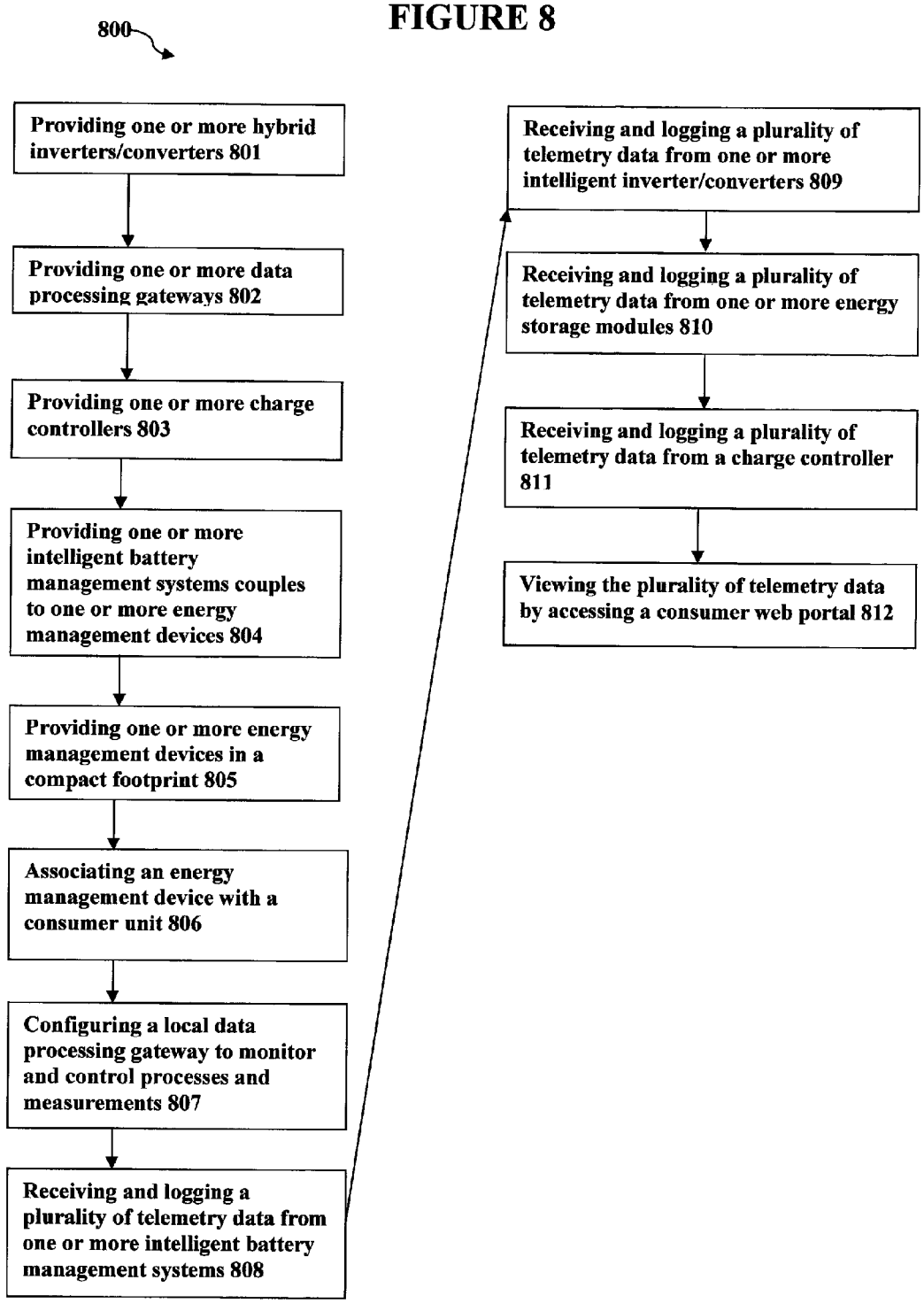

FIG. 8 is a flow chart for a method for monitoring energy consumption.

Figure 9:
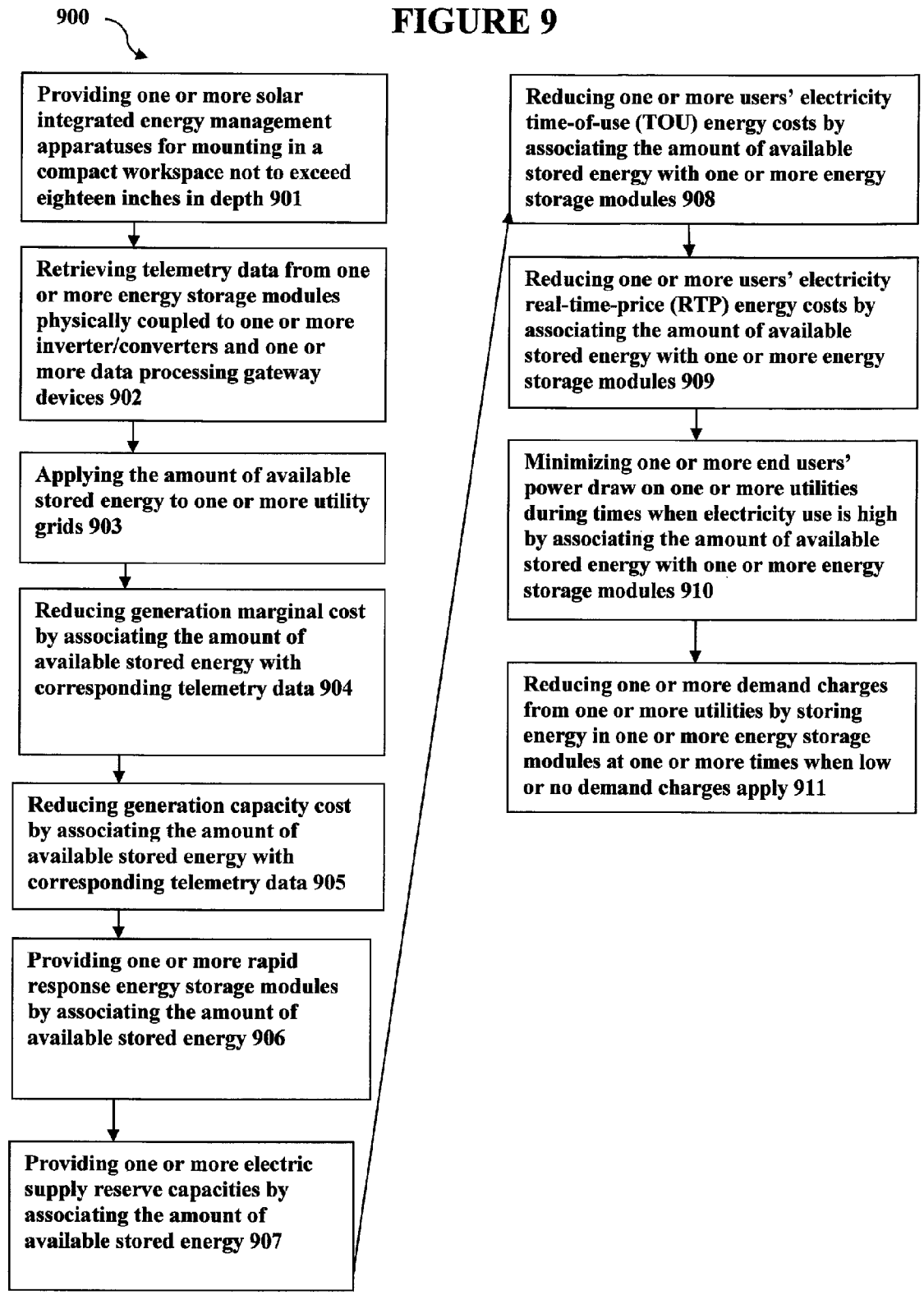

FIG. 9 is a flow chart for a method for providing wholesale energy services.

Figure 10:
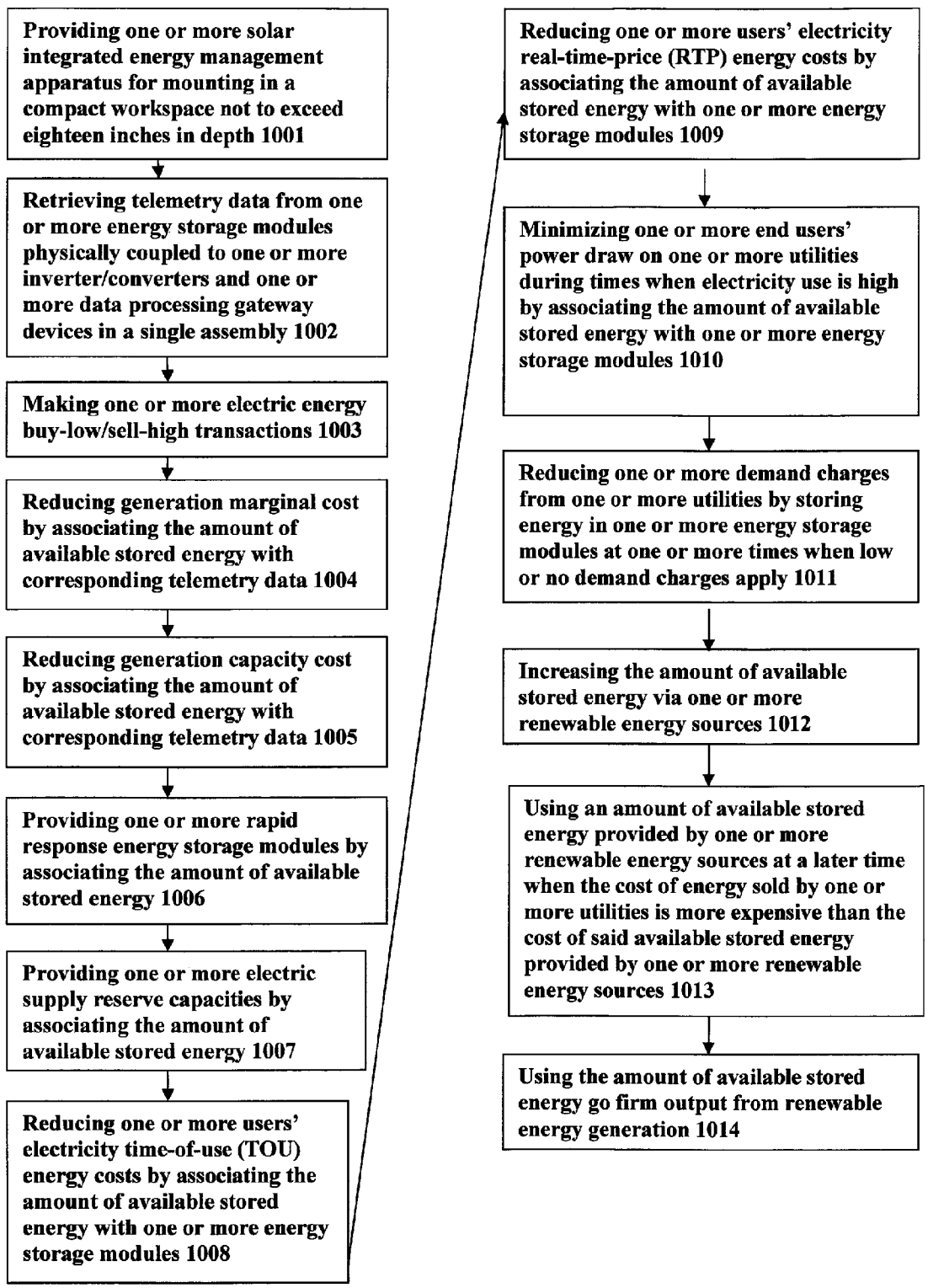

FIG. 10 is a flow chart for a method for providing renewable integration.

Figure 11:
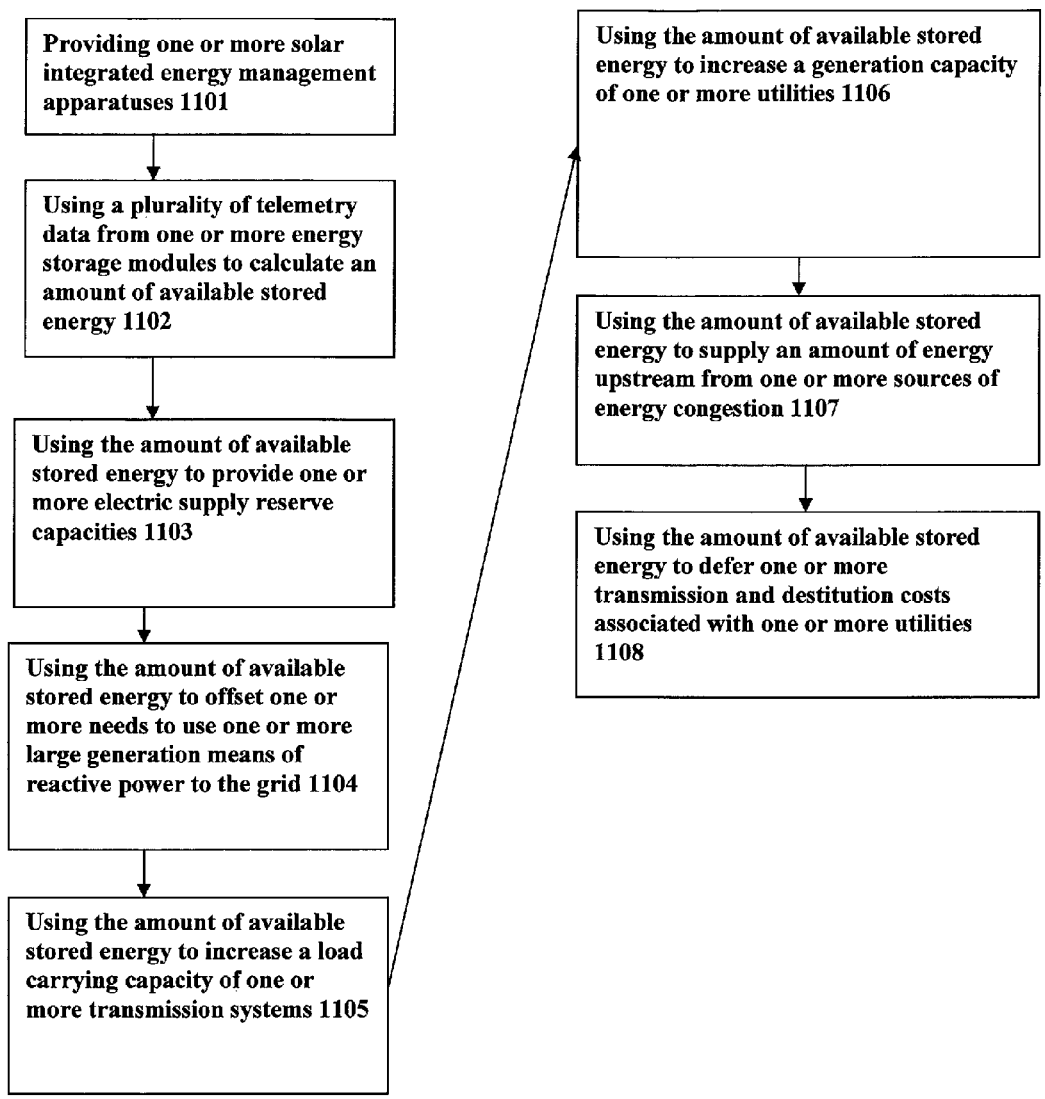

FIG. 11 is a flow chart for a method for providing stationary storage for transmission and distribution support.

Figure 12:
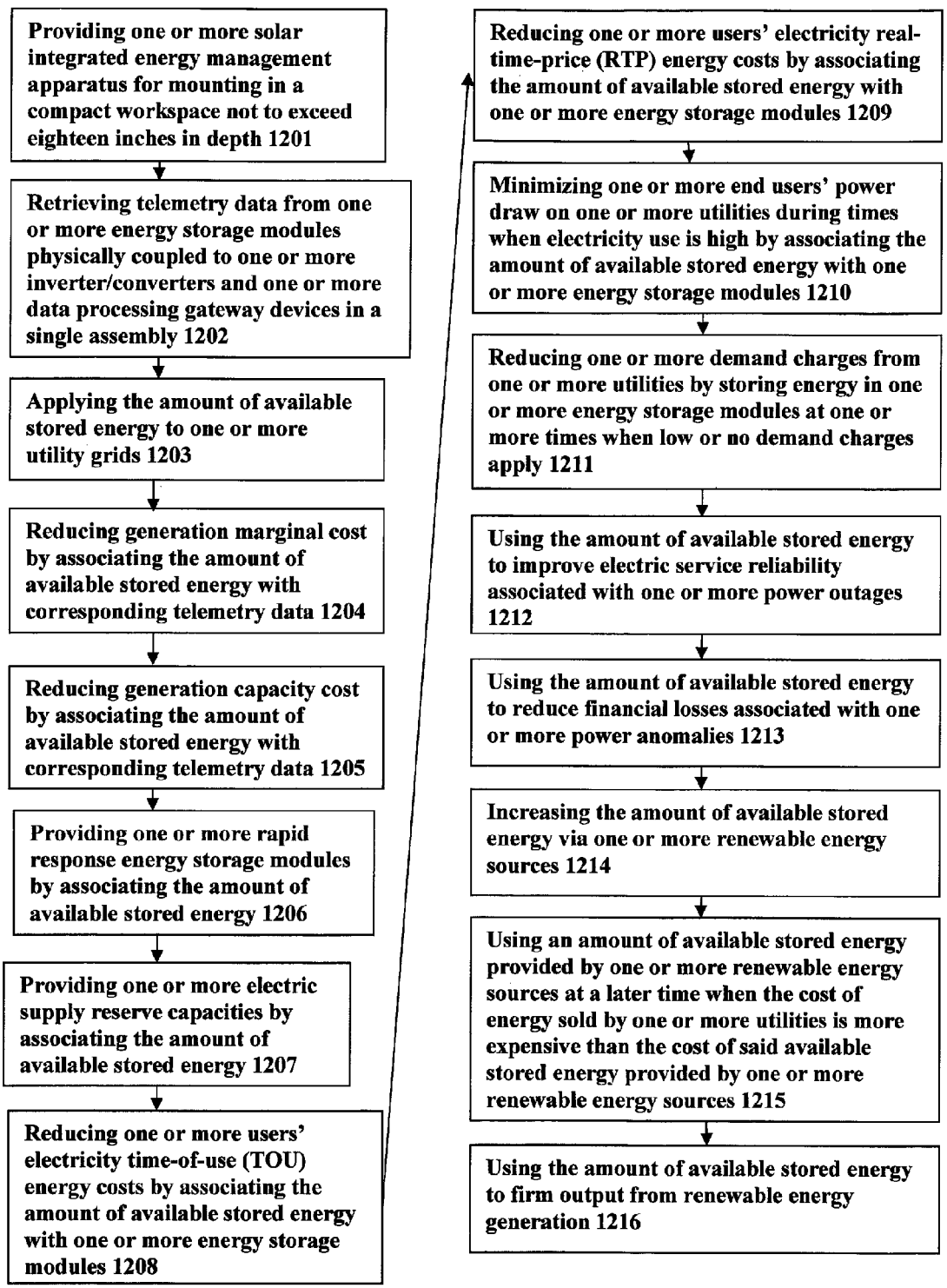

FIG. 12 is a flow chart for a method for providing distributed energy storage systems.

Figure 13:
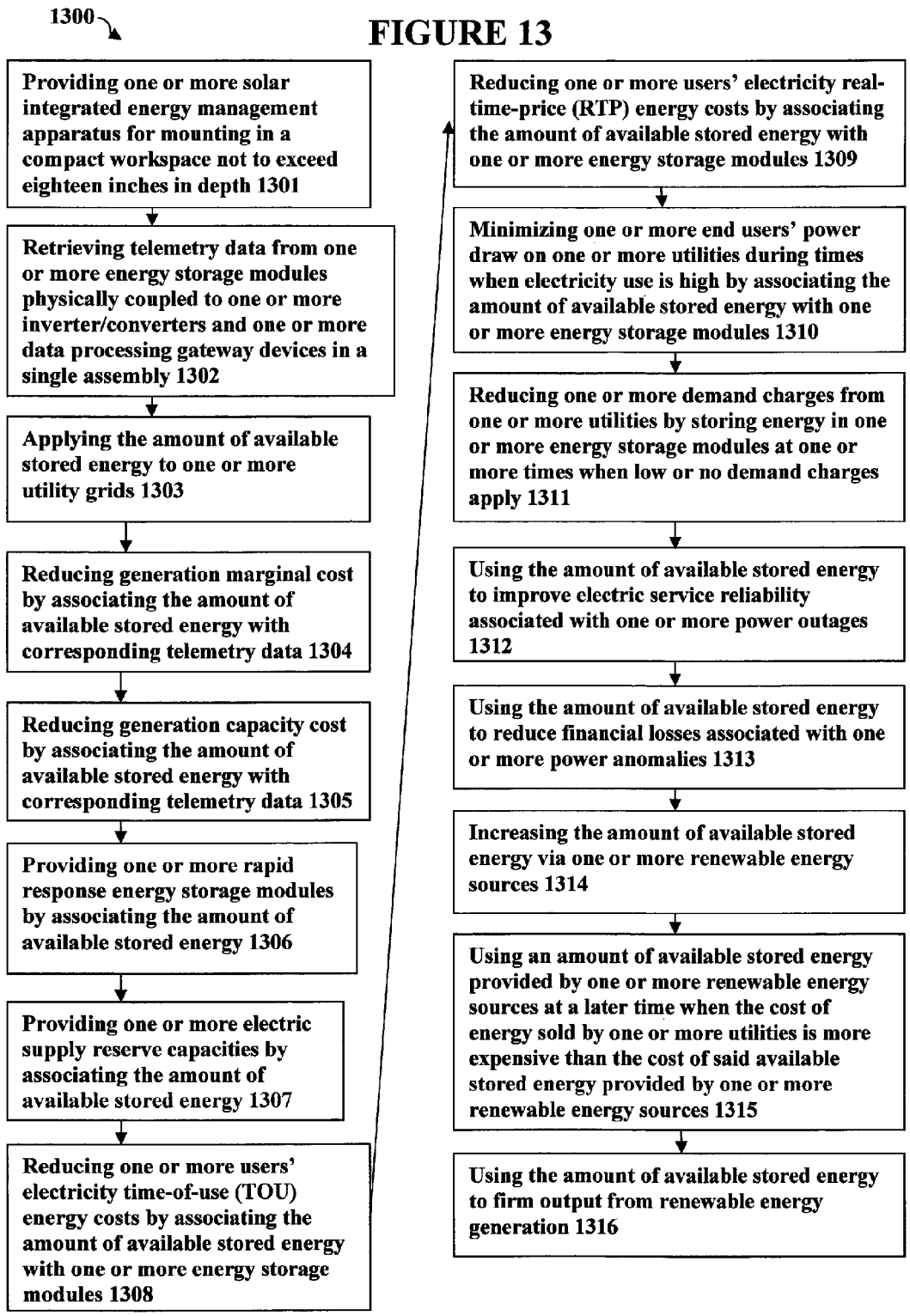

FIG. 13 is a flow chart for a method for providing energy saving companies.

Figure 14:
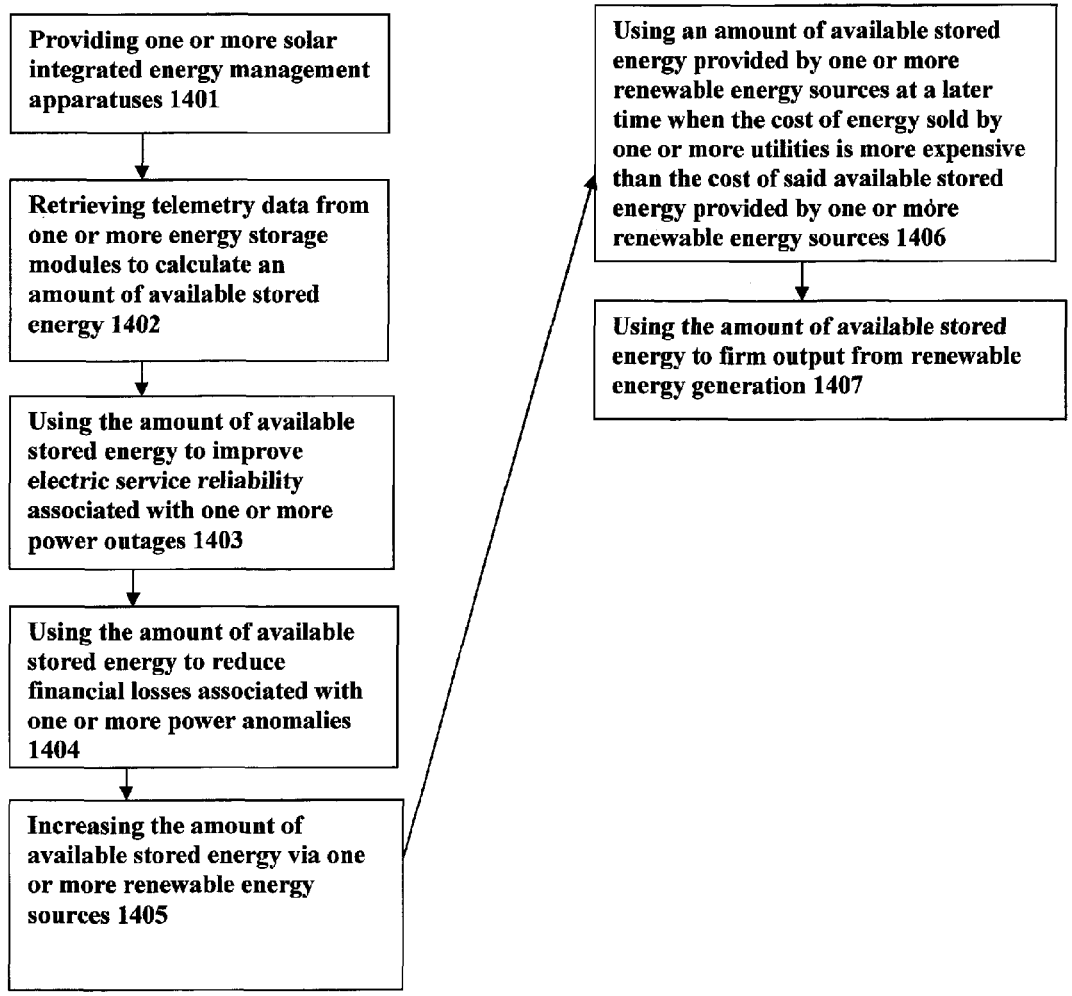

FIG. 14 is a flow chart for a method for providing power quality and reliability.

Figure 15:
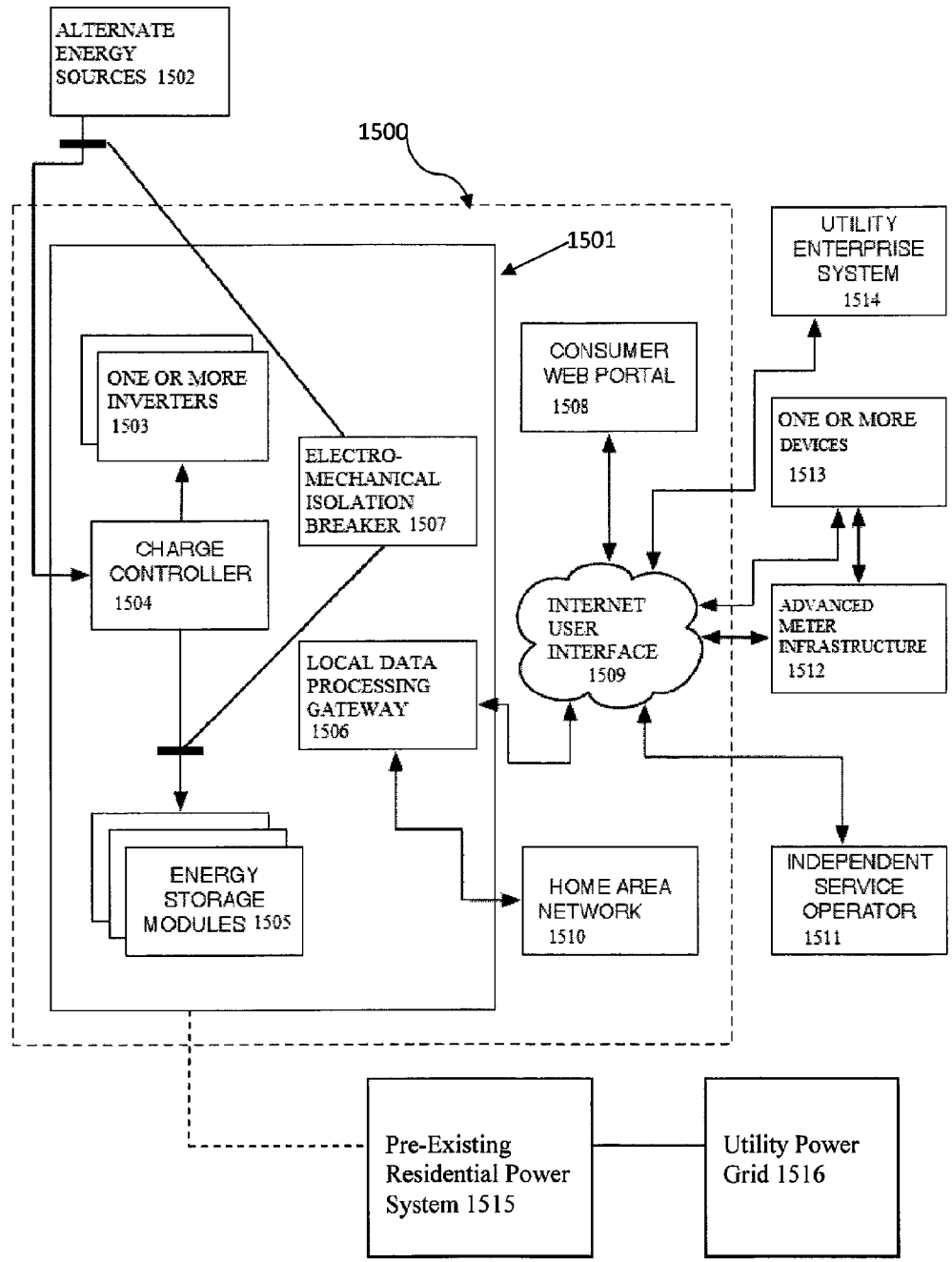

FIG. 15 is a functional block diagram showing the energy management system with integrated solar and storage.

Figure 16:
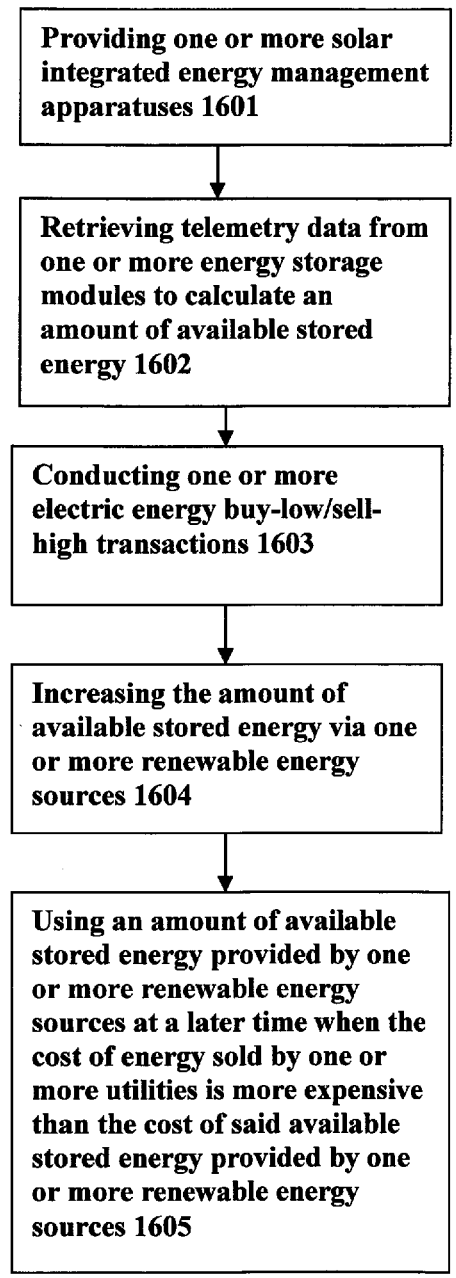

FIG. 16 is a flow chart for a method for providing energy management.

Figure 17:
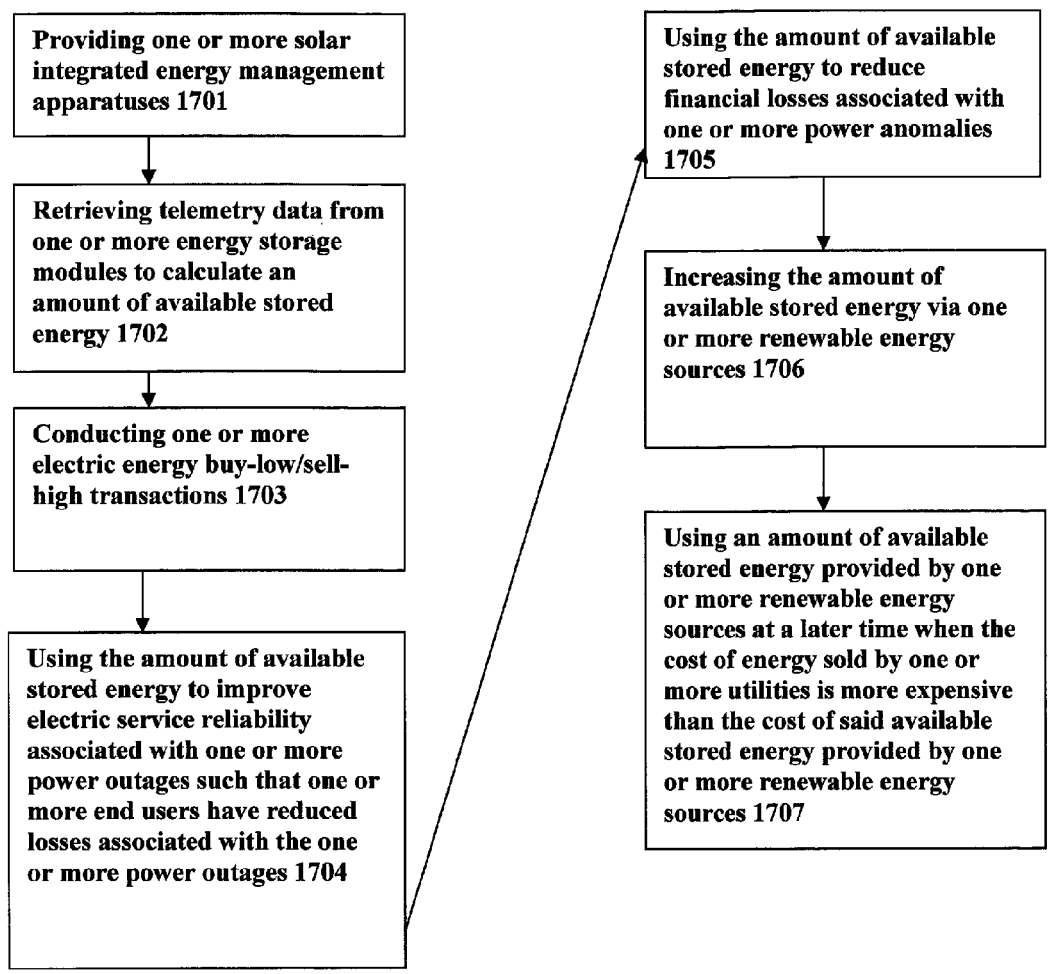

FIG. 17 is a flow chart for a method for providing home energy management.

Figure 18:
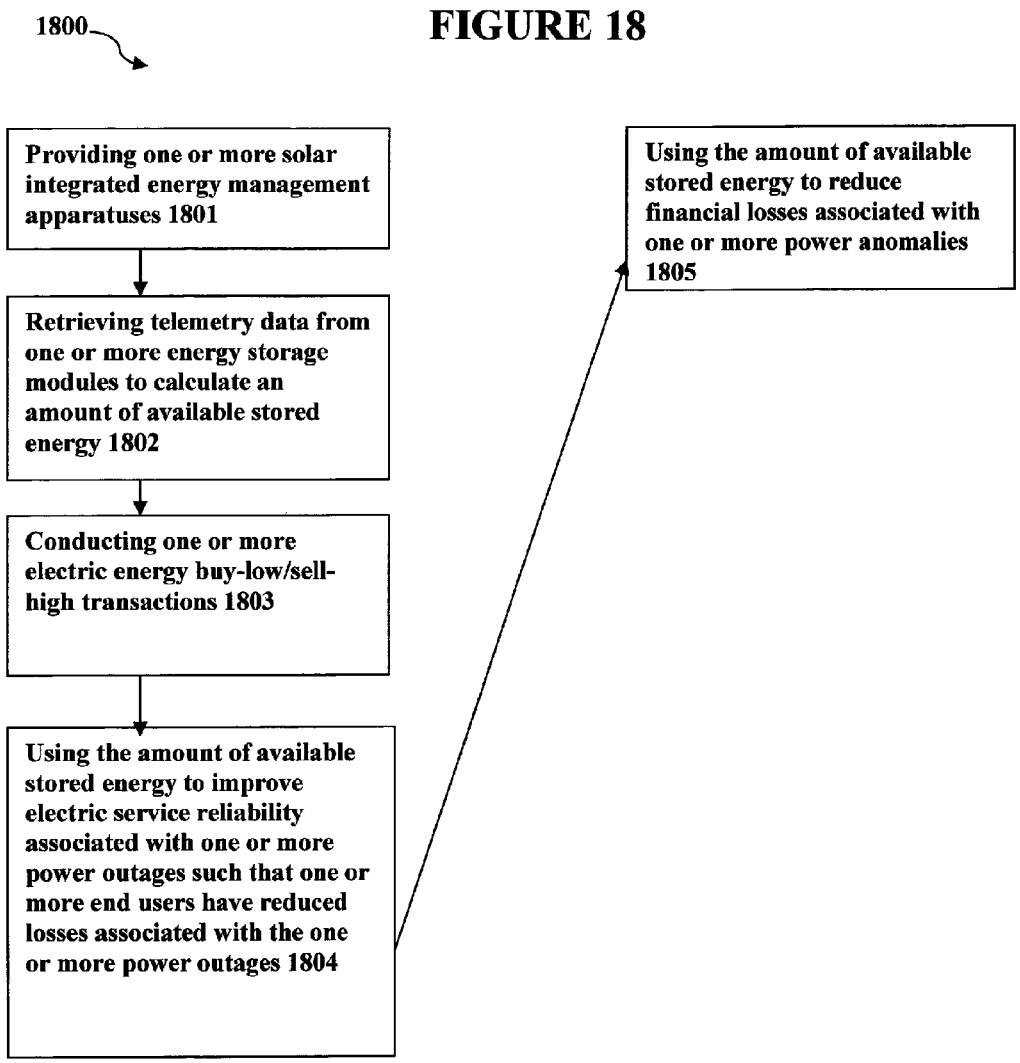

FIG. 18 is a flow chart for a method for providing home backup.

Figure 19:
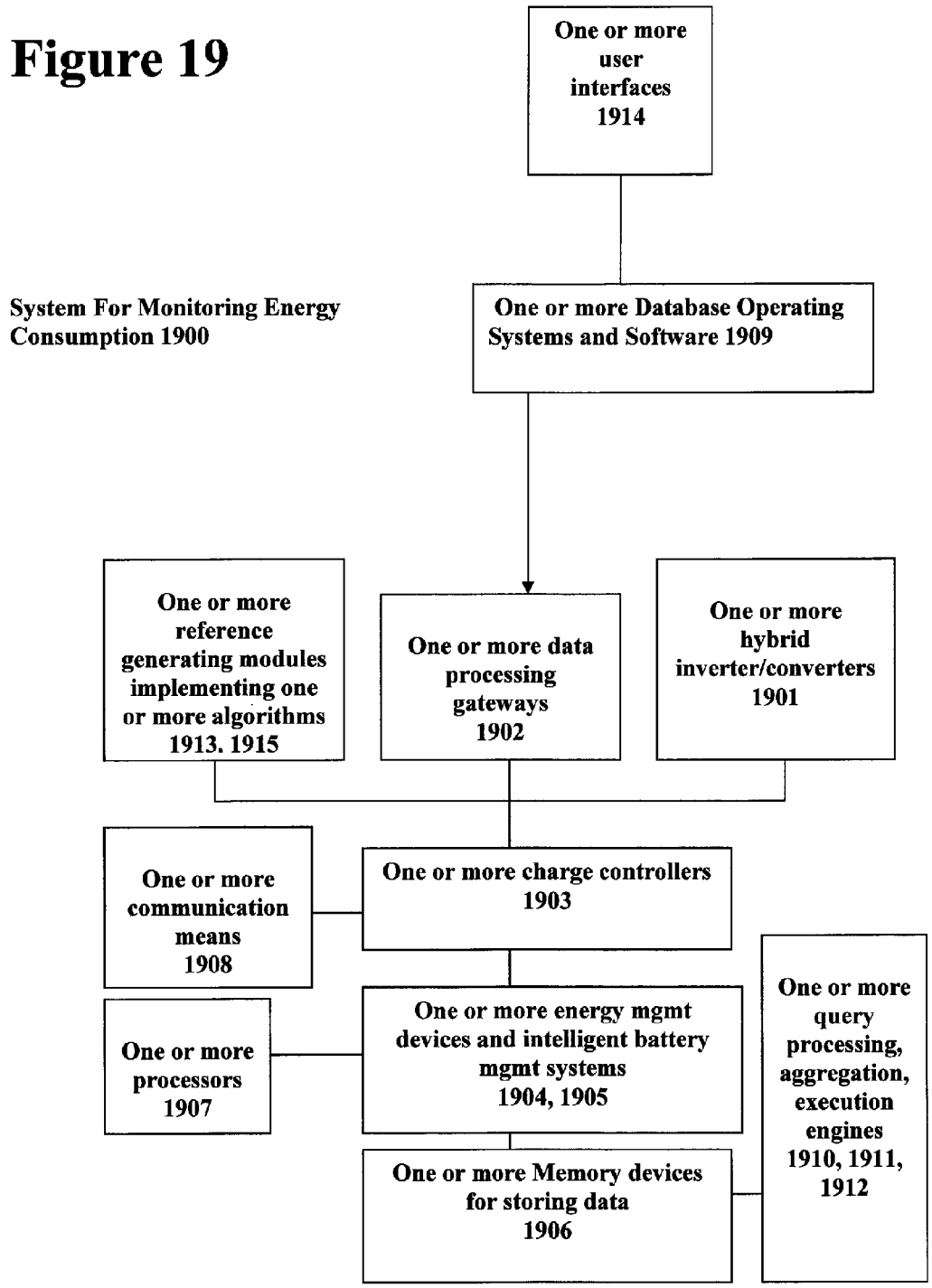

FIG. 19 is a functional block diagram showing a system for monitoring energy consumption.

Figure 20:
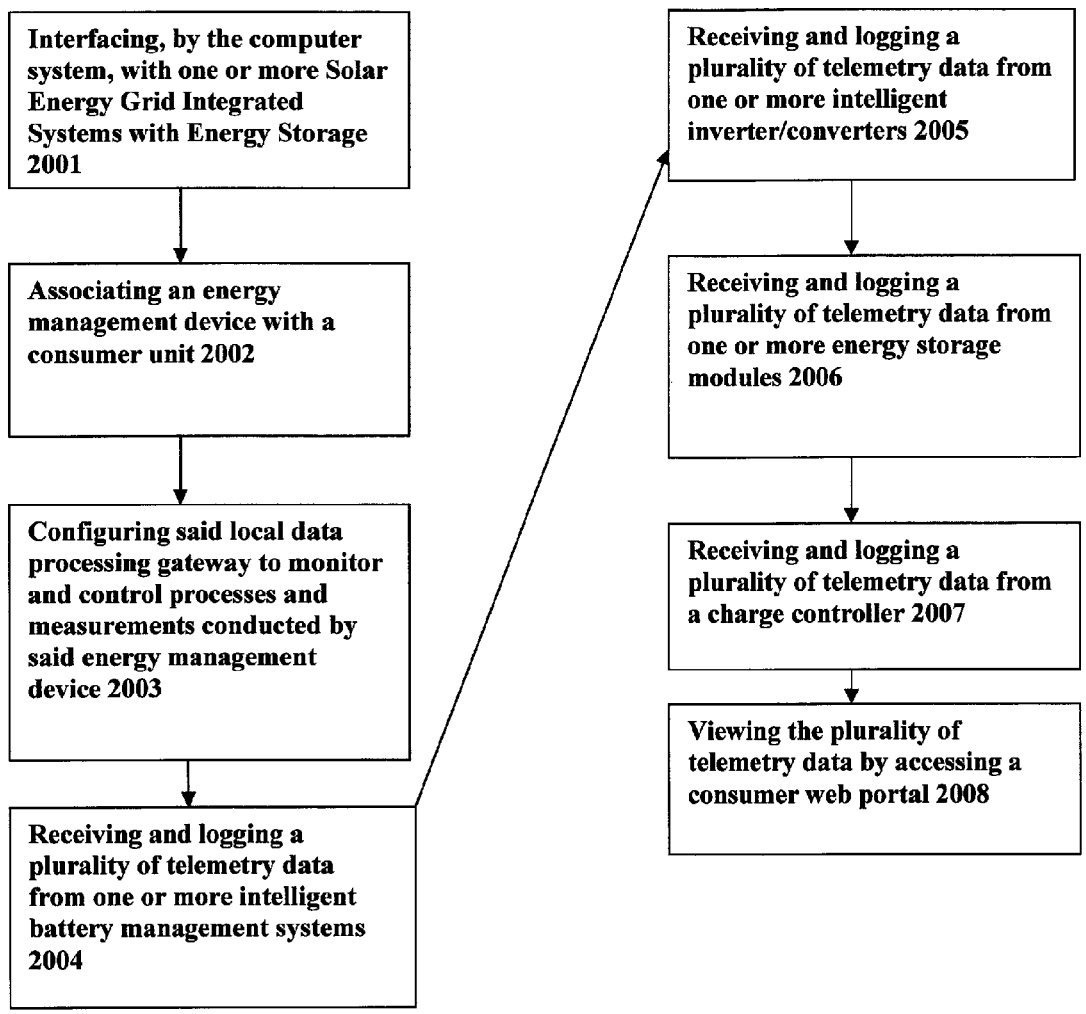

FIG. 20 is a flow chart for a computer implemented method for causing a computer system to perform a method of monitoring energy consumption.

Figure 21A:
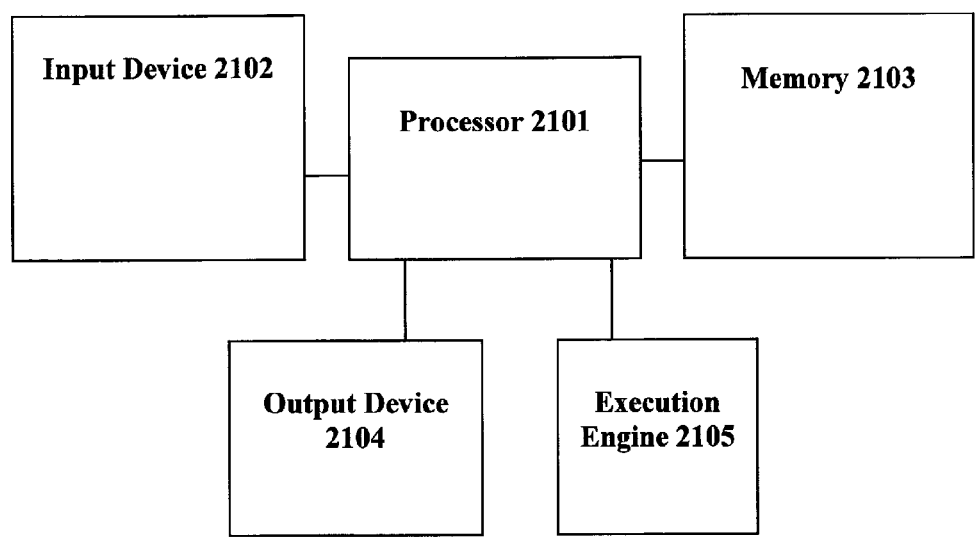

FIG. 21A is a functional block diagram showing a computer implemented apparatus for providing a method for monitoring energy consumption.

FIG. 21B is a flow chart for a computer implemented apparatus for providing a method for monitoring energy consumption.

Figure 22:
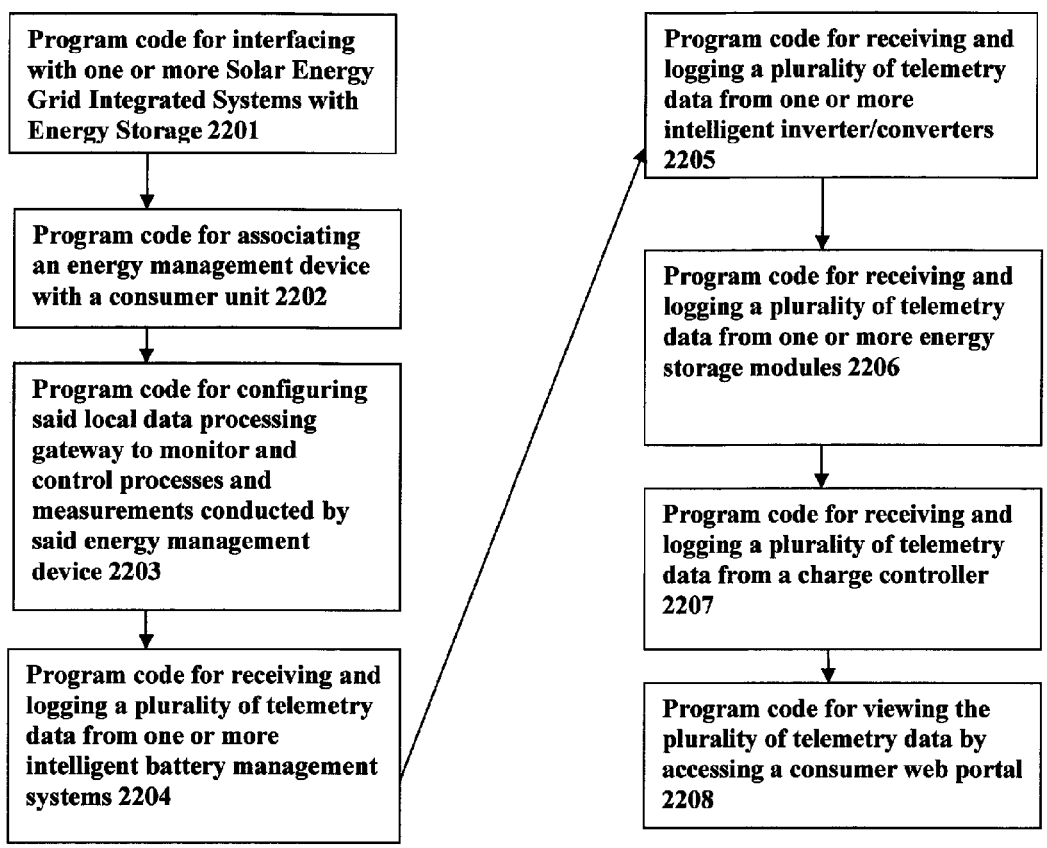

FIG. 22 is a flow chart for a computer readable medium for monitoring energy consumption.

Figure 23:
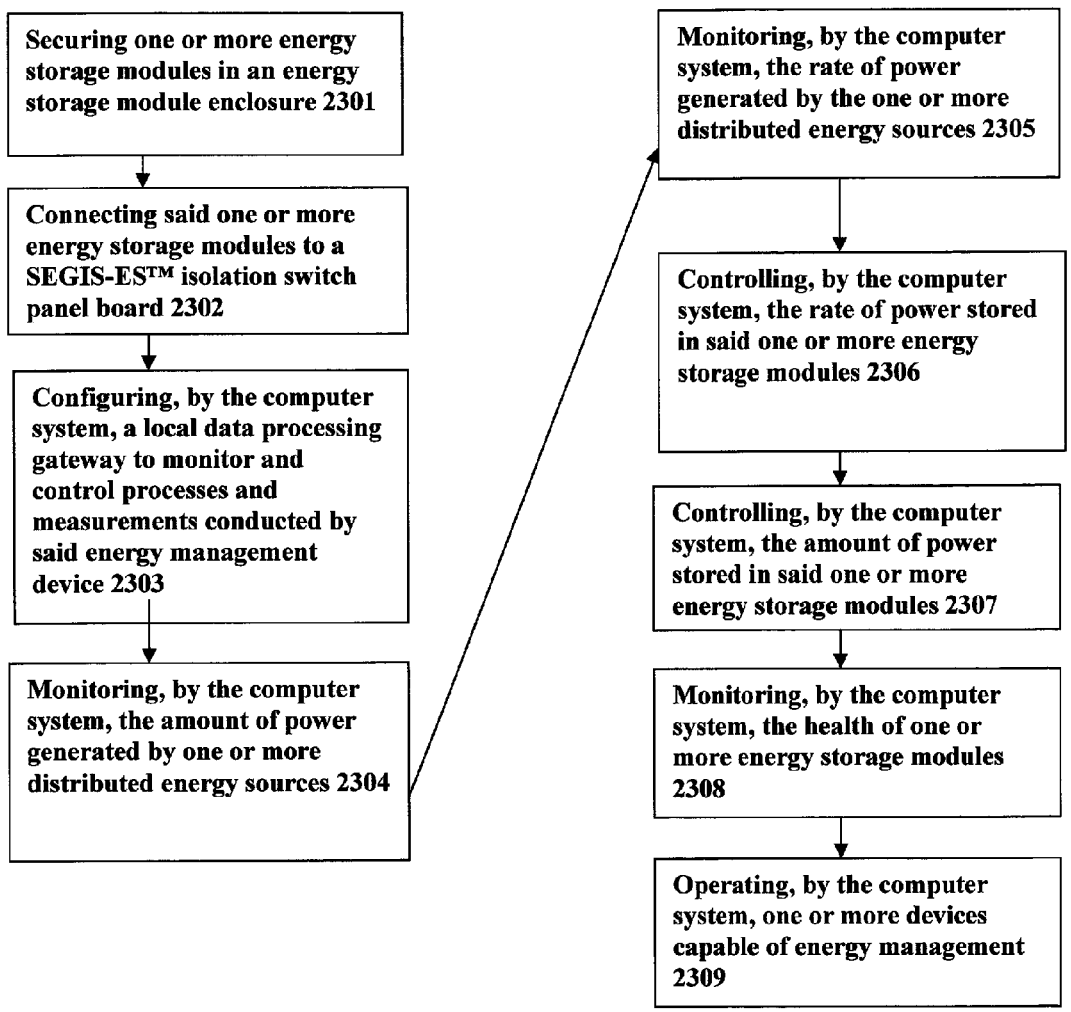

FIG. 23 is a flow chart for a computer implemented method for causing a computer system to perform a method of storing excess energy generated in an energy management device in an application platform.

Figure 24:
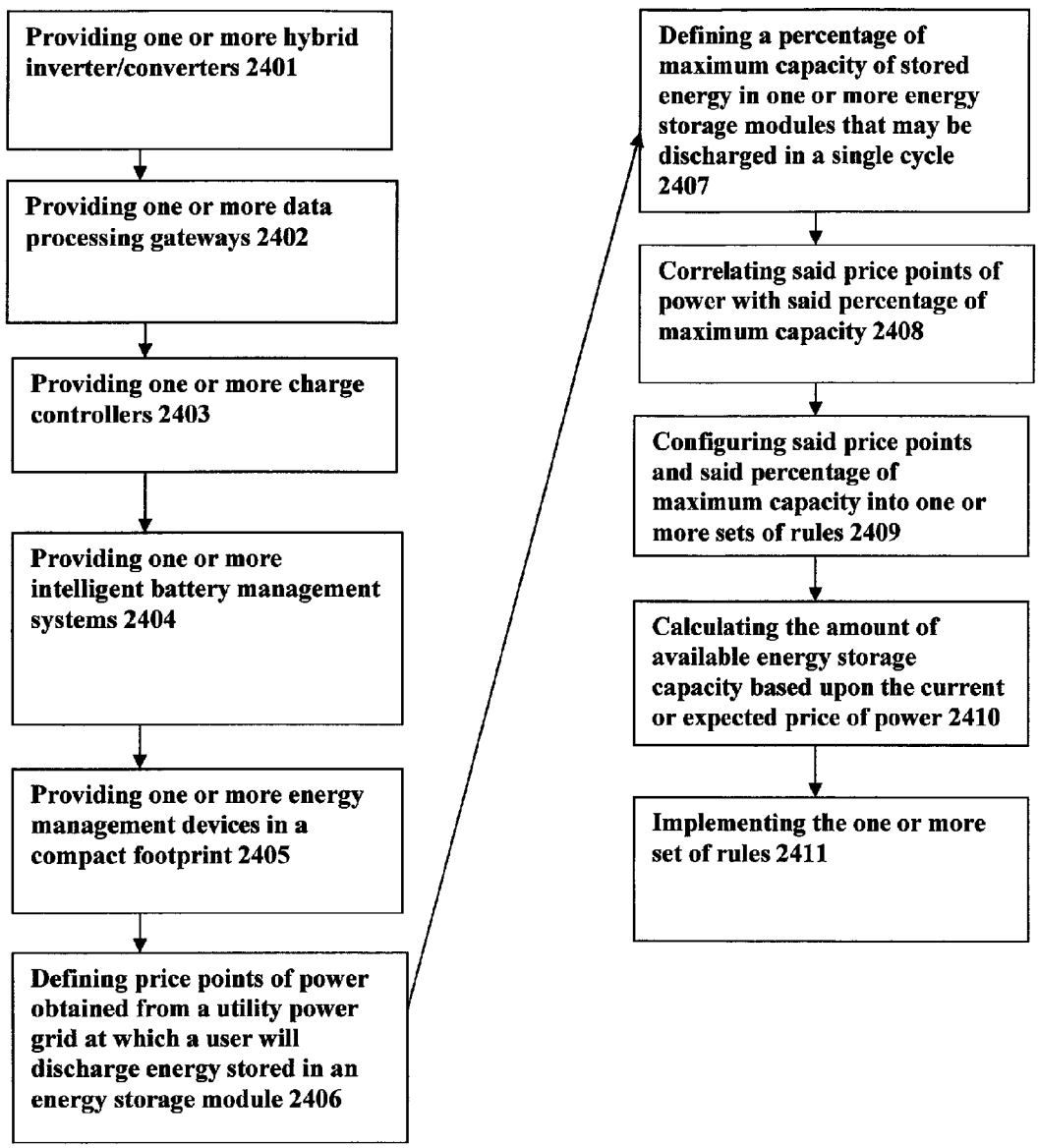

FIG. 24 is a flow chart for a method for selling energy back to a utility power grid.

Figure 25:
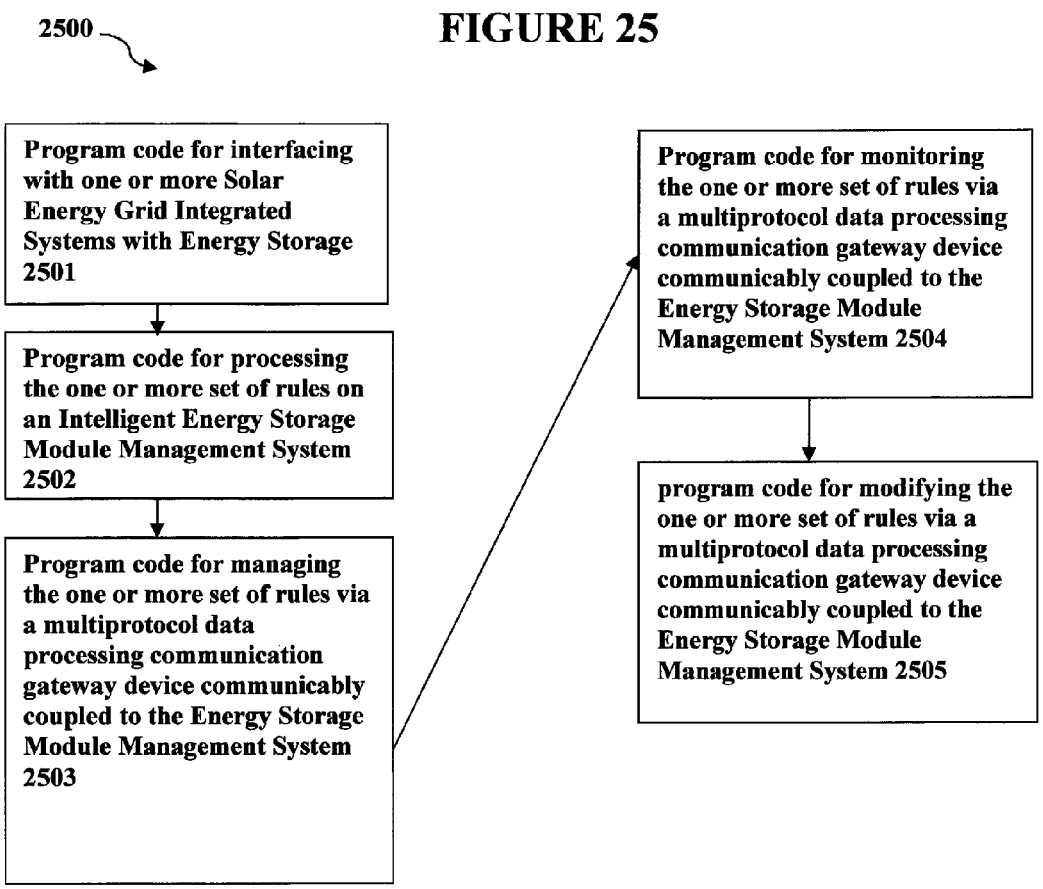

FIG. 25 is a flow chart for a computer readable medium for selling energy back to a utility power grid.

Figure 26:
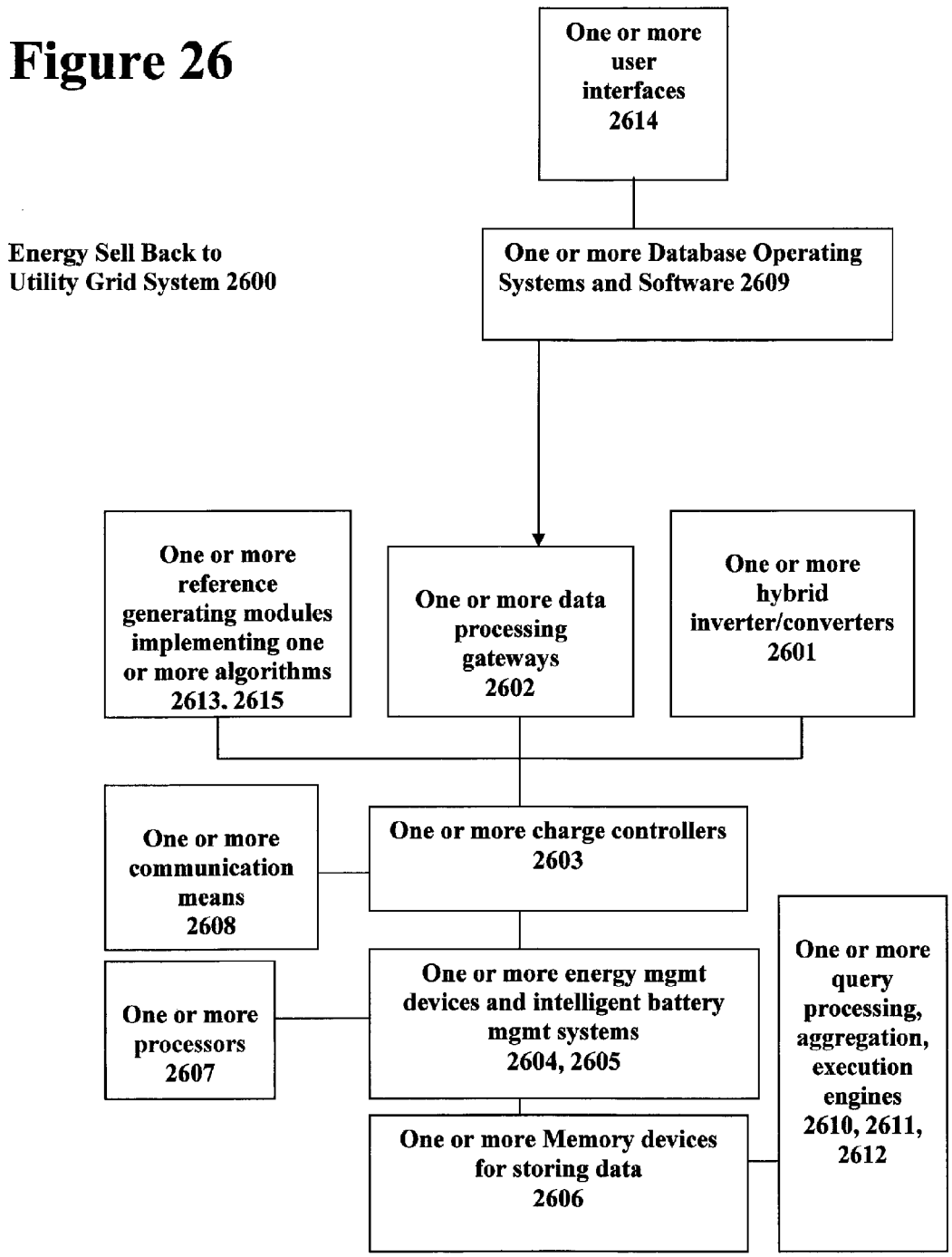

FIG. 26 is a functional block diagram showing a system for selling energy back to a utility power grid.

Figure 27:
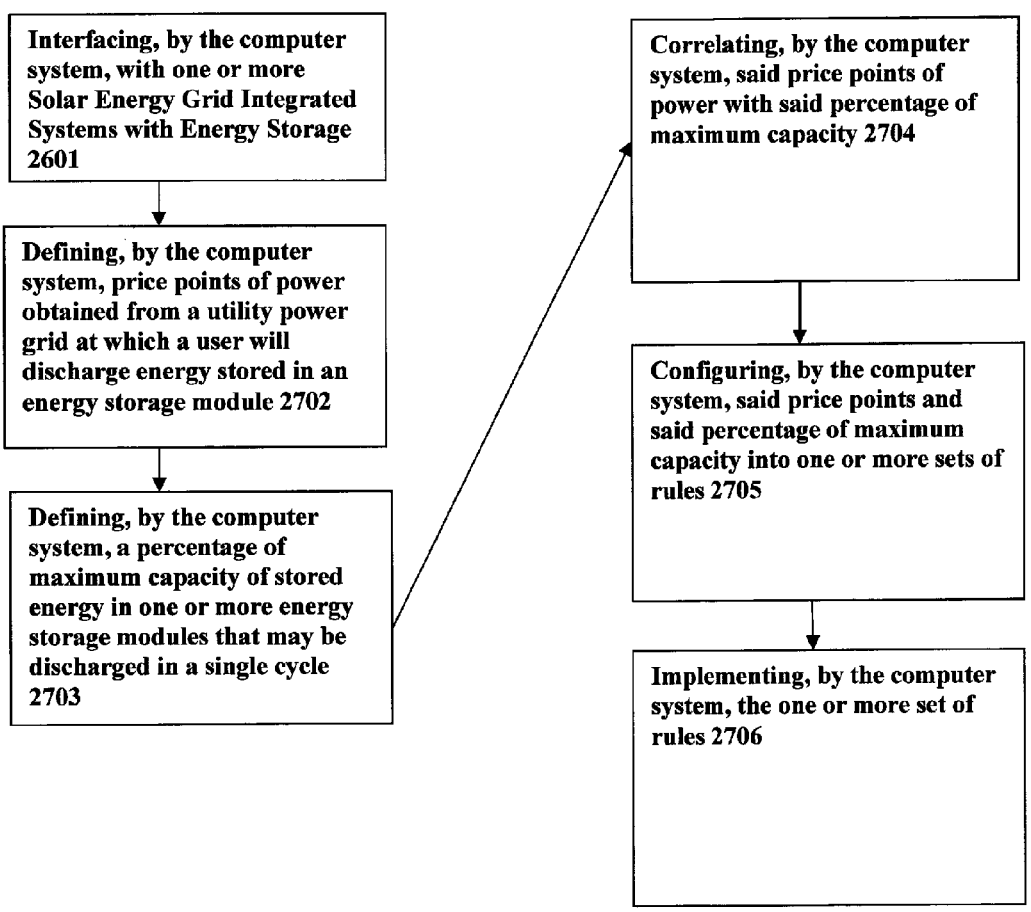

FIG. 27 is a flow chart for a computer implemented method for causing a computer system to perform a method of selling energy back to a utility power grid.

Figure 28A:
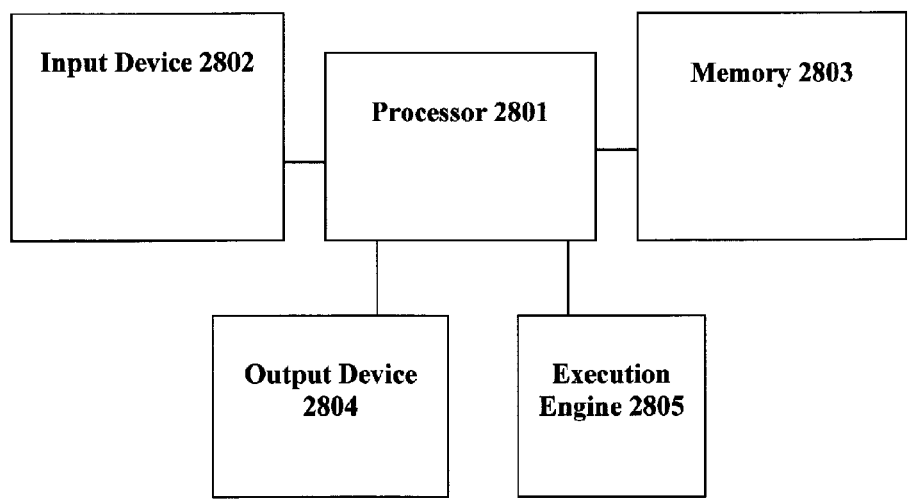

FIG. 28A is a functional block diagram showing a computer implemented apparatus for selling energy back to a utility power grid.

Figure 28B:
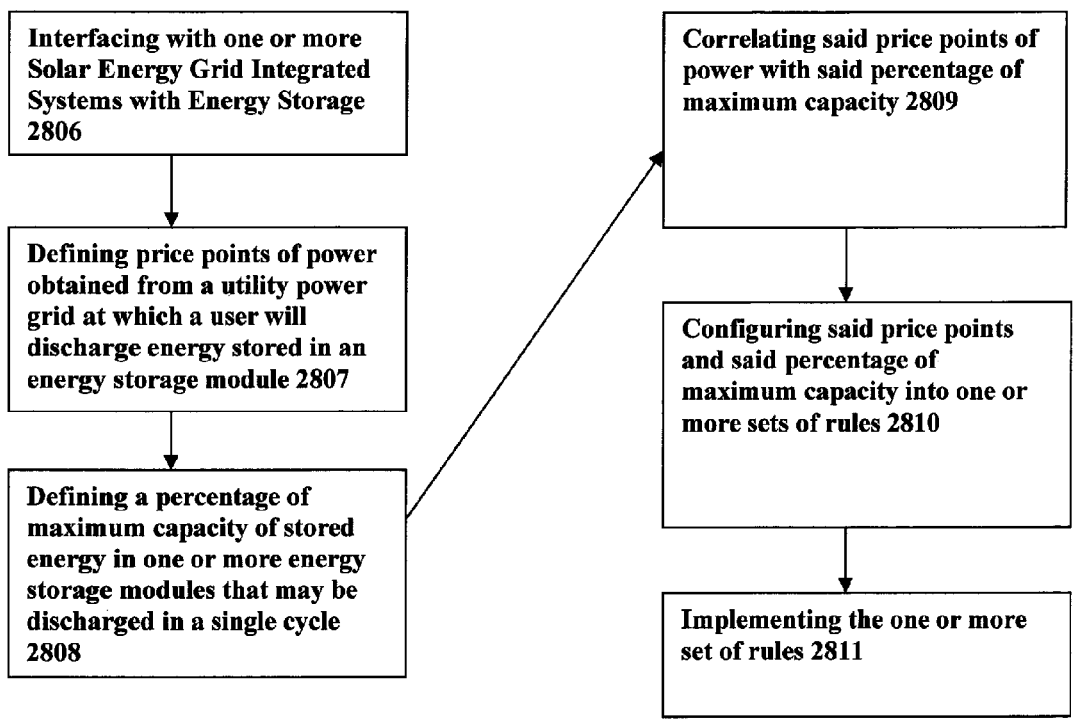

FIG. 28B is a flow chart for a computer implemented apparatus for providing a method of selling energy back to a utility power grid.

Figure 29:
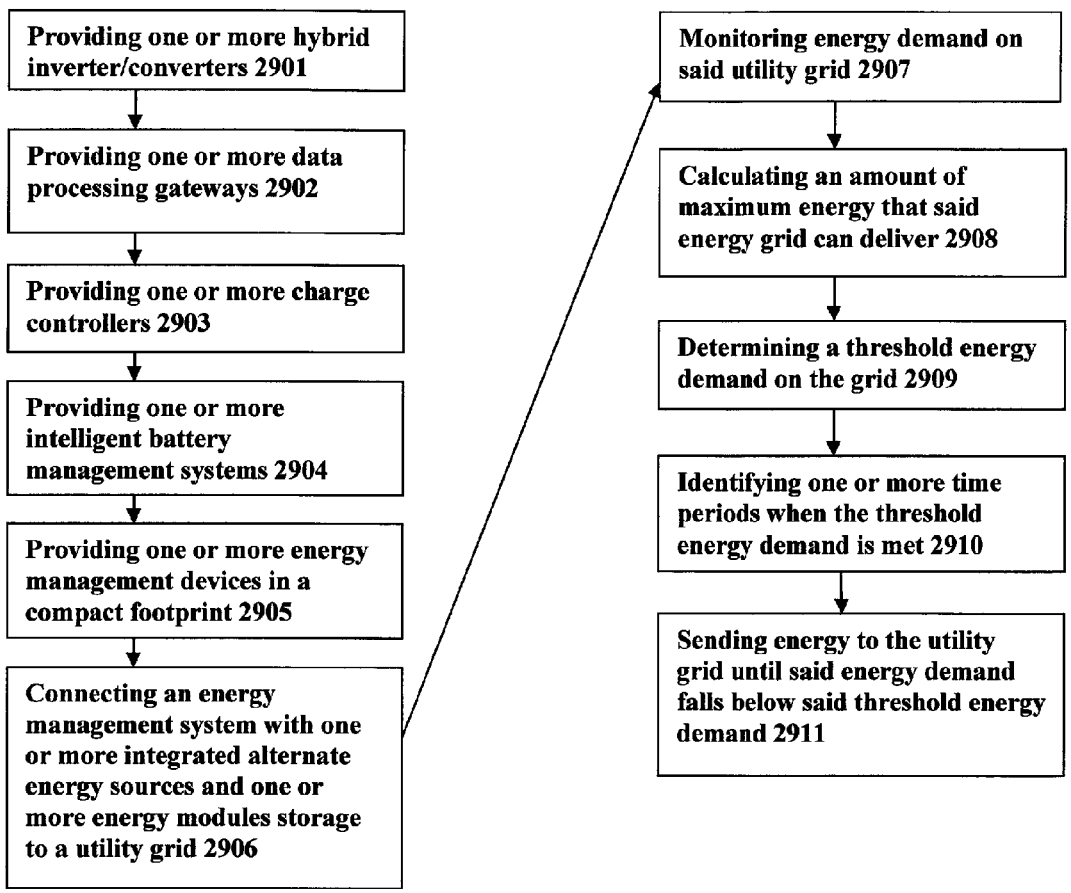

FIG. 29 is a flow chart for a method of peak shaving.

Figure 30:
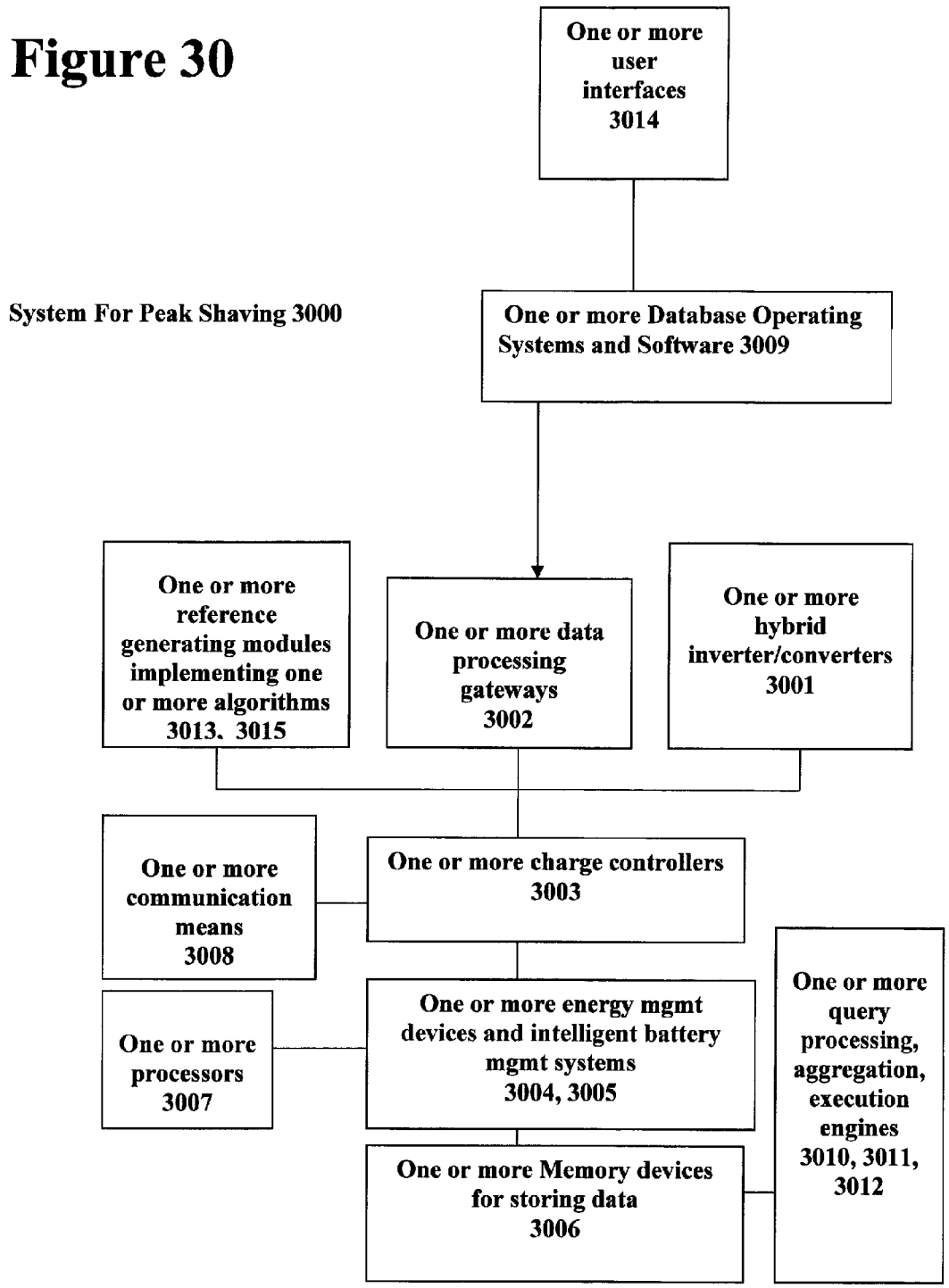

FIG. 30 is a functional block diagram showing a system for peak shaving.

Figure 31:
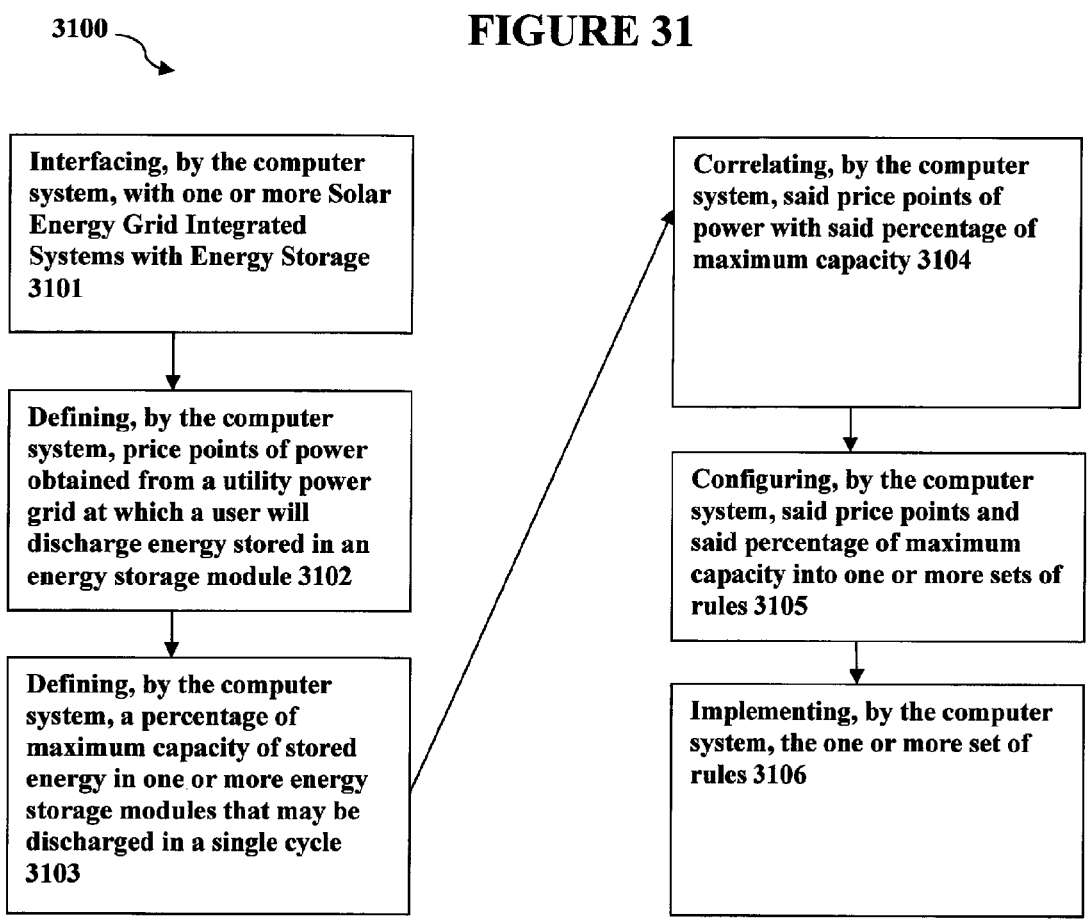

FIG. 31 is a flow chart for a computer implemented method for causing a computer system to perform a method of peak shaving.

Figure 32A:
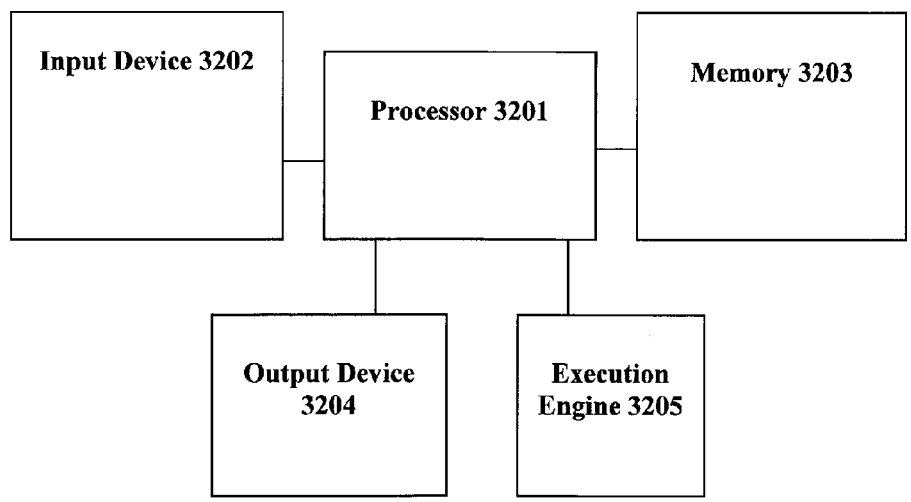

FIG. 32A is a functional block diagram showing a computer implemented apparatus for providing a method for peak shaving.

Figure 32B:
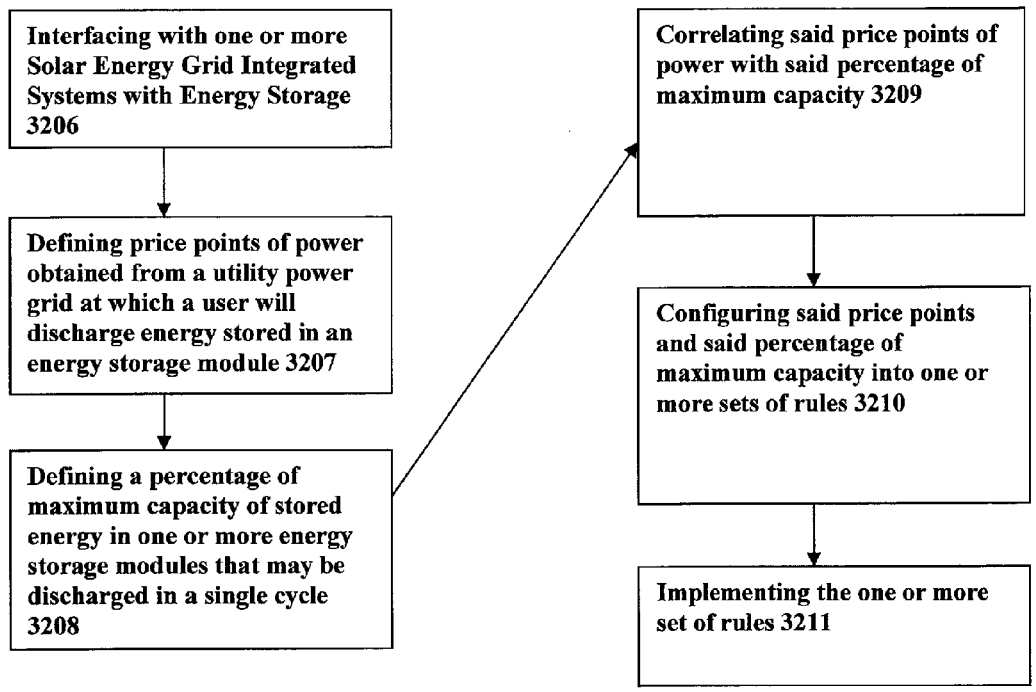

FIG. 32B is a flow chart for a computer implemented apparatus for providing a method for peak shaving.

Figure 33:
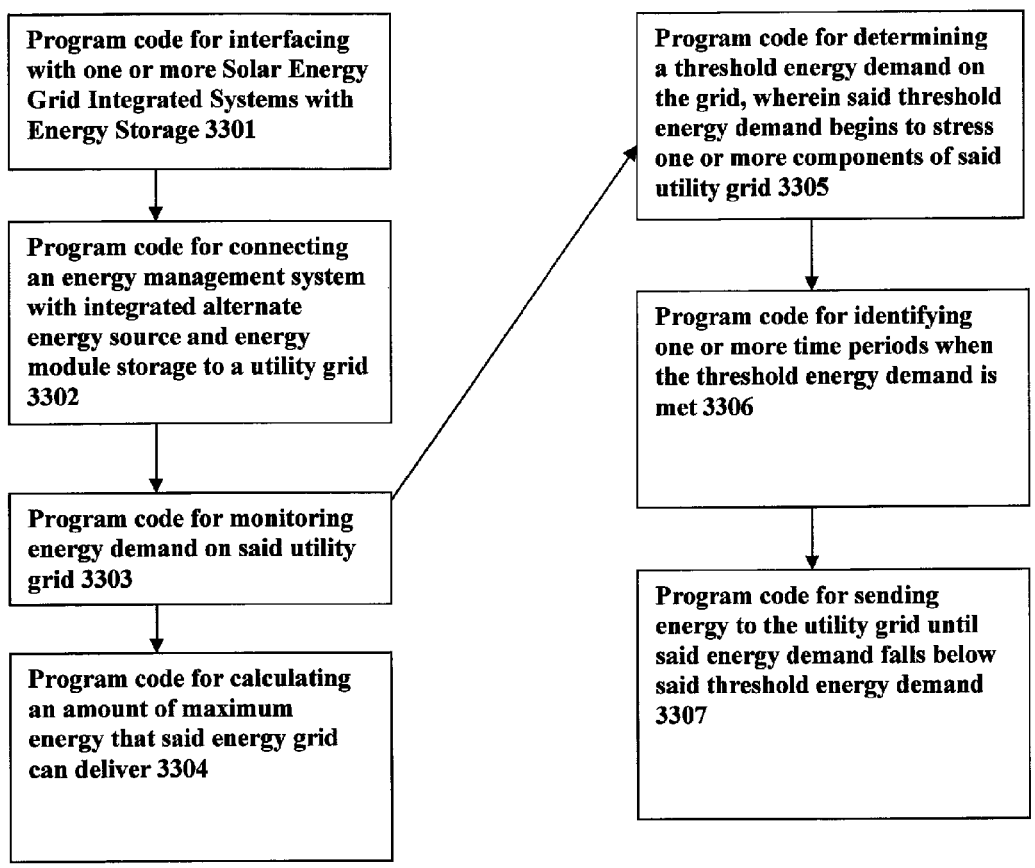

FIG. 33 is a flow chart for a computer readable medium for peak shaving.

Figure 34:
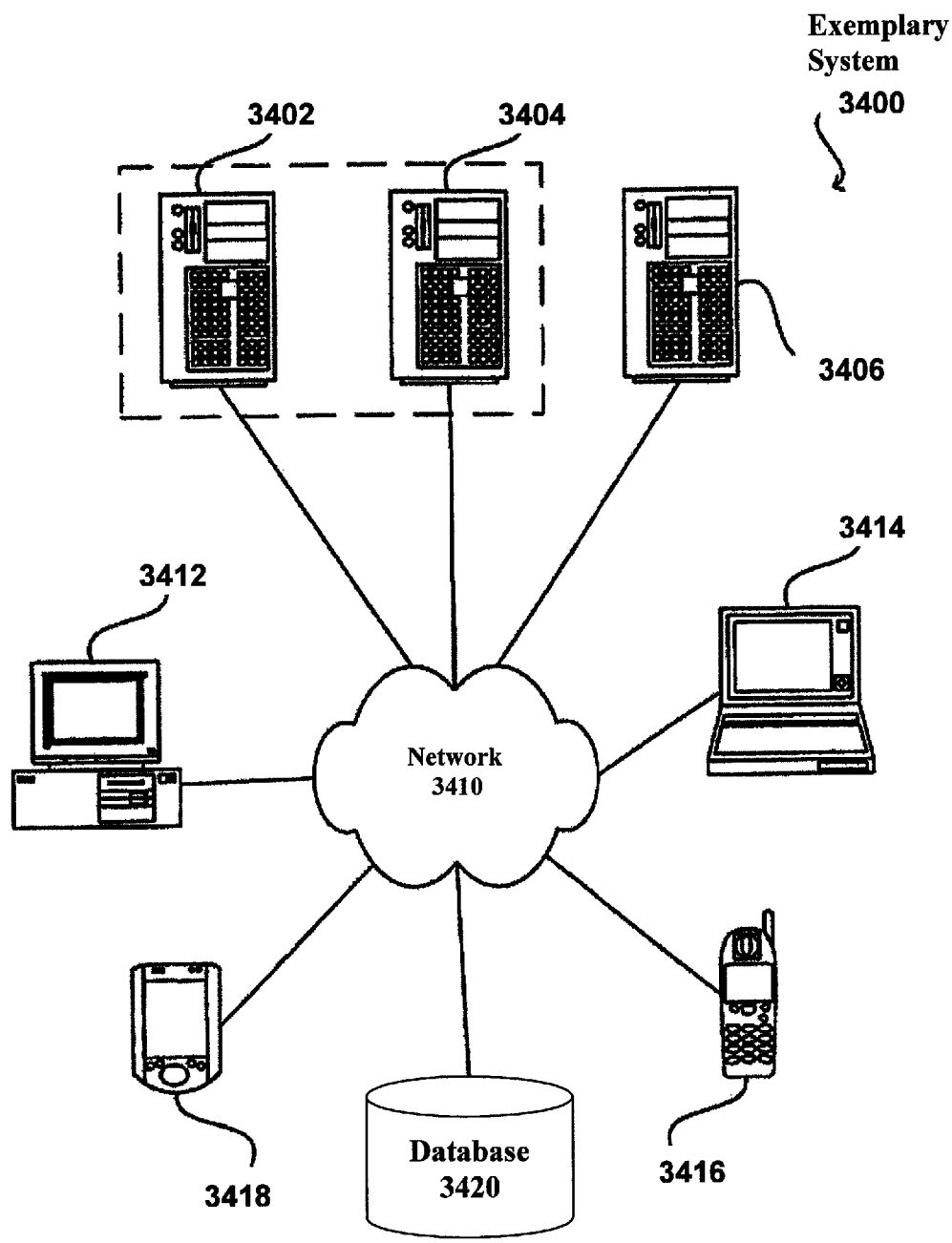

FIG. 34 is an illustration depicting an exemplary operating environment including one or more user computers, computing devices, or processing devices, which can be used to operate a client, such as a dedicated application, web browser is shown.

Figure 35:
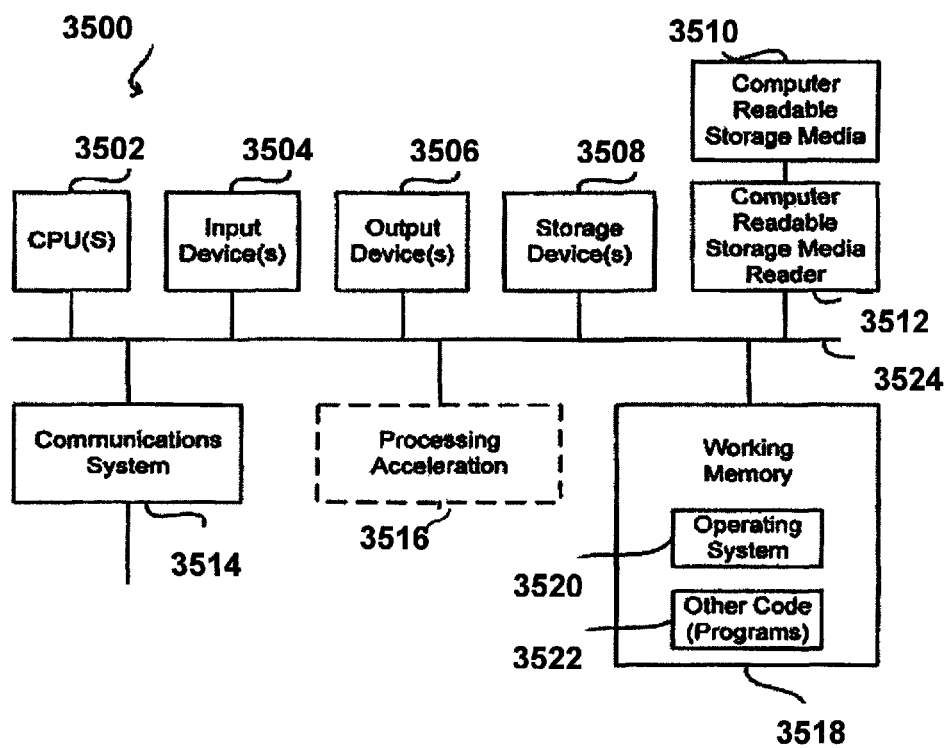

FIG. 35 is another illustration depicting an exemplary operating environment including a computer system with various elements as shown.

DETAILED DESCRIPTION OF THE INVENTION

The present invention is directed to a device the present invention is directed towards a system, method, and device for integrating distributed energy sources, energy storage, and balance of system components into a single device with systems and control for monitoring, measuring, and conserving power generated on the premise, the resale of power to a utility, power generated from distributed energy storage (e.g., batteries) and distributed energy sources (e.g., solar panels). Moreover, the device is minimally invasive, modular, and retains power-generating capacity, which is combined with load management and energy storage to provide energy at or near the point of consumption.

The present invention can be further illustrated as a device that integrates the necessary components into a tamper resistant, utility grade, minimally invasive enclosure designed for outdoor applications, keeping unauthorized personnel from accessing the necessary components, and placed within the utility's service easement and set aside area of a residence or commercial building. The energy management cabinet contains essentially all necessary electrical components including charge controllers, inverters, relay circuitry, circuit breakers, energy storage modules (e.g., batteries), and balance of system circuitry for operating distributed energy sources (e.g., solar panels).

The present invention is described below with reference to block diagrams of systems, methods, apparatuses and computer program products according to an embodiment of the invention. It will be understood that each block of the block diagrams and combinations of blocks in the block diagrams, respectively, can be implemented by means of analog or digital hardware and computer instructions. These computer instructions may be loaded onto a general purpose computer, special purpose computer, ASIC, or other programmable data processing apparatus to produce a machine, such that the instructions, which execute on the computer or other programmable data processing apparatus create means for implementing the functions/acts specified in the block or blocks.

The computer program instruction can be provided to a processor of a general purpose computer, special purpose computer, ASIC, or other programmable data processing apparatus, such that the instruction, which execute via the process of the computer or other programmable data processing apparatus, implements the function/acts specified in the block diagrams or operational block or blocks.

In some alternate implementation, the functions/acts noted in the blocks can occur out of the order noted in the operational illustration. For example, tow blocks shown in succession can in fact be executed substantially concurrently or the blocks can sometimes be executed in the reverse order, depending upon the functionality/acts involved.

For the purpose of this disclosure the term "utility" should be referred to as an entity that provides or manages the supply of electrical power to one or more energy consumers. The term as used in the disclosure encompasses, without limitation, regional utility companies, regional transmission organizations, and any other load servicing entity or entities, which manage the power grid within a geographical area. Energy consumers may be an entity that uses electrical power for any purpose such as, without limitation, individual homeowners, commercial office buildings, or manufacturing operations.

For the purpose of this disclosure, the term "energy management system with integrated solar and energy storage (EMSIS-ES)" should be understood to refer to a device which measures and controls the operation of power generating, power consuming, or power storage devices, or which measures and controls power supplied to one or more electrical circuits. Power generating devices may include, without limitation, renewable energy resources such as solar panels; household appliances such as refrigerators and stoves; climate control systems such as heating and air conditioning, and commercial or manufacturing devices, such as an automated assembly line. Power storage devices may include, without limitation, battery systems and capacitors which store and dispatch power.

The EMSIS-ES may be capable of being connected to one or more networks, such as the Internet, a private WAN, AMI Network, GPRS, or a cellular communications network. Such network-connected EMSIS-ES may be capable of transmitting measurements made by the EMSIS-ES to remote locations (e.g., utility's). Network connected EMSIS-ES devices may be further capable of receiving commands from remote locations, which control or modify the operation of the EMSIS-ES.

For the purpose of this disclosure, and without limitation, the term "power storage and supply device" should be understood to refer to an EMSIS-ES which is capable of managing substantially all electrical power generation, consumption, and storage by power generating, power consuming, and power storage devices within an area of control or individual site. The EMSIS-ES may include a processor with associated communications, data storage and database facilities, one or more display device which may support a graphical user interface, as well as operating software and one or more database systems and applications software which support the services provided by the appliance. Area control of an EMSIS-ES may be, without limitation a single home, or a group of homes, commercial building, or group of commercial buildings.

For the purpose of this disclosure, and without limitation, "module" is a software, hardware, or firmware (or combination thereof) system, process or functionality, or component thereof, that performs or facilitates the processes, feature, and/or functions described herein the EMSIS-ES (with or without human interaction or augmentation). A module can include sub-modules.

For the purpose of this disclosure, and without limitation, "utility grade enclosure" is designated as a cabinet hardware, or component thereof, which performs or facilitates the feature, and/or functions described herein the EMSIS-ES (with or without human interaction or augmentation) meeting NEMA 3R; IEEE C57.12.52 Section 6, C57.28 Section 4 made from a minimum of 12 gauge steel or a suitable composite material.

For the purpose of this disclosure, and without limitation, "certifications" are software, hardware, or firmware (or combination thereof) system, process or functionality, or component thereof, that performs or facilitates the processes, features, and/or functions described herein the EMSIS-ES (with or without human interaction or augmentation) meeting UL 1742-2005; IEEE 1547; ETL Listed UL 1741; CSA C22.2 No. 107.1; FCC Class B; FCC Part 15 Class B; ANSI C37.90; CANBUS; DNP3; NIST approved; SE2 complaint. It is to be understood by one of ordinary skill that this is an exemplary list of standards that is current at the time of filing this application.

Reference will now be made in detail to illustrative embodiment of the present invention, examples of which are/may be shown in the accompanying drawings. These inventions may be embodied in different forms and should not be construed as limitations to the embodiments set forth herein; rather, these embodiments are provided so that the disclosure will satisfy applicable legal requirements, be thorough and complete, and will fully convey the scope of the invention to those skilled in the art.

In an embodiment as shown in FIG. 1A and FIG. 1B, a solar integrated energy management apparatus 100 may include a power storage supply apparatus enclosure 101. A power storage and supply device 102 is coupled to one or more electromechanical isolation breakers 103. The one or more electromechanical isolation breakers 103 and one or more energy storage modules 107 are adapted to connect to one or more alternate energy sources 104. One or more inverters 105 are coupled to a charge controller 106. The charge controller 106 is coupled to the one or more inverters 105 and to the one or more energy storage modules 107. A local data processing gateway 108 is coupled to the charge controller 106. The one or more energy storage modules 107 are coupled to an energy storage module storage enclosure 109 containing a battery management system 110 and an electrical bus 111. The electrical bus connects one or more battery cable terminals 112 to a main bus 113 that is coupled to the charge controller 106. Further, the local data processing gateway 108 uses open standard communication methods at the transport, application, and object levels (e.g., Internet, GPRS, AMI Network, Web Services, XML-Based, DNP3, IEC 61850). As shown in FIG. 1, solar integrated energy management apparatus 100 is generally divided into a upper section, center section, and an lower section; however, is unitized by a singular circuitry design and interface.

Further, the lower section of the solar integrated energy management apparatus 100 contains the energy storage modules 107 and a tamper proof separate battery storage enclosure that contains the battery management system and electrical bus connecting the battery cable terminals to a main bus, which connects to the charge controller 106 in the middle section and the inverters 105 located in the upper section through a unitized assembly. The battery enclosure is connected to the balance of system located in the middle section via at least one connector for providing a unique safety connector configuration for the energy storage modules 107.

In other aspects, the embodiment of the solar integrated energy management apparatus 100 may further include at least one unique safety connector 114 providing a unique safety connector configuration. At least one unique safety connector 114 allows the charge controller 106, the local data processing gateway 108, and the electromechanical isolation breaker 103 to be connected to the energy storage module 107. The energy storage module 107 is coupled to at least one unique safety connector 114 via the main bus 113.

In another embodiment as shown in FIG. 2A and FIG. 2B, an integrated energy management apparatus 200 may include a power storage and supply device 201 coupled to an electromechanical isolation breaker 202. The electromechanical isolation breaker 202 is integrated to one or more alternate energy sources 203 and one or more energy storage modules 204. The electromechanical isolation breaker 202 may communicate with one or more alternate energy sources 203. One or more inverters 205 are coupled to a charge controller 206. The charge controller 206 is coupled to the one or more inverters 205 and to one or more energy storage modules 204. A local data processing gateway 207 is coupled to the charge controller 206. The one or more energy storage modules 204 are coupled to an energy storage module storage enclosure 208 containing a battery management system 209 and a electrical bus 210. The electrical bus connects one or more battery cable terminals 211 to a main bus 212 that is coupled to the charge controller 206. The integrated energy management apparatus 200 may include a consumer web portal 213; an internet user interface 214 including an application programming interface coupled to a database repository, a display, and a utility enterprise database application; and an energy area network 215 that couples the Internet user interface and utility enterprise database application to one or more user devices and appliances 216. The internet user interface 214 may be a personal computer, a smart phone, or other smart devices capable of internet access.

In other aspects of the integrated energy management apparatus 200, the embodiment may further include: one or more CANBUS protocols to allow one or more components to communicate with each other without one or more host computers; one or more DNP3 platforms to facilitate communication between the one or more data processing gateways and one or more components; at least one NIST approved CIM model; and at least one SE2 compliant platform.

In another embodiment as shown in FIGS. 3A-3D, a solar integrated system enclosure 300 may include an upper section 301 housing one or more inverters 302; a center section 303 housing one or more electromechanical isolation breakers 304, a charge controller 305, and a computer-implemented local data processing gateway device 306 that includes one or more software modules for implementing method steps to monitor, control, and store energy from one or more alternate energy sources and to implement one or more processes for providing consumer energy management; and a lower section 308 housing one or more storage modules 309. The frame 310 of the enclosure comprises a width, a depth, and a height to form a single, vertical rectangular cross section box of equal or varying widths. One or more corrosion resistant outer panels 311 comprising a height, a width, and a depth form a rectangular cross section box of varying widths. The panels 311 are coupled to the frame 310 to form a single vertical freestanding outdoor utility grade enclosure 300. The enclosure 300 is open on a front side and coupled to a hinged door 316. The enclosure 300 may include an internal upper section, center section and lower section backpan 312 for mounting one or more solar integrated system components. Preferably, the enclosure 300 has a compact footprint 313 equal to a depth not to exceed a utility workspace. Preferably, the enclosure 300 has a sloped top panel 314 wherein the rear edge height is greater than the front edge height. A door jamb 315 is coupled to a top portion and one or more sides of an open front side of the frame 310. The hinged front door 316 includes a three point rod and latch system 317 to engage a gasketed internal rectangular circumference (not shown) and a handle latch on the external of the front door (not shown). The hinged front door 316 is coupled to the door jamb 315. One or more hot swappable energy storage modules 318 are coupled to a shunt switch 319 for physically isolating the energy storage modules 320 and are further coupled to an isolation switches panel assembly 321 via at least one unique safety connector mechanism 322 and an electrical bus (not shown) connecting the energy storage module terminals (not shown) to a main bus (not shown) that connects to the charge controller 305 and the one or more inverters 302 through a unitized system (not shown). One or more horizontal perforations 323 on a back panel 312 are located at a minimum distance between exhaust ports on the inverter 302, a converter (not shown), and the charge controller 305. The shunt switch 319 may be provided for physically isolating (via disconnection) the energy storage modules 309 from the charge controller 305, data processing gateway 3060, and inverter 302. This configuration allows for physical and electric isolation of the energy storage modules 309 by switching the modules off, effectively unplugging that specific modules from the system. This functionality allows for safe maintenance and upkeep of the energy storage modules 309. This also lets the data processing gateway 306 avoid damage to the entire system by isolating a non-properly functioning energy storage module 309 until such module can be repaired or replaced by the appropriate maintenance worker.

In an embodiment of the present invention, the a solar integrated system enclosure 300 is a utility grade, NEMA 3R Stainless Steel enclosure measuring 72"H×24"W×14"D. However, one of ordinary skill in the art will appreciate other casing materials may be used (such as Aluminum, Composite Steel, or other Composite Materials) and cabinet dimensions may be utilized in order to accommodate different operating environments and/or different space constraints.

In other aspects of the embodiment, the utility workspace recited in the preceding paragraph may be no greater than 18 inches in depth. Further, the utility workspace recited in the preceding paragraph may be no greater than 18 inches in depth and 24 inches in width.

In other aspects of the embodiment, one of more of the solar integrated system enclosure 300 may be in series, in parallel, and may be mechanically coupled together. Combined, the systems of the enclosures 300 may produce between 6 kW and 1 MW.

In other aspects of the embodiment, the solar integrated system enclosure 300 may be a rainproof NEMA 3R enclosure. The embodiment may further include one or more door hinges 324 coupled to the hinged door 316 wherein the one or more door hinges are encased by a front portion and side portion of the hinged door such that the one or more hinges are not visible when looking from front or sides. Encasing the one or more hinges 324 by the front portion and side portion of the door 316 prevents unwanted tampering. An isolation breaker panel 321 may be coupled to the center section of the solar integrated system enclosure 303. The isolation breaker panel may further have isolation circuitry (not shown) coupled thereto, whereby placement of the isolation circuitry on the isolation switch panel assembly 321 provides vertical airflow channels that provide additional exothermic cooling of components coupled to the center section 303. One or more ambidextrous conductor termination points (not shown) may be located on one or more corrosion resistant outer panels 311 that form the width of the rectangular cross section box. The one or more ambidextrous conductor termination points may be formed via watertight escutcheon plates coupled to the one or more corrosion resistant outer panels. The watertight escutcheon plates may contain electrical conduit access holes to facilitate connection of the alternate energy source power and utility power grid.

In other aspects of the embodiment, the solar integrated system enclosure 300 may further include a rain gutter 325 with a curved radius 326 that extends around the perimeter of an open front side of the enclosure. The rain gutter may include a top and bottom rain gutter 327 and a first and second side rain gutter 328.

The top and bottom rain gutters 327 may extend outward a first distance from the frame 310. The first distance may be a curved radius 326 portion sloping away from a vertical line that dissects an interior cavity of the enclosure and being equal to one third of a total distance with the one third of a total distance encompassing a portion of the total distance farthest from the frame 310 and wherein a door jamb 315 extends a second distance outward from the frame 310 with the second distance being a planar portion equal to two-thirds of a total distance extending outward from the frame 310 and the two-thirds of a total distance encompassing a portion of the total distance closest to the frame 310.

The first and second rain gutter 328 may extend outward a first distance from the frame 310. The first distance may be a curved radius 326 portion sloping away from a horizontal line that dissects an interior cavity of the enclosure and being equal to one third of a total distance with the one third of a total distance encompassing a portion of the total distance farthest from the frame 310 and wherein a door jamb 315 extends a second distance outward from the frame 310 with the second distance being a planar portion equal to two-thirds of a total distance extending outward from the frame 310 and the two-thirds of a total distance encompassing a portion of the total distance closest to the frame 310. There may be one or more gaskets (not shown) coupled to an inner circumference of the hinged door 316. When the hinged door is closed the one or more gaskets abut with the rain gutter 325 to form an interface, wherein the interface comprises the one or more gaskets being compressed on an end portion closest to an end portion of the rain gutter such that the one or more gaskets form a seal by form fitting around the end portion, wherein the interface between the one or more gaskets and the end portion prevent liquids and dust from entering the enclosure; and wherein the placement of the one or more gaskets minimizes the contact surface area between the one or more gaskets and the rain gutter 325.

In another embodiment as shown in FIG. 4, a system 400 to provide a computer implemented method for monitoring energy including computer-usable readable storage medium having computer-readable program code embodied therein for causing a computer system to perform a method of storing excess energy generated in an energy management device in an application platform may include: one or more processors 401; a clock 402; memory 403; one or more I/O interfaces 404; one or more analog to digital interfaces 405; operating system software 406; a power storage supply apparatus enclosure 407; a power storage and supply device 408 coupled to an electromechanical isolation breaker 409 that is integrated to one or more alternate energy sources 410; one or more hybrid inverter/converters 411; one or more data processing gateways 412 to implement monitoring of one or more telemetry data; one or more charge controllers 413; and one or more energy storage modules 414.

In another embodiment as shown in FIG. 5, a solar integrated energy management system 500 comprises a power storage supply apparatus enclosure 501 and one or more alternative energy sources 502 coupled to a user power system 503. The user power system may be coupled to a utility power grid 504 to distribute the required consumer power need. The solar integrated energy management system 500 may monitor user power consumption with a user power monitoring control management console 505 and store excess alternate energy source power created via communication and storing the excess alternate energy source power into one or more energy storage modules 506.

In another aspect of the embodiment, the excess alternate energy source power may be the difference between power provided by the alternate energy source power and a consumer's power needs.

In yet other aspects of the embodiment, the solar integrated energy management system may further include a consumer web portal; an internet user interface including an application programming interface; an advanced meter infrastructure (AMI) coupled to the internet user interface and a utility power grid; an energy area network (EAN) coupled to the local data processing gateway; and a utility enterprise database application.

In another embodiment as shown in FIG. 6, an energy management system 600 for governing energy management resources comprises a power storage supply apparatus enclosure 601; a power storage and supply device 602; one or more alternate energy sources 603 coupled to a user power system 604; the user power system 604 coupled to a utility power grid 605 to distribute the required consumer power needed; one or more sets of rules 606; one or more sets of constraints 607; and wherein the one or more sets of rules and the one or more sets of constraints allow a user to implement multiple sets of rules and constraints that govern various resources selected from the group consisting of power generation, power storage, power use, and load control. In other aspects of the embodiment, the one or more sets of rules and the one or more sets of constraints may allow a user to implement one or more sets of rules and constraints that dictate that if price of power from a utility power grid reaches one or more price points then a pre-defined percentage of a maximum capacity of stored energy in one or more energy storage modules may be discharged in a single cycle. The pre-defined percentage of a maximum capacity may correspond to the one or more price points.

In another embodiment as shown in FIGS. 7A and 7B, an Intelligent Energy Storage Module Management System 700 comprises a tamper resistant energy storage enclosure 701 housed within an intelligent energy storage module management enclosure 702 with security fastening members (not shown). The tamper resistant energy storage enclosure 701 includes connectors (not shown) for connecting one or more energy storage devices 703 to a hybrid inverter/converter 704 via a solid copper bus bulkhead apparatus 705 which further includes an electrically insulated escutcheon 706 and associated cover 707 to isolate a high current bus conductor 708 from service personnel. An enclosure 709 for one or more energy storage module management intelligent electronics 710 and telemetry equipment 711 within the intelligent energy storage module management enclosure 702 simultaneously isolates one or more energy storage disconnecting switches 712 and associated conductors (not shown). A communications connection bulkhead 713 housed within the intelligent energy storage module management enclosure 702 allows the Intelligent Energy Storage Module Management System 700 to communicate to a multi-protocol data processing communication gateway device 714, hybrid inverter/converter 704 and charge controller 715. One or more venting grid ports 716 may be placed on the intelligent energy storage module management enclosure 702 adjacent to one or more energy storage modules 717, where the one or more venting grid ports 716 cross ventilate and convection cool one or more of the one or more energy storage modules 717. One or more components of the energy storage module management intelligent electronics 710 and telemetry equipment 711 are communicably coupled to the multi-protocol data processing communication gateway device 714 to provide telemetry data to implement one or more processes to integrate with an Energy Area Network (EAN) 718. The Energy Area Network (EAN) 718 may be communicably coupled to one or more appliances 719 and electrical loads 720 to aggregate locally stored control algorithms and remotely received control parameters.

In other aspects of the embodiment, the Intelligent Energy Storage Module Management System 700 may further include one or more CANBUS protocols to allow one or more components to communicate with each other without one or more host computers; one or more DNP3 platforms to facilitate communication between the one or more data processing gateways and one or more components; at least one NIST approved CIM model; and at least one SE2 compliant platform. The Energy Storage Module Management System may be designed to prevent access by unauthorized personnel. In yet other aspects of the embodiment, the Energy Area Network (EAN) may be a Home Area Network (HAN) 721 comprising residential appliances 719 and electrical loads 720. The one or more components of the energy storage module management intelligent electronics 710 and telemetry equipment 711 communicably coupled to the multiprotocol data processing communication gateway device 714 may further integrate the intelligent charge controller 715 and the intelligent inverter/converter 704 to the Energy Area Network (EAN) 718. The tamper resistant energy storage enclosure 701 may house one or more energy storage components of the energy storage module management intelligent electronics 710 and telemetry equipment 711. The one or more energy storage modules 717 may be electrically connected in series. The one or more energy storage devices 703 each may contain at least one energy storage module 717, wherein one or more modules 717 are connected to the tamper resistant energy storage enclosure 701 and wherein the one or more modules 717 comprise a string (not shown).

In another embodiment as shown in FIG. 8, a method for monitoring energy consumption 800 comprises steps for providing one or more hybrid inverter/converters, wherein the one or more hybrid inverter/converters are communicably coupled to one or more charge controllers and wherein the one or more hybrid inverter/converters are further electronically coupled to an electrical bus 801; providing one or more data processing gateways, wherein the one or more data processing gateways are communicably coupled to one or more charge controllers and to one or more intelligent battery management systems 802; providing one or more charge controllers 803; providing one or more intelligent battery management systems coupled to one or more energy management devices 804; providing one or more energy management devices in a compact footprint not to exceed 18 inches in depth 805; associating an energy management device with a consumer unit, said energy management device having a local data processing gateway device communicably coupled to the energy management device 806; configuring said local data processing gateway to monitor and control processes and measurements conducted by said energy management device 807; receiving and logging a plurality of telemetry data from one or more intelligent battery management systems 808; receiving and logging a plurality of telemetry data from one or more intelligent inverter/converters 809; receiving and logging a plurality of telemetry data from one or more energy storage modules 810; receiving and logging a plurality of telemetry data from a charge controller 811; and viewing the plurality of telemetry data by accessing a consumer web portal 812.

In other aspects of a method for monitoring energy consumption 800, the embodiment further comprises steps for retrieving telemetry data from one or more energy storage modules to calculate an amount of available stored energy 813; and conducting one or more electric energy buy-low/sell-high transaction, wherein energy from a utility is purchased at a low price and stored in said one or more energy storage modules and wherein the available stored energy is sold back to the utility at a price higher than the low price 814. In other aspects the embodiment may variously further comprise steps for retrieving telemetry data from one or more energy storage modules to calculate an amount of available stored energy 815; and applying the amount of available stored energy to offset a need to purchase and install one or more new electricity generating means 816. In other aspects, the embodiment may further comprise steps for retrieving the plurality of telemetry data from one or more energy storage modules to calculate an amount of available stored energy 817; utilizing the amount of available stored energy to reduce generation marginal cost, where said generation marginal cost comprises a cost of fuel and a cost for variable maintenance 818; and applying the amount of available stored energy to reduce generation capacity cost, wherein said generation capacity cost comprises one or more costs incurred in increasing generation capacity 819. In yet other aspects of the embodiment, the method may variously include steps for using the plurality of telemetry data from one or more energy storage modules to calculate an amount of available stored energy 820; using the amount of available stored energy to provide one or more rapid response energy storage modules 821; and wherein the rapid response energy storage modules can provide regulation of the amount of available stored energy while charging and while discharging 822. In other configurations of the method embodiment, steps for using the plurality of telemetry data from one or more energy storage modules to calculate an amount of available stored energy 823; and using the amount of available stored energy to provide one or more electric supply reserve capacities, wherein the one or more electric supply reserve capacities reduce the need and cost for one or more other electric reserves 824 may be further provided. In another configuration, the embodiment may variously further include steps for using the plurality of telemetry data from one or more energy storage modules to calculate an amount of available stored energy 825; and using the amount of available stored energy to offset one or more needs to use one or more large generation means of reactive power to the grid, wherein the amount of available stored energy provides reactive power to a grid when one or more region-wide voltage emergencies occurs 826. In other configurations of the method embodiment, steps for monitoring energy consumption may be directed to transmission systems including using the plurality of telemetry data from one or more energy storage modules to calculate an amount of available stored energy 827; and using the amount of available stored energy to increase a load carrying capacity of one or more transmission systems 828. Other applications of the method embodiment may further comprise steps for using the plurality of telemetry data from one or more energy storage modules to calculate an amount of available stored energy 829; using the amount of available stored energy to increase a generation capacity of one or more utilities 830; and using the amount of available stored energy to supply an amount of energy upstream from one or more sources of energy congestion 831. In other aspects, the embodiment may variously include steps for using the plurality of telemetry data from one or more energy storage modules to calculate an amount of available stored energy 832; and using the amount of available stored energy to defer one or more transmission and distribution costs associated with one or more utilities 833. In yet another aspect of the embodiment, electricity time-of-use (TOU) costs and real-time-price (RTP) energy costs may be analyzed by providing steps for using the plurality of telemetry data from one or more energy storage modules to calculate an amount of available stored energy 834; using the amount of available stored energy to reduce one or more users' electricity time-of-use (TOU) costs 835; and using the amount of available stored energy to reduce one or more users' electricity real-time-price (RTP) energy costs 836. Another configuration of the method embodiment further includes steps for using the plurality of telemetry data from one or more energy storage modules to calculate an amount of available stored energy 837; using the amount of available stored energy to reduce one or more end users' power draw on one or more utilities during times when electricity use is high 838; and reducing one or more demand charges from one or more utilities by storing energy in one or more energy storage modules at one or more times when low or no demand charges apply 839. In yet another aspect of the embodiment, the method further includes steps for using the plurality of telemetry data from one or more energy storage modules to calculate an amount of available stored energy 840; and using the amount of available stored energy to improve electric service reliability associated with one or more power outages such that one or more end users have reduced losses associated with the one or more power outages 841. In other certain aspects, the method may further include steps for using the plurality of telemetry data from one or more energy storage modules to calculate an amount of available stored energy 842; and using the amount of available stored energy to reduce financial losses associated with one or more power anomalies 843. In another aspect of the embodiment, the method further includes steps for using the plurality of telemetry data from one or more energy storage modules to calculate an amount of available stored energy 844; increasing the amount of available stored energy via one or more renewable energy sources 845; and using an amount of available stored energy provided by one or more renewable energy sources at a later time when the cost of energy sold by one or more utilities is more expensive than the cost of said available stored energy provided by one or more renewable energy sources 846. In another configuration of the embodiment, the method may further include steps for using the plurality of telemetry data from one or more energy storage modules to calculate an amount of available stored energy 847; and using the amount of available stored energy to firm output from renewable energy generation 848.

In another embodiment as shown in FIG. 9, a method for providing wholesale energy services 900, comprises steps for providing one or more solar integrated energy management apparatus for mounting in a compact workspace not to exceed eighteen inches in depth 901; retrieving telemetry data from one or more energy storage modules physically coupled to one or more inverter/converters and one or more data processing gateway devices in a single assembly to calculate an amount of available stored energy in an energy area network 902; applying the amount of available stored energy to one or more utility grids 903; reducing generation marginal cost by associating the amount of available stored energy with corresponding telemetry data, wherein said generation marginal cost comprises a cost of fuel and a cost for variable maintenance 904; reducing generation capacity cost by associating the amount of available stored energy with corresponding telemetry data, wherein said generation capacity cost comprises one or more costs incurred in increasing generation capacity 905; providing one or more rapid response energy storage modules by associating the amount of available stored energy, wherein the rapid response energy storage modules can provide regulation of the amount of available stored energy while charging and while discharging 906; providing one or more electric supply reserve capacities by associating the amount of available stored energy, wherein the one or more electric supply reserve capacities reduce the need and cost for one or more other electric reserves 907; reducing one or more users' electricity time-of-use (TOU) energy costs by associating the amount of available stored energy with one or more energy storage modules 908; reducing one or more users' electricity real-time-price (RTP) energy costs by associating the amount of available stored energy with one or more energy storage modules 909; minimizing one or more end users' power draw on one or more utilities during times when electricity use is high by associating the amount of available stored energy with one or more energy storage modules 910; and reducing one or more demand charges from one or more utilities by storing energy in one or more energy storage modules at one or more times when low or no demand charges apply 911.

In another embodiment as shown in FIG. 10, a method for providing renewables integration 1000, comprises steps for providing one or more solar integrated energy management apparatus for mounting in a compact workspace not to exceed eighteen inches in depth 1001; retrieving telemetry data from one or more energy storage modules physically coupled to one or more inverter/converters and one or more data processing gateway devices in a single assembly to calculate an amount of available stored energy in an energy area network 1002; making one or more electric energy buy-low/sell-high transactions, wherein energy from a utility is purchased at a low price and stored in said one or more energy storage modules and wherein the available stored energy is sold back to the utility at a price higher than the low price 1003; reducing generation marginal cost by associating the amount of available stored energy with corresponding telemetry data, wherein said generation marginal cost comprises a cost of fuel and a cost for variable maintenance 1004; reducing generation capacity cost by associating the amount of available stored energy with corresponding telemetry data, wherein said generation capacity cost comprises one or more costs incurred in increasing generation capacity 1005; providing one or more rapid response energy storage modules by associating the amount of available stored energy, wherein the rapid response energy storage modules can provide regulation of the amount of available stored energy while charging and while discharging 1006; providing one or more electric supply reserve capacities by associating the amount of available stored energy, wherein the one or more electric supply reserve capacities reduce the need and cost for one or more other electric reserves 1007; reducing one or more users' electricity time-of-use (TOU) energy costs by associating the amount of available stored energy with one or more energy storage modules 1008; reducing one or more users' electricity real-time-price (RTP) energy costs by associating the amount of available stored energy with one or more energy storage modules 1009; minimizing one or more end users' power draw on one or more utilities during times when electricity use is high by associating the amount of available stored energy with one or more energy storage modules 1010; reducing one or more demand charges from one or more utilities by storing energy in one or more energy storage modules at one or more times when low or no demand charges apply 1011; increasing the amount of available stored energy via one or more renewable energy sources 1012; using an amount of available stored energy provided by one or more renewable energy sources at a later time when the cost of energy sold by one or more utilities is more expensive than the cost of said available stored energy provided by one or more renewable energy sources 1013; and using the amount of available stored energy to firm output from renewable energy generation 1014.

In another embodiment as shown in FIG. 11, a method for providing stationary storage for transmission and distribution (T&D) support 1100, comprises steps for providing one or more solar integrated energy management apparatus for mounting in a compact workspace not to exceed eighteen inches in depth 1101; retrieving telemetry data from one or more energy storage modules physically coupled to one or more inverter/converters and one or more data processing gateway devices in a single assembly to calculate an amount of available stored energy in an energy area network 1102; using the amount of available stored energy to provide one or more electric supply reserve capacities, wherein the one or more electric supply reserve capacities reduce the need and cost for one or more other electric reserves 1103; using the amount of available stored energy to offset one or more needs to use one or more large generation means of reactive power to the grid, wherein the amount of available stored energy provides reactive power to a grid when one or more region-wide voltage emergencies occurs 1104; using the amount of available stored energy to increase a load carrying capacity of one or more transmission systems 1105; using the amount of available stored energy to increase a generation capacity of one or more utilities 1106; using the amount of available stored energy to supply an amount of energy upstream from one or more sources of energy congestion 1107; and using the amount of available stored energy to defer one or more transmission and distribution costs associated with one or more utilities 1108.

In another embodiment as shown in FIG. 12, a method for providing distributed energy storage systems 1200, comprises steps for providing one or more solar integrated energy management apparatus for mounting in a compact workspace not to exceed eighteen inches in depth 1201; retrieving telemetry data from one or more energy storage modules physically coupled to one or more inverter/converters and one or more data processing gateway devices in a single assembly to calculate an amount of available stored energy in an energy area network 1202; applying the amount of available stored energy to one or more utility grids 1203; reducing generation marginal cost by associating the amount of available stored energy with corresponding telemetry data, wherein said generation marginal cost comprises a cost of fuel and a cost for variable maintenance 1204; reducing generation capacity cost by associating the amount of available stored energy with corresponding telemetry data, wherein said generation capacity cost comprises one or more costs incurred in increasing generation capacity 1205; providing one or more rapid response energy storage modules by associating the amount of available stored energy, wherein the rapid response energy storage modules can provide regulation of the amount of available stored energy while charging and while discharging 1206; providing one or more electric supply reserve capacities by associating the amount of available stored energy, wherein the one or more electric supply reserve capacities reduce the need and cost for one or more other electric reserves 1207; reducing one or more users' electricity time-of-use (TOU) energy costs by associating the amount of available stored energy with one or more energy storage modules 1208; reducing one or more users' electricity real-time-price (RTP) energy costs by associating the amount of available stored energy with one or more energy storage modules 1209; minimizing one or more end users' power draw on one or more utilities during times when electricity use is high by associating the amount of available stored energy with one or more energy storage modules 1210; reducing one or more demand charges from one or more utilities by storing energy in one or more energy storage modules at one or more times when low or no demand charges apply 1211; using the amount of available stored energy to improve electric service reliability associated with one or more power outages such that one or more end users have reduced losses associated with the one or more power outages 1212; using the amount of available stored energy to reduce financial losses associated with one or more power anomalies 1213; increasing the amount of available stored energy via one or more renewable energy sources 1214; using an amount of available stored energy provided by one or more renewable energy sources at a later time when the cost of energy sold by one or more utilities is more expensive than the cost of said available stored energy provided by one or more renewable energy sources 1215; and using the amount of available stored energy to firm output from renewable energy generation 1216.

In another embodiment as shown in FIG. 13, a method for providing distributed energy storage systems 1300, comprises steps for providing one or more solar integrated energy management apparatus for mounting in a compact workspace not to exceed eighteen inches in depth 1301; retrieving telemetry data from one or more energy storage modules physically coupled to one or more inverter/converters and one or more data processing gateway devices in a single assembly to calculate an amount of available stored energy in an energy area network 1302; applying the amount of available stored energy to one or more utility grids 1303; reducing generation marginal cost by associating the amount of available stored energy with corresponding telemetry data, wherein said generation marginal cost comprises a cost of fuel and a cost for variable maintenance 1304; reducing generation capacity cost by associating the amount of available stored energy with corresponding telemetry data, wherein said generation capacity cost comprises one or more costs incurred in increasing generation capacity 1305; providing one or more rapid response energy storage modules by associating the amount of available stored energy, wherein the rapid response energy storage modules can provide regulation of the amount of available stored energy while charging and while discharging 1306; providing one or more electric supply reserve capacities by associating the amount of available stored energy, wherein the one or more electric supply reserve capacities reduce the need and cost for one or more other electric reserves 1307; reducing one or more users' electricity time-of-use (TOU) energy costs by associating the amount of available stored energy with one or more energy storage modules 1308; reducing one or more users' electricity real-time-price (RTP) energy costs by associating the amount of available stored energy with one or more energy storage modules 1309; minimizing one or more end users' power draw on one or more utilities during times when electricity use is high by associating the amount of available stored energy with one or more energy storage modules 1310; reducing one or more demand charges from one or more utilities by storing energy in one or more energy storage modules at one or more times when low or no demand charges apply 1311; using the amount of available stored energy to improve electric service reliability associated with one or more power outages such that one or more end users have reduced losses associated with the one or more power outages 1312; using the amount of available stored energy to reduce financial losses associated with one or more power anomalies 1313; increasing the amount of available stored energy via one or more renewable energy sources 1314; using an amount of available stored energy provided by one or more renewable energy sources at a later time when the cost of energy sold by one or more utilities is more expensive than the cost of said available stored energy provided by one or more renewable energy sources 1315; and using the amount of available stored energy to firm output from renewable energy generation 1316.

In another embodiment as shown in FIG. 14, a method for providing power quality and reliability 1400, comprises providing one or more solar integrated energy management apparatus 1401; retrieving telemetry data from one or more energy storage modules physically coupled to one or more inverter/converters and one or more data processing gateway devices in a single assembly to calculate an amount of available stored energy in an energy area network 1402; using the amount of available stored energy to improve electric service reliability associated with one or more power outages such that one or more end users have reduced losses associated with the one or more power outages 1403; using the amount of available stored energy to reduce financial losses associated with one or more power anomalies 1404; increasing the amount of available stored energy via one or more renewable energy sources 1405; using an amount of available stored energy provided by one or more renewable energy sources at a later time when the cost of energy sold by one or more utilities is more expensive than the cost of said available stored energy provided by one or more renewable energy sources 1406; and using the amount of available stored energy to firm output from renewable energy generation 1407.

FIG. 15. is a function block diagram showing the energy management system with integrated solar and storage in accordance with the embodiment of the present invention. While the exemplary embodiment discussed herein is in the context of a home, it will be appreciated by those of ordinary skill in the art that the present invention is equally applicable to office buildings and other structures such as warehouses, manufacturing facilities, factories, small-businesses, storefronts, department stores, shopping centers, restaurants, malls, single family or one or more multi-family dwellings and the like. As shown in FIG. 15, one or more alternate energy sources 1502 is connected to a power storage and supply device 1501 which is integrated into the pre-existing residential power system 1515. The pre-existing residential power system 1515 is connected to a utility power grid 1516, as is common with most residential homes. In an embodiment of the present invention, the alternate energy sources 1502 are arrays of photovoltaic cells, which convert sunlight into electricity, which is then sent as DC (direct current) voltage to the power storage and supply device 1501; more specifically, the charge controller 1504.

The photovoltaic cells may be an array manufactured by exemplary manufactures such as BP Solar (a subsidiary of British Petroleum, p.l.c.), Kyocera, Corp., Shell Transport and Trading Company, p.l.c., or SolarWorld USA, and operating normally at 90 VDC with a maximum output capacity at 2.5 kWp. Those skilled in the art will recognize that other multi-voltages, output capacities, and photovoltaic array sizes are contemplated. Other photovoltaic cells produced by other manufacturers and operating at various currents, voltages, and power output capacities may also be used as alternate energy sources. Suitable forms of photovoltaic cells as well as other alternate energy sources (e.g., wind or water-based systems) may also be used. The power storage and supply device also includes energy storage modules 1505 such as batteries, fuel cells, or any other suitable type of independent energy storage medium as appreciated by one of ordinary skill in the art.

Further, the power storage and supply device 1501 includes a charge controller 1501; one or more energy storage modules 1550; one or more inverters 1504; a electromechanical isolation breaker 1507; a local data processing gateway with data logging capabilities 1506; a home area network (HAN) 1510; is Internet compatible 1509; contains a web portal 1508 and optionally communicates through an advanced meter infrastructure (AMI) 1512, all of which are preferably connected to or contained therein with a single enclosed cabinet, such as the one discussed in more detail below. Furthermore, an Independent service operator 1511 and/or Utility Enterprise System 1514 may communicate with the energy storage and supply device 1501 via the internet user interface 1509. In an embodiment of the present invention each array of photovoltaic cells (acting as the alternate energy source 1502) has a dedicated charge controller 1504, though it is recognized that the charge controllers 1504 can be configured in a number of ways appreciable by one of ordinary skill in the art. The charge controller 1504 routes the electricity generated by the alternate energy source 1502 to one or any number/size of the energy storage modules 1505 and the inverters 1503. Alternatively, the charge controller 1504 may be controlled by another device, such as the local data processing gateway 1506, which makes this determination. In an embodiment of the present invention, the inverter 1503 is a grid tied hybrid PV Schneider Electric XW4548-12/240-60, the charge controller 1504 is a Schneider Electric charge controller XW-MPPT60-150, but other suitable charge controllers and inverters may also be used.

Each energy storage model 1505 preferably contain a number of batteries, which in turn each contain a number of cells for storing the DC voltage being generated by the alternate energy sources 1502 and power from the utility power grid 1516. In an embodiment of the present invention, each energy storage module 1505 includes one or more modules and make up what is referred to as a string. However, one of ordinary skill in the art will appreciate various amounts of cells may be included in a module, various amounts of modules may be included in a string and other allocations and configurations of energy storage devices may be utilized in accordance with the present invention. The batteries may be nickel metal hydride (NiMh), nickel cadmium (NiCd), lithium (Li), lead, pure proton or any other suitable type of battery appreciable by one of ordinary skill in the art. However, other forms of energy storage other than batteries, such as capacitors and flywheels may also be used as energy storage modules 1505.

The inverters 1503 separate the DC output voltage into time varying segments to produce an AC (alternating current) power signal, such as a 120/240 split-phase load current, which is typically the current supplied to a house. In an exemplary embodiment of the present invention, one inverter is used hybrid PV Schneider Electric XW4548-12/240-60, but other suitable inverters can also be used.

The electromechanical isolation breaker 1507 preferably includes one or more automated switches for dynamically directing the AC power signal from the inverters 1503 to a desired load. For example, in the embodiment, the power storage and supply device 1501 may be configured to send and receive power from the alternate energy sources 1502 or to/from the utility power grid 1516 only.

The local data processing gateway 1506 monitors and controls most of the processes conducted by the power storage and supply device 1501. The local data processing gateway 1506 is a computer-implemented device that may include, for example, one or more processors, a clock, memory, I/O interfaces, analog to digital converters, digital to analog converters, and operating system software. In addition, the local data processing gateway 1506 includes a number of software modules for implementing the functionality discussed below with reference to FIG. 15. The local data processing gateway 1506 can be configured to monitor and control the processes and measurements conducted by the power storage and supply device 1500 in either a local or remote mode configuration and can be aggregated by a third party (e.g., independent service operator, etc.) or utility for purposes of dispatching and controlling distributed power or stored energy.

For the communications within a residence or commercial site, the local data processing gateway 1506 can further aggregate, monitor and control the processes and measurements via the home area network 1510 associated with devices 1513 within the home using open standard communication methods at the transport, transport, application and object levels (e.g., ZigBee, HomePlug, Intranet, Web Services, XML-Based, SEP, MMS, and IEC 61850) for user process, measurement, control, and conservation of on premise power generated, the resale of power to a utility via the utility power grid 1516 or advanced meter infrastructure 1512, power generated from energy storage modules 1505, alternate energy sources 1502 and devices capable of energy management (HVAC Thermostats, water heaters, pool pumps, etc.) via the home are network 1510 or consumer web portal 1508. Further, the local data processing gateway 1506 uses open standard communication methods at the transport, application, and object levels (e.g., Internet, GPRS, AMI Network, Web Services, XML-Based, DNP3, IEC 61850) for a utility, aggregator, or independent service operator 1511 to broadcast to a residence or commercial building site the processes and measurements relating to the control, management, and conservation of power generated on the premise, the resale of power to a utility, power generated from the energy storage modules 1506 and alternate energy sources 1503.

The data collected by the utility console may be used to provide customers with on demand information regarding the consumer's energy usage. Via the EMSIS-ES consumer webportal 1508 utilities may enable individual customer to monitor electrical consumption, alternate energy sources and power storage devices, their estimated savings, and associated environmental impact. Access to the website can be limited to customer having power storage and supply devices. Statistics can be compiled and presented using a web-accessible local data processing gateway controller 1506 and Internet 1509 to the consumer or utility, visa-a-versus.

For example, a homeowner who wants to ensure that his or her batteries are fully charged before offering any excess capacity to the grid can select a mode via the consumer web portal 1508 that prevents diversion by a utility until such charging has been completed. The consumer web portal 1508 may reflect this fact by not showing capacity for such units until a future time—for example, an estimated time after which the batteries would be fully charged. If the consumer changes a mode setting, that potential capacity can be promptly reflected back to the utility enterprise system 1514. A homeowner may also prevent the utility from reducing the thermostat beyond a certain point if a certain mode on the consumer web portal 1508 has been selected.

In another embodiment as shown in FIG. 16, a method for providing energy management 1600, comprises steps for providing one or more solar integrated energy management apparatus 1601; retrieving telemetry data from one or more energy storage modules physically coupled to one or more inverter/converters and one or more data processing gateway devices in a single assembly to calculate an amount of available stored energy in an energy area network 1602; making one or more electric energy buy-low/sell-high transactions, wherein energy from a utility is purchased at a low price and stored in said one or more energy storage modules and wherein the available stored energy is sold back to the utility at a price higher than the low price 1603; increasing the amount of available stored energy via one or more renewable energy sources 1604; and using an amount of available stored energy provided by one or more renewable energy sources at a later time when the cost of energy sold by one or more utilities is more expensive than the cost of said available stored energy provided by one or more renewable energy sources 1605.

In another embodiment as shown in FIG. 17, a method for providing home energy management 1700, comprises steps for providing one or more solar integrated energy management apparatus 1701; retrieving telemetry data from one or more energy storage modules physically coupled to one or more inverter/converters and one or more data processing gateway devices in a single assembly to calculate an amount of available stored energy in an energy area network 1702; making one or more electric energy buy-low/sell-high transactions, wherein energy from a utility is purchased at a low price and stored in said one or more energy storage modules and wherein the available stored energy is sold back to the utility at a price higher than the low price 1703; increasing the amount of available stored energy via one or more renewable energy sources 1704; using an amount of available stored energy provided by one or more renewable energy sources at a later time when the cost of energy sold by one or more utilities is more expensive than the cost of said available stored energy provided by one or more renewable energy sources 1705; using the amount of available stored energy to improve electric service reliability associated with one or more power outages such that one or more end users have reduced losses associated with the one or more power outages 1706; and using the amount of available stored energy to reduce financial losses associated with one or more power anomalies 1707.

In another embodiment as illustrated in FIG. 18, a method for providing home backup 1800, comprises steps for providing one or more solar integrated energy management apparatus 1801; retrieving telemetry data from one or more energy storage modules physically coupled to one or more inverter/converters and one or more data processing gateway devices in a single assembly to calculate an amount of available stored energy in an energy area network 1802; making one or more electric energy buy-low/sell-high transactions, wherein energy from a utility is purchased at a low price and stored in said one or more energy storage modules and wherein the available stored energy is sold back to the utility at a price higher than the low price 1803; using the amount of available stored energy to improve electric service reliability associated with one or more power outages such that one or more end users have reduced losses associated with the one or more power outages 1804; and using the amount of available stored energy to reduce financial losses associated with one or more power anomalies 1805.

In another embodiment as shown in FIG. 19, a system for monitoring energy consumption 1900, comprises one or more hybrid inverter/converters 1901; one or more data processing gateways 1902; one or more charge controllers 1903; one or more intelligent battery management systems 1904; one or more energy management devices in a compact footprint 1905; one or more memories for storing data 1906; one or more processors capable of executing processor readable code 1907; one or more communications means 1908; one or more databases 1909; one or more query processing modules 1910; one or more aggregation engines 1911; one or more execution engines 1912; one or more reference generating modules 1913; one or more user interfaces 1914; and one or more algorithm rules 1915.

In another embodiment as shown in FIG. 20, a computer implemented method including computer usable readable storage medium having computer readable program code embodied therein for causing a computer system to perform a method of monitoring energy consumption 2000, comprises steps for interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2001; associating an energy management device with a consumer unit, said energy management device having a local data processing gateway device communicably coupled thereto 2002; configuring said local data processing gateway to monitor and control processes and measurements conducted by said energy management device; receiving and logging a plurality of telemetry data from one or more intelligent battery management systems 2003; receiving and logging a plurality of telemetry data from one or more intelligent inverter/converters 2004; receiving and logging a plurality of telemetry data from one or more energy storage modules 2005; receiving and logging a plurality of telemetry data from a charge controller 2006; and viewing the plurality of telemetry data by accessing a consumer web portal 2007.

In another embodiment as shown in FIG. 21, a computer implemented apparatus for providing a method for monitoring energy consumption 2100, is an apparatus that comprises a processor 2101; an input device coupled to said processor 2102; a memory coupled to said processor 2103; an output device 2104; and an execution engine 2105 including a method for monitoring energy consumption to perform steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2106; associating an energy management device with a consumer unit, said energy management device having a local data processing gateway device communicably coupled thereto; configuring said local data processing gateway to monitor and control processes and measurements conducted by said energy management device 2107; receiving and logging a plurality of telemetry data from one or more intelligent battery management systems 2108; receiving and logging a plurality of telemetry data from one or more intelligent inverter/converters 2109; receiving and logging a plurality of telemetry data from one or more energy storage modules 2110; receiving and logging a plurality of telemetry data from a charge controller 2111; and viewing the plurality of telemetry data by accessing a consumer web portal 2112.

In another embodiment as shown in FIG. 22, a computer readable medium for monitoring energy consumption 2200, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2201; program code for associating an energy management device with a consumer unit, said energy management device having a local data processing gateway device communicably coupled thereto 2202; program code for configuring said local data processing gateway to monitor and control processes and measurements conducted by said energy management device 2203; program code for receiving and logging a plurality of telemetry data from one or more intelligent battery management systems 2204; program code for receiving and logging a plurality of telemetry data from one or more intelligent inverter/converters 2205; program code for receiving and logging a plurality of telemetry data from one or more energy storage modules 2206; program code for receiving and logging a plurality of telemetry data from a charge controller 2207; and program code for viewing the plurality of telemetry data by accessing a consumer web portal 2208.

In another embodiment as shown in FIG. 23, a computer implemented method including computer-usable readable storage medium having computer-readable program code embodied therein for causing a computer system to perform a method of storing excess energy generated in an energy management device in an application platform 2300 for performing steps for securing one or more energy storage modules in an energy storage module enclosure, said energy storage module enclosure coupled to the inside of a Solar Energy Grid Integrated System with Energy Storage (SEGIS-ES™) Appliance, wherein said Solar Energy Grid Integrated System with Energy Storage comprises one or more hybrid inverter/converters, one or more data processing gateways, one or more charge controllers, one or more intelligent battery management systems, and one or more energy management devices in a compact footprint 2301; connecting said one or more energy storage modules to a SEGIS-ES™ isolation switch panel board, wherein said SEGIS-ES™ isolation switch panel board provides a common integration point for components coupled to said SEGIS-ES™ Appliance 2302; configuring, by the computer system, a local data processing gateway to monitor and control processes and measurements conducted by said energy management device 2303; monitoring, by the computer system, the amount of power generated by one or more distributed energy sources 2304; monitoring, by the computer system, the rate of power generated by the one or more distributed energy sources 2305; controlling, by the computer system, the rate of power stored in said one or more energy storage modules 2306; controlling, by the computer system, the amount of power stored in said one or more energy storage modules 2307; monitoring, by the computer system, the health of one or more energy storage modules 2308; and operating, by the computer system, one or more devices capable of energy management 2309.

In another embodiment as shown in FIG. 24, a method for selling energy back to a utility power grid 2400, comprises steps for providing one or more hybrid inverter/converters 2401; providing one or more data processing gateways 2402; providing one or more charge controllers 2403; providing one or more intelligent battery management systems 2404; providing one or more energy management devices in a compact footprint 2405; defining price points of power obtained from a utility power grid at which a user will discharge energy stored in an energy storage module 2406; defining a percentage of maximum capacity of stored energy in one or more energy storage modules that may be discharged in a single cycle; correlating said price points of power with said percentage of maximum capacity 2407; configuring said price points and said percentage of maximum capacity into one or more sets of rules 2408; calculating the amount of available energy storage capacity based upon the current or expected price of power 2409; and implementing the one or more set of rules 2410.

In another embodiment as shown in FIG. 25, a computer readable medium for selling energy back to a utility power grid 2500, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2501; program code for processing the one or more set of rules on an Intelligent Energy Storage Module Management System 2502; program code for managing the one or more set of rules via a multiprotocol data processing communication gateway device communicably coupled to the Energy Storage Module Management System 2503; program code for monitoring the one or more set of rules via a multiprotocol data processing communication gateway device communicably coupled to the Energy Storage Module Management System 2504; and program code for modifying the one or more set of rules via a multiprotocol data processing communication gateway device communicably coupled to the Energy Storage Module Management System, said multiprotocol data processing communication gateway device further communicably coupled to a consumer web portal 2505.

In another embodiment a shown in FIG. 26, a system for selling energy back to a utility power grid 2600, comprises one or more hybrid inverter/converters coupled to an energy storage management system and charge controller module via a data processing gateway such that the data processing gateway implements one or more rule sets for selling energy back to a utility power grid to maximize the selling price of said energy 2601; one or more data processing gateways receiving signals from the energy storage management system and charge controller and sending instructions via processor readable code to implement one or more algorithms 2602; one or more charge controllers electrically coupled to the energy management storage management system to determine requirements for charging and discharging; one or more intelligent battery management systems 2603; one or more energy management devices in a compact footprint not to exceed 18" in depth 2604; one or more memories for storing data 2605; one or more processors capable of executing processor readable code 2606; one or more communications means to send and receive instructions from the data processing gateway, one or more hybrid inverter/converters, charge controllers, energy storage management system, and intelligent battery management system 2607; one or more operating system software systems and related databases 2608; one or more query processing modules 2609; one or more aggregation engines 2610; one or more execution engines 2611; one or more reference generating modules 2612; one or more user interfaces 2613; and one or more algorithm rules 2614.

In yet a further embodiment as shown in FIG. 27, a computer implemented method including computer usable readable storage medium having computer readable program code for causing a computer system to perform a method of selling energy back to a utility power grid 2700 by sending instructions to implement steps including interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2701; defining, by the computer system, price points of power obtained from a utility power grid at which a user will discharge energy stored in an energy storage module 2702; defining, by the computer system, a percentage of maximum capacity of stored energy in one or more energy storage modules that may be discharged in a single cycle 2703; correlating, by the computer system, said price points of power with said percentage of maximum capacity 2704; configuring, by the computer system, said price points and said percentage of maximum capacity into one or more sets of rules 2705; and implementing, by the computer system, the one or more set of rules 2706.

In a further embodiment as shown in FIG. 28, a computer implemented apparatus for selling energy back to a utility power grid 2800, is an apparatus that comprises a processor 2801; an input device coupled to said processor 2802; a memory coupled to said processor 2803; an output device 2804; and an execution engine 2805 including a method for peak shaving to implement steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 2806; defining price points of power obtained from a utility power grid at which a user will discharge energy stored in an energy storage module 2807; defining a percentage of maximum capacity of stored energy in one or more energy storage modules that may be discharged in a single cycle 2808; correlating said price points of power with said percentage of maximum capacity 2809; configuring said price points and said percentage of maximum capacity into one or more sets of rules 2810; and implementing the one or more set of rules 2811.

In another embodiment as shown in FIG. 29, a method of peak shaving 2900, comprises providing one or more hybrid inverter/converters 2901; providing one or more data processing gateways 2902; providing one or more charge controllers 2903; providing one or more intelligent battery management systems 2904; providing one or more energy management devices in a compact footprint 2905; connecting an energy management system with one or more integrated alternate energy sources and one or more energy modules storage to a utility grid 2906; monitoring energy demand on said utility grid 2907; calculating an amount of maximum energy that said energy grid can deliver 2908; determining a threshold energy demand on the grid, wherein said threshold energy demand begins to stress one or more components of said utility grid 2909; identifying one or more time periods when the threshold energy demand is met, whereupon identification said energy management system with integrated alternate energy source and energy module storage sends power generated by one or more alternate energy sources to the utility grid 2910; and sending energy to the utility grid until said energy demand falls below said threshold energy demand 2911.

In another embodiment as shown in FIG. 30, a system for peak shaving 3000, comprises one or more hybrid inverter/converters 3001; one or more data processing gateways 3002; one or more charge controllers 3003; one or more intelligent battery management systems 3004; one or more energy management devices in a compact footprint not to exceed eighteen inches 3005; one or more memories for storing data 3006; one or more processors capable of executing processor readable code 3007; one or more communications means 3008; one or more databases 3009; one or more query processing modules 3010; one or more aggregation engines 3011; one or more execution engines 3012; one or more reference generating modules 3013; one or more user interfaces 3014; and one or more algorithm rules 3015.

In another embodiment as illustrated in FIG. 31, a computer implemented method including computer usable readable storage medium having computer readable program code embodied therein for causing a computer system to perform a method of peak shaving 3100, comprises interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 3101; defining, by the computer system, price points of power obtained from a utility power grid at which a user will discharge energy stored in an energy storage module 3102; defining, by the computer system, a percentage of maximum capacity of stored energy in one or more energy storage modules that may be discharged in a single cycle 3103; correlating, by the computer system, said price points of power with said percentage of maximum capacity 3104; configuring, by the computer system, said price points and said percentage of maximum capacity into one or more sets of rules 3105; and implementing, by the computer system, the one or more sets of rules or algorithms 3106.

In another embodiment as shown in FIG. 32A and FIG. 32B, a computer implemented apparatus for providing a method for peak shaving 3200, comprises a processor 3201; an input device coupled to said processor 3202; a memory coupled to said processor 3203; an output device 3204; and an execution engine 3205 including steps for implementing a method for peak shaving including interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 3206; defining price points of power obtained from a utility power grid at which a user will discharge energy stored in an energy storage module 3207; defining a percentage of maximum capacity of stored energy in one or more energy storage modules that may be discharged in a single cycle 3208; correlating said price points of power with said percentage of maximum capacity 3209; configuring said price points and said percentage of maximum capacity into one or more sets of rules 3210; and implementing the one or more set of rules 3211.

In another embodiment as shown in FIG. 33, a computer readable medium for peak shaving 3300 comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint 3301; program code for connecting an energy management system with integrated alternate energy source and energy module storage to a utility grid 3302; program code for monitoring energy demand on said utility grid 3303; program code for calculating an amount of maximum energy that said energy grid can deliver 3304; program code for determining a threshold energy demand on the grid, wherein said threshold energy demand begins to stress one or more components of said utility grid 3305; program code for identifying one or more time periods when the threshold energy demand is met, whereupon identification said energy management system with integrated alternate energy source and energy module storage sends power generated by one or more alternate energy sources to the utility grid 3306; and program code for sending energy to the utility grid until said energy demand falls below said threshold energy demand 3307.

In another embodiment, the EMSIS-ES may further implement multiple sets of rules and constraints, which govern how the combination of various resources, e.g., energy storage plus load control, may be used. For example, if a utility desires to reduce its aggregated or individual load by 50 megawatts, the EMSIS-ES may process rules, which indicate an optimal solution can be achieved via 30 MW of power through dispatching energy and 20 MW through load curtailment.

In another embodiment, a rule set may dictate that if the price of power is less than $200 per megawatt-day, batteries may discharge up to 50% of their capacity in a single cycle; if the price of power is greater than $200 per megawatt-day but less than $400 per megawatt-day, batteries may discharge up to 65% of their available capacity in a single cycle; and if the price of power is greater than $400 per megawatt-day, batteries may discharge up to 80% of their available capacity in a single cycle. They EMSIS-ES may then calculate and display the amount of available energy storage capacity based upon the current or expected price of power.

In another embodiment, by implementing peak load reduction and energy shaving, the EMSIS-ES may reduce incremental transmission and distribution investments for utility or independent service operator. For example, the EMSIS-ES may help relieve localized distribution issues by identifying an overstressed substation or feeder line. Deploying units to 5% of the affected areas may substantially increase reliability of the network. By controlling which loads reconnect to the grid, the utility can stagger the reconnecting loads after brief and extended outages to assist with outage recovery management. In addition, units with energy storage capacity can be instructed to discharge immediately after reconnecting the grid to less the impact of loads reconnecting.

The entire power storage and supply device 100 is designed as a minimally invasive NEMA 3R Stainless Steel utility grade enclosure measuring 72"H×24"W×14"D designed as for outdoor application to be placed within the utility service area and easement of a residence or commercial building.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

Exemplary Operating Environments, Components, and Technology

FIG. 34 is a block diagram illustrating components of an exemplary operating environment in which embodiments of the present invention may be implemented. The system 3400 can include one or more user computers, computing devices, or processing devices 3412, 3414, 3416, 3418, which can be used to operate a client, such as a dedicated application, web browser, etc. The user computers 3412, 3414, 3416, 3418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 3412, 3414, 3416, 3418 may also have any of a variety of applications, including one or more development systems, database client and/or server applications, and Web browser applications. Alternatively, the user computers 3412, 3414, 3416, 3418 may be any other electronic device, such as a thin-client computer, Internet-enabled gaming system, and/or personal messaging device, capable of communicating via a network (e.g., the network 3410 described below) and/or displaying and navigating Web pages or other types of electronic documents. Although the exemplary system 3400 is shown with four user computers, any number of user computers may be supported.

In most embodiments, the system 3400 includes some type of network 3410. The network can be any type of network familiar to those skilled in the art that can support data communications using any of a variety of commercially-available protocols, including without limitation TCP/IP, SNA, IPX, AppleTalk, and the like. Merely by way of example, the network 3410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 3402, 3404, 3406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 3406) may be dedicated to running applications, such as a business application, a Web server, application server, etc. Such servers may be used to process requests from user computers 3412, 3414, 3416, 3418. The applications can also include any number of applications for controlling access to resources of the servers 3402, 3404, 3406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 3412, 3414, 3416, 3418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 3412, 3414, 3416, 3418.

The system 3400 may also include one or more databases 3420. The database(s) 3420 may reside in a variety of locations. By way of example, a database 3420 may reside on a storage medium local to (and/or resident in) one or more of the computers 3402, 3404, 3406, 3412, 3414, 3416, 3418. Alternatively, it may be remote from any or all of the computers 3402, 3404, 3406, 3412, 3414, 3416, 3418, and/or in communication (e.g., via the network 3410) with one or more of these. In a particular set of embodiments, the database 3420 may reside in a storage-area network ("SAN") familiar to those skilled in the art. Similarly, any necessary files for performing the functions attributed to the computers 3402, 3404, 3406, 3412, 3414, 3416, 3418 may be stored locally on the respective computer and/or remotely, as appropriate. In one set of embodiments, the database 3420 may be a relational database, such as Oracle 10g, that is adapted to store, update, and retrieve data in response to SQL-formatted commands.

FIG. 35 illustrates an exemplary computer system 3500, in which embodiments of the present invention may be implemented. The system 3500 may be used to implement any of the computer systems described above. The computer system 3500 is shown comprising hardware elements that may be electrically coupled via a bus 3524. The hardware elements may include one or more central processing units (CPUs) 3502, one or more input devices 3504 (e.g., a mouse, a keyboard, etc.), and one or more output devices 3506 (e.g., a display device, a printer, etc.). The computer system 3500 may also include one or more storage devices 3508. By way of example, the storage device(s) 3508 can include devices such as disk drives, optical storage devices, solid-state storage device such as a random access memory ("RAM") and/or a read-only memory ("ROM"), which can be programmable, flash-updateable and/or the like.

The computer system 3500 may additionally include a computer-readable storage media reader 3512, a communications system 3514 (e.g., a modem, a network card (wireless or wired), an infra-red communication device, etc.), and working memory 3518, which may include RAM and ROM devices as described above. In some embodiments, the computer system 3500 may also include a processing acceleration unit 3516, which can include a digital signal processor DSP, a special-purpose processor, and/or the like.

The computer-readable storage media reader 3512 can further be connected to a computer-readable storage medium 3510, together (and, optionally, in combination with storage device(s) 3508) comprehensively representing remote, local, fixed, and/or removable storage devices plus storage media for temporarily and/or more permanently containing, storing, transmitting, and retrieving computer-readable information. The communications system 3514 may permit data to be exchanged with the network and/or any other computer described above with respect to the system 3500.

The computer system 3500 may also comprise software elements, shown as being currently located within a working memory 3518, including an operating system 3520 and/or other code 3522, such as an application program (which may be a client application, Web browser, mid-tier application, RDBMS, etc.). It should be appreciated that alternate embodiments of a computer system 3500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 35 further illustrates an environment where an on-demand distributed database service might be used. As illustrated in FIG. 35 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alpha-numeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement, each user system and all of its components are operator configurable using applications, such as a browser, including computer code run using a central processing unit such as an Intel Pentium® processor or the like. Similarly, a computer system (and additional instances of an enterprise database, where more than one is present) and all of their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

The above illustrations provide many different embodiments for implementing different features of the invention. Specific embodiments of components and processes are described to help clarify the invention. These are, of course, merely embodiments and are not intended to limit the invention from that described in the claims.

What is claimed is:

1. An Intelligent Energy Storage Module Management System, comprising:
 a tamper resistant energy storage enclosure housed within an intelligent energy storage module management enclosure with security fastening means, wherein the tamper resistant energy storage enclosure includes means for connecting one or more energy storage devices to a hybrid inverter/converter via a solid copper bus bulkhead apparatus which further includes an electrically insulated escutcheon means and associated cover to isolate a high current bus conductor from service personnel;
 a housing means for one or more energy storage module management intelligent electronics and telemetry equipment within said intelligent energy storage module management enclosure while simultaneously isolating one or more energy storage disconnecting switches and associated conductors;
 a communications connection bulkhead means housed within the intelligent energy storage module management enclosure for allowing the Intelligent Energy Storage Module Management System to communicate to a data processing gateway, hybrid inverter/converter and charge controller;
 one or more venting grid ports located on the intelligent energy storage module management enclosure adjacent to one or more energy storage modules, wherein the one or more venting grid ports cross ventilate and convection cool one or more of the one or more energy storage modules;
 one or more components of the energy storage module management intelligent electronics and telemetry equipment communicably coupled to a multiprotocol data processing communication gateway device to provide telemetry data to implement one or more processes to integrate with an Energy Area Network (EAN); and
 the Energy Area Network (EAN) communicably coupled to one or more appliances and electrical loads to aggregate locally stored control algorithms and remotely received control parameters.

2. The Intelligent Energy Storage Module Management System of claim 1, further comprising:
 one or more Controller Area Network Bus (CANBUS) protocols to allow one or more components to communicate with each other without one or more host computers;
 one or more Distributed Network Protocol 3.0 (DNP3) platforms to facilitate communication between the one or
more data processing gateways and one or more components;
 at least one National Institute of Science and Technology (NIST) approved Common Information Model (CIM); and
 at least one Zigbee Smart Energy 2.0 (SE2) compliant platform.

3. The Intelligent Energy Storage Module Management System of claim 1 wherein the Energy Storage Module Management System prevents access by unauthorized personnel.

4. The Intelligent Energy Storage Module Management System of claim 1 wherein the Energy Area Network (EAN) is a Home Area Network (HAN) comprising residential appliances and electrical loads.

5. The Intelligent Energy Storage Module Management System of claim 1 wherein the one or more components of the energy storage module management intelligent electronics and telemetry equipment communicably coupled to a multi-protocol data processing communication gateway device further integrates an intelligent charge controller and intelligent inverter/converter to the Energy Area Network (EAN).

6. The Intelligent Energy Storage Module Management System of claim 1 wherein the tamper resistant energy storage enclosure houses one or more energy storage components of the energy storage module management intelligent electronics and telemetry equipment wherein the one or more energy storage modules are electrically connected in series.

7. The Intelligent Energy Storage Module Management System of claim 1 wherein the one or more energy storage devices each contain at least one energy storage module, wherein one or more modules are connected to the tamper resistant energy storage enclosure and wherein the one or more modules comprise a string.

* * * * *